(12) United States Patent  (10) Patent No.: US 7,945,476 B2
Subramanian et al.  (45) Date of Patent: May 17, 2011

(54) INTERNET CONTEXTUAL ADVERTISEMENT DELIVERY SYSTEM

(75) Inventors: Anand Subramanian, West New York, NJ (US); Jeremy Sterns, New York, NY (US); Shanthini Rajendram, New York, NY (US)

(73) Assignee: Context Web, Inc., New York, NY (US)

( * ) Notice: Subject to any disclaimer, the term of this patent is extended or adjusted under 35 U.S.C. 154(b) by 1256 days.

(21) Appl. No.: 10/001,772

(22) Filed: Oct. 31, 2001

(65) Prior Publication Data

US 2002/0123912 A1  Sep. 5, 2002

Related U.S. Application Data

(60) Provisional application No. 60/244,725, filed on Oct. 31, 2000, provisional application No. 60/296,599, filed on Jun. 7, 2001, provisional application No. 60/296,590, filed on Jun. 7, 2001.

(51) Int. Cl.
 *G06Q 30/00* (2006.01)
(52) U.S. Cl. .................. 705/14.67; 705/14.1; 705/14.4; 705/14.54; 705/14.55; 705/14.73
(58) Field of Classification Search .............. 705/14.1, 705/14.4, 14.54, 14.55, 14.67, 14.73, 1, 10, 705/14
See application file for complete search history.

(56) References Cited

U.S. PATENT DOCUMENTS

| 4,723,212 A | 2/1988 | Mindrum et al. |
|---|---|---|
| 4,914,590 A | 4/1990 | Loatman et al. |
| 4,996,642 A | 2/1991 | Hey |
| 5,105,184 A | 4/1992 | Pirani et al. |
| 5,353,218 A | 10/1994 | De Lapa et al. |
| 5,401,946 A | 3/1995 | Weinblatt |
| 5,435,087 A | 7/1995 | Karkar et al. |
| 5,459,306 A | 10/1995 | Stein et al. |
| 5,483,650 A | 1/1996 | Pedersen et al. |
| 5,583,763 A | 12/1996 | Atcheson et al. |
| 5,621,812 A | 4/1997 | Deaton et al. |
| 5,636,346 A * | 6/1997 | Saxe ................................ 705/1 |
| 5,696,962 A | 12/1997 | Kupiec |
| 5,724,521 A | 3/1998 | Dedrick |

(Continued)

FOREIGN PATENT DOCUMENTS

WO  WO-99/46719  9/1999

(Continued)

OTHER PUBLICATIONS

Spy on your customers (they want you to)—new web tracking technology turns browsers into paying customers by Bob Tedeschi from Ziff Davis Smart Business for the New Economy, 58 dated Aug. 1, 2001 ISSN:1528-4034.*

(Continued)

*Primary Examiner* — Raquel Alvarez

(57) ABSTRACT

This invention relates to a system and method for presenting to a user relevant areas of distributed computer network sites. In particular, the invention disclosed, infers, and cross references user mind sets with data stores of potential user goals. The user mind sets indicate a navigational goal of a user over the distributed computer network. In addition, the invention cross-references indicated user goals with data stores of service and service providers providing those services. The invention presents targeted service and service providers to the user across the distributed computer network thereby enabling the user to navigate towards the user goal.

13 Claims, 52 Drawing Sheets

U.S. PATENT DOCUMENTS

| | | | |
|---|---|---|---|
| 5,742,768 A | 4/1998 | Gennaro et al. | |
| 5,754,938 A | 5/1998 | Herz et al. | |
| 5,761,655 A | 6/1998 | Hoffman | |
| 5,822,748 A | 10/1998 | Cohen et al. | |
| 5,832,474 A | 11/1998 | Lopresti et al. | |
| 5,835,087 A * | 11/1998 | Herz et al. | 345/810 |
| 5,838,317 A | 11/1998 | Bolnick et al. | |
| 5,848,408 A | 12/1998 | Jakobsson et al. | |
| 5,855,008 A | 12/1998 | Goldhaber et al. | |
| 5,864,863 A | 1/1999 | Burrows | |
| 5,918,014 A | 6/1999 | Robinson | |
| 5,930,764 A * | 7/1999 | Melchione et al. | 705/10 |
| 5,943,648 A | 8/1999 | Tel | |
| 5,943,679 A | 8/1999 | Niles et al. | |
| 5,948,061 A | 9/1999 | Merriman et al. | 709/219 |
| 5,961,593 A | 10/1999 | Gabber et al. | |
| 5,974,408 A | 10/1999 | Cohen et al. | |
| 5,987,454 A | 11/1999 | Hobbs | |
| 5,991,735 A | 11/1999 | Gerace | |
| 6,006,197 A | 12/1999 | d'Eon et al. | |
| 6,009,410 A | 12/1999 | LeMole et al. | |
| 6,016,487 A | 1/2000 | Rioux et al. | |
| 6,018,734 A | 1/2000 | Zhang et al. | |
| 6,026,409 A | 2/2000 | Blumenthal | |
| 6,044,376 A | 3/2000 | Kurtzman, II | |
| 6,081,750 A | 6/2000 | Hoffberg et al. | |
| 6,104,503 A | 8/2000 | Shimura et al. | |
| 6,134,532 A | 10/2000 | Lazarus et al. | |
| 6,185,614 B1 | 2/2001 | Cuomo et al. | |
| 6,189,003 B1 | 2/2001 | Leal | |
| 6,236,978 B1 | 5/2001 | Tuzhilin | |
| 6,253,188 B1 | 6/2001 | Witek et al. | |
| 6,256,633 B1 | 7/2001 | Dharap | 707/10 |
| 6,308,202 B1 | 10/2001 | Cohn et al. | 709/217 |
| 6,327,574 B1 | 12/2001 | Kramer et al. | |
| 6,327,590 B1 | 12/2001 | Chidlovskii et al. | |
| 6,339,761 B1 | 1/2002 | Cottingham | |
| 6,356,899 B1 | 3/2002 | Chakrabarti et al. | 707/5 |
| 6,366,298 B1 | 4/2002 | Haitsuka et al. | 345/736 |
| 6,453,315 B1 | 9/2002 | Weissman | 707/5 |
| 6,526,440 B1 | 2/2003 | Bharat | |
| 6,529,903 B2 | 3/2003 | Smith et al. | |
| 6,615,209 B1 | 9/2003 | Gomes et al. | |
| 6,629,092 B1 | 9/2003 | Berke | |
| 6,658,423 B1 | 12/2003 | Pugh et al. | |
| 6,668,256 B1 | 12/2003 | Lynch | |
| 6,678,681 B1 | 1/2004 | Brin | |
| 6,725,203 B1 | 4/2004 | Seet et al. | |
| 6,725,259 B1 | 4/2004 | Bharat | |
| 6,754,873 B1 | 6/2004 | Law et al. | |
| 6,804,659 B1 | 10/2004 | Graham et al. | |
| 7,076,443 B1 * | 7/2006 | Emens et al. | 705/14 |
| 7,149,741 B2 | 12/2006 | Burkey et al. | |
| 7,257,589 B1 | 8/2007 | Hull et al. | |
| 7,353,246 B1 | 4/2008 | Rosen et al. | |
| 2002/0010625 A1 | 1/2002 | Smith et al. | 705/14 |
| 2002/0042791 A1 | 4/2002 | Smith et al. | |
| 2002/0107735 A1 | 8/2002 | Henkin et al. | |
| 2002/0120503 A1 | 8/2002 | Iwayama et al. | |
| 2002/0123912 A1 | 9/2002 | Subramanian et al. | 705/5 |
| 2002/0123988 A1 | 9/2002 | Dean et al. | |
| 2002/0133481 A1 | 9/2002 | Smith et al. | |
| 2002/0154162 A1 | 10/2002 | Bhatia et al. | |
| 2004/0059708 A1 | 3/2004 | Dean et al. | |
| 2004/0119740 A1 | 6/2004 | Chang et al. | |
| 2004/0122811 A1 | 6/2004 | Page | |
| 2005/0165615 A1 | 7/2005 | Minar | |

FOREIGN PATENT DOCUMENTS

| | | | |
|---|---|---|---|
| WO | WO 99/46719 | * | 9/1999 |
| WO | WO 01/44992 | | 6/2001 |
| WO | WO 02/37220 | | 5/2002 |

OTHER PUBLICATIONS

International Search Report Application No. PCT/US01/45483 issued Aug. 28, 2002.

International Preliminary Examination report dated Jan. 31, 2003 of International Application No. PCT/US01/45483, International Publication No. WO 02/37220.

International Preliminary Examination Report dated Jan. 31, 2003 of International Application No. PCT/US01/45483 to which the present application is the U.S. National Phase Application under 35 U.S.C. §371.

"NewsReal Changes Name to YellowBrix; Bridges the Gap Between Content and Commerce; YellowBrix Technology 'Makes Web Sites Smart' by Advancing Access to Content and Commerce", PR Newswire, Financial News, Feb. 28, 2000, PR Newswire Association, Inc.

New Media Age, p. S16, Feb. 19, 2004, Centaur Communications Ltd.

"Infoseek Spin-Off Makes News Real", Multimedia Daily, vol. 5, Issue 22, Feb. 4, 1998, BRP Publications.

"Yellowbrix Promises Gold", Interactive PR & Marketing News, vol. 6, Issue 24, Nov. 26, 1999, Phillips Business Information.

Dvorak, John C., "Advertising Just for You", Boardwalk Magazine, pp. 142-143, vol. 13, No. 12 Dec. 1999.

Notification of Transmittal of the International Search Report or the Declaration and Search for PCT/US01/45483 Dated Aug. 28, 2002.

Spy on Your Customers (They Want You To)—New Web Tracking Technology Turns Browsers Into Paying Customers (Company Business and Marketing) Bob Tedeschi From Ziff Davis Smart Business for the New Economy, 58 Dated Aug. 1, 2001, ISSN: 1528-4034.

Notification of Transmittal of International Preliminary Examination Report for PCT/US01/45483 dated Jan. 31, 2003.

Advisory Action in U.S. Appl. No. 11/929,585, mailed on Jul. 20, 2009.

Final Office Action in U.S. Appl. No. 11/929,585, mailed on Apr. 7, 2009.

Final Office Action in U.S. Appl. No. 11/929,563, mailed on Jan. 6, 2010.

Listing of Image File Wrapper of U.S. Appl. No. 11/929,585, Jul. 29, 2010.

Listing of Image File Wrapper of U.S. Appl. No. 11/929,563, Jul. 29, 2010.

Office Action in U.S. Appl. No. 11/929,563, mailed on Jun. 17, 2009.
Office Action in U.S. Appl. No. 11/929,585, mailed on Sep. 2, 2008.
Office Action in U.S. Appl. No. 11/929,585, mailed on Nov. 12, 2009.
Response to the Office Action in U.S. Appl. No. 11/929,585, submitted on Dec. 31, 2008.
Response to the Final Office Action in U.S. Appl. No. 11/929,585, submitted on Jul. 2, 2009.
Response to the Office Action in U.S. Appl. No. 11/929,563, submitted on Oct. 7, 2009.

* cited by examiner

☐ Dell Dimension XPS B1000r (Pentium III, 1 GHz, 128 MB RDRAM)
Pentium III, 1000 MHz (1 GHz), 128 MB RAM, 30GB hard disk, Windows 2000 installed, 19-inch monitor ☐ Dell Dimension 8100 (Pentium 4, 1.5 GHz)
Pentium 4, 1500 MHz (1.5 GHz), 128 MB RAM, 40GB hard disk, Windows ME installed, 19-inch monitor Done

Appears In:

New Releases: Music

New Releases: Pop & Rock

New Releases: Geneal Pop

Subject/Style: Rock/Pop, Teen, General,

Track List

1. The Call

Done

Figure 19C

INTERNET CONTEXTUAL ADVERTISEMENT DELIVERY SYSTEM

CROSS-REFERENCE TO RELATED APPLICATIONS

This application claims the benefit of provisional U.S. patent application Ser. No. 60/244,725 entitled "INTERNET NAVIGATION TOOL," filed Oct. 31, 2000, provisional U.S. patent application Ser. No. 60/296,599 entitled "CONTEXTUAL ADVERTISING AND AFFILIATE MARKETING" filed on Jun. 7, 2001, and provisional U.S. patent application Ser. No. 60/296,590 entitled "CONTEXTUAL CUSTOMER-RETENTION TOOL & NETWORK" filed on Jun. 7, 2001, the disclosure of all of which are incorporated herein by reference in its entirety.

BACKGROUND OF THE INVENTION

The present invention relates generally to providing content, services and advertising about services by means of the Internet and, more particularly, to bringing to customers various services, content, advertising about services and affiliate links that are automatically determined to be relevant to the customer's current interest on the Internet.

Two large-scale and complementary problems have emerged in the online world. First, it is increasingly difficult for users to find the online content and services that suit their needs in real time. Second, it is increasingly difficult for online service providers to make it easy for targeted customers to find their offerings that would be useful to the customer at the current moment. Both of these problems are a function of the current size and exploding growth of the Internet. An ideal solution would allow users to focus on what they want, allow service providers to focus on what they offer, and alleviate the effort currently required on both sides to find each other.

A typical company with a presence on the Internet, makes available content or some other service at its web site where it can be accessed automatically or semi-automatically by a group of consumers or users. For example, headline news is a content-based service made available by companies like CNN, NBC, the BBC, the Associated Press, and so on. These are available "online" via traditional web browsers by users who visit the appropriate company's web site. Also bookselling is another service provided by service provider companies like Amazon.com, Barnesandnoble.com, 1BookStreet.com, and so on, which provide for the sale of books, music and electronics. These web sites may also provide professional and customer reviews of the products.

The users interact with the services at a web site via a personal computer running a web browser application (such as Microsoft Internet Explorer or Netscape Navigator). This user might also access such services via other means, such as from a personal digital assistant (PDA), wireless digital telephone, a traditional telephone by voice commands, and so on. In addition, service providers can also introduce such services directly, such as through e-mail or instant messaging. Ultimately through any combination of these and other means, the user accesses some such service.

Some service providers aggregate services on their web site to form a "value chain," i.e., a group of related services and content. This is done in order to capture as much of the user's attention as possible. Such value chains develop because online services are created and evolved with great speed on the Internet, and some of these service providers develop relationships with each other in complex networks based on the applicability of the service of one provider to the services of other provider. The traditional notion of a "value chain" is a path through these related services that brings a collection of items or services of value to a user. One way a user experiences a value chain is through a single trusted service provider that aggregates other relevant services, such that a complete value chain is present at that provider's site. Users can also create their own value chain ad hoc through search engines.

FIG. 1 shows a prior art navigational experience for a user by which a potential customer 10 with a personal computer running a browser uses a communications system 12 to access the Internet 14. The user makes contact with a web site 16, which may provide links to other services at that site or other sites 18 to form a value chain. For example, access to the Amazon.com site provides the customer with the following services relevant to the book purchase process:

Book search by title, author, subject, ISBN
Book excerpts
Reviews by experts
Reviews by customers
Related books listings
Book pricing and purchase capability By aggregating these services, Amazon offers to its users that selection of services which it believes will likely be most relevant to its customer's goal in visiting its online bookstore. It also provides links to other web sites that Amazon believes will be of interest to all visitors to its site. This pattern of user-to-services interaction established by the web site is illustrated in the model in FIG. 2.

In FIG. 2, also a prior art approach, the user 10, via a telecommunications line 12 connects through the Internet 14 to the preferred service provider's web site 16, i.e., Amazon.com. At the web site, the user is provided access to a number of relevant services 21-24, designated V1-V4, that compose a value chain 16. Each service 21-24 may be selected by the user by operation of his or her browser. These services can be at the site or accessed through links to other sites 25-28 which provide services, or even related value chains, e.g., A9, the service, at site 28, the value chain.

However Amazon cannot provide similar value to users in the general case, i.e., when they are not at Amazon, when they are not looking for a product Amazon sells, when they are not shopping for a product at all, and so on. In particular, there is no current notion of a value chain that is not owned and operated by a particular site-based e-business.

As another example, a consumer looking to buy a particular stock at E*Trade.com might want to see charts from BigCharts.com, SEC filings from Edgar.com, discussion forums from Yahoo.com, insider trading from InsiderTrading.com and Press, News Capsules from Bloomberg.com. In this example, no fewer than six different service providers (perhaps each with their own value chain) can add value to a user's purchasing decision or goal. In order for any of these services to add value in that decision, either the user has to know about them in advance or E*Trade has to integrate all of this content on its site. Similarly, in order for E*Trade to get access to this consumer, either the user has to know about E*Trade and decide to visit, or E*Trade has to manage affiliate relationships with the other service providers in this value chain so they will have links on their sites to E*Trade. It is difficult to negotiate, setup and manage on a real time basis such relationships.

This "web" of services as illustrated in FIG. 2, includes tremendous volumes of valuable information and services, yet users of these services are burdened with the significant difficulty of finding those select services that are complementary to their current goal. Thus, the architecture of the Internet is a significant burden to both users looking for consumer services and the providers of those products over the Internet. There is a need to address this fundamental problem by providing a way for users and service providers to find each other when and where they are most needed.

Further, online companies spend vast sums placing advertisements on the Internet, which advertisements have poor responses because they are most often viewed by a person on the Internet at a time when they are not particularly relevant to the mind set of the user at the time, i.e., the goal of the user in being on the Internet in the first place. In order to improve the situation, online retailers utilize performance based marketing methods, e.g., the affiliate marketing programs that compensate the affiliate based on performance, that is, for example the number of customers that are directed to the site from the affiliate site. However, as noted, these companies have to spend vast amounts of money and effort to ensure that the affiliate sites maintain current and up to date links, in order to use the affiliate sites as a vehicle for providing timely promotions to users. The performance of both online advertising and online affiliate marketing would increase significantly if the advertisements and the affiliate links were automatically targeted to the current interest or mind-set of the user.

Much of the online advertising industry attempts to target users based on user demographics or perceived product preference. Certain sites, e.g., major search engine sites, advertisers also attempts to target user by keyword-based targeting. However, this type of marketing does not capture the opportunity to present a product that is in-line with a user's current goal. Just because a particular consumer enjoys rock music, does not mean that at the time when they are looking to buy a computer, they have an interest in seeing an advertisement about a CD for the latest music group. Even if the user is currently searching for information within a particular general subject, that does not mean they have an interest in an advertisement about the subject that does not address their particular interest. For example, Hilton hotels might choose to advertise on an affiliate travel site in order to present their promotions to users who are planning to travel. However, if the promotion is a discount for Hilton hotels in San Francisco, and a particular user is planning to travel to Los Angeles, then there is not an exact match between the promotion and the user's goal and a potential opportunity to make a sale is lost, assuming that Hilton Hotels has a promotion for a stay in Los Angles. Thus there is a need for advertisers and affiliate sites to be able to serve contextually targeted advertisement and affiliate links to users that encompass the complete or detailed mind-set of the customer.

In addition to trying to attract new customers, online service providers also spend much of their marketing dollars in an effort to reach previous customers who like their service, but who later either forget about those services, cannot find them again, or do not appreciate that the service is relevant to their current activity. With the Internet's exploding growth it is extremely frustrating for customers to try to keep track of all the various services that are available to them and to remember which service providers they liked the most. While more modern browsers provide "Favorites" or "Bookmarks" for retaining information that allows quick access to sites, the user must 1) at the time of the visit to the site request the URL of the site to be stored 2) organize those bookmarks in such a way that they are organized optimally. Unless, the user remembers the Bookmark and recalls to use it while making a relevant search, the information can be lost. Thus, the Internet is not designed to provide ways for companies to reach prior customers at points of need and it does not facilitate alerting past customers to new services provided by the company.

As an example, take a consumer who reads a useful review on a particular computer at Cnet.com. At some later date the consumer is interested in purchasing a Compaq computer and goes to Compaq.com. The consumer would like to read a review about the computer. However, if Compaq does not have reviews or the customer does not want to rely on Compaq's reviews, and the consumer does not remember the name of the review site previously visited, Cnet.com loses the opportunity to have a repeat customer and the consumer does not get the value of reading the review. Thus there is a need for a way for companies to provide their customers with contextual, deep-navigated links back to their services when it is most relevant to the customer.

These problems that exist on the Internet also exist as a microcosm within individual organizations and enterprises. For example, many organizations, especially those relatively larger and older companies, own a variety of computer systems each of which performs a set of functions and which communicates with a number of other such computer systems. These systems are often built on heterogeneous technologies, making the collaboration among them more difficult to implement and more brittle to change once implemented. There exists prior art related to the process of creating a homogenous communication infrastructure on which these various systems can more fluidly collaborate, this in the industry is called the space of Enterprise Application Integration (EAI). However the technology solutions in the EAI space still leave an important problem unsolved: how to enable users to navigate among these many services effectively.

An example of this problem is integrating an effective customer relationship management practice into a business, especially on a large scale. Often a customer's order processing takes place in one system, billing in another, customer service in another, and new product promotions and sales calls in yet another system. The first problem is enabling these various systems to communicate, which primarily is the space of EAI technologies. The problem that remains in addition is how, for example, to enable a user entering a customer-service ticket to navigate seamlessly in real time to that customer's order history, bill-paying patterns, responses to sales solicitations, and other appropriate services in the enterprise, without overhauling all those systems as a complete EAI implementation often requires.

This invention, pertaining to a contextual communication system in general, is just as applicable to private Intranets and other proprietary technology system integrations as it is to the Internet on the whole.

SUMMARY OF THE INVENTION

The present invention is directed to a system and method that connects relevant services, content, advertising and affiliate links around the user's navigational goal in navigating the Internet. The navigational scheme of the present invention is content based.

In an illustrative embodiment, the system is an electronic companion, manifested as a browser plug-in or as a complete web-browser application, adapted to understand or infer the user's current goal based on his navigation of the Internet (or of his private intranet) with the browser, also known as content-based navigation. It can dynamically bring together links to many other services relevant to achieving that goal. As a result, these other services are one click away from the user's current web location. The system then facilitates the user's interaction with these other services in order to allow the user to progress toward his goal. By virtue of being goal-oriented, the invention simultaneously provides a powerful new way for service providers to reach targeted users, i.e., a single place to reach users based on their mind set rather than location on the Internet.

The browser plug-in or other implementation of the system of the present invention is set up with contextual value chains that are not site specific. Instead, they are collections of logical service that the system operator has determined are related to a wide variety of Internet navigational goals as well as an understanding of the many sites that provide each such service. This determination may be based on the system manager's independent assessment or on affiliate relationships. The contextual value chain is supported by "context inference" which allows the browser to infer the goal of the user from the URL from keywords that appear in the content of web pages and the structural relationship of these keywords, and/or from search terms that the user plugs in, and to suggest that goal to the user for selection. If the user selects one of the suggested goals, they are diverted to the value chain which has been established in the system. In addition, the system can generate income for its operator based on "context marketing" in which the opportunity to market products and services may be directed to users based on the goal of their Internet navigation as inferred by the context of their activity.

The present invention allows companies to provide contextually targeted advertisements and affiliate links to Internet and Intranet users. Because the invention enables a contextual understanding of a customer's current online activities and of the objects on the page the customer is currently viewing, a company participating in the system can pick the most contextually relevant advertisement or affiliate link to present to the user. As a result companies that use the present invention will profit from significantly increasing revenues and click-through rates by establishing a high correlation between the advertisement or affiliate links being served and the user's current mind set. Furthermore, these advertisements and affiliate links can be targeted to the actual product and product characteristics mentioned on the user's browser or the web page the user is currently viewing. This detailed understanding can also enable companies to realize revenues from cross sell and up sell opportunities.

In addition, the technological infrastructure of the present invention creates channels for service providers to reach existing customers at the time and place where they most need the service(s). In particular, the technological infrastructure not only enables a contextual understanding of a customer's current online activities and of the objects on the page the customer is currently viewing, but it has the ability to automatically link previously visited sites to the relevant value chains. This allows the system to inform the customer of relevant services that the customer has used in the past from a particular service provider, thus improving the service provider's ability to generate repeat consumption of their services by previous online customers.

Companies that utilize the system of the present invention will profit from strengthening their relationships with existing customers by reminding them of their relevant services that have been used in the past. These companies will also increase brand awareness and loyalty by being accessible one click away from anywhere on the Internet. Further, by understanding the context of the customer's Web navigation, these companies can automatically alert customers to new services and changes in existing services when those services would be most useful to the customer's current use of the Internet.

BRIEF DESCRIPTION OF THE DRAWINGS

The foregoing and other features of the present invention will be more readily apparent from the following detailed description and drawings of an illustrative embodiment of the invention in which.

DESCRIPTION OF AN EXEMPLARY EMBODIMENT OF THE INVENTION

Figure 1:
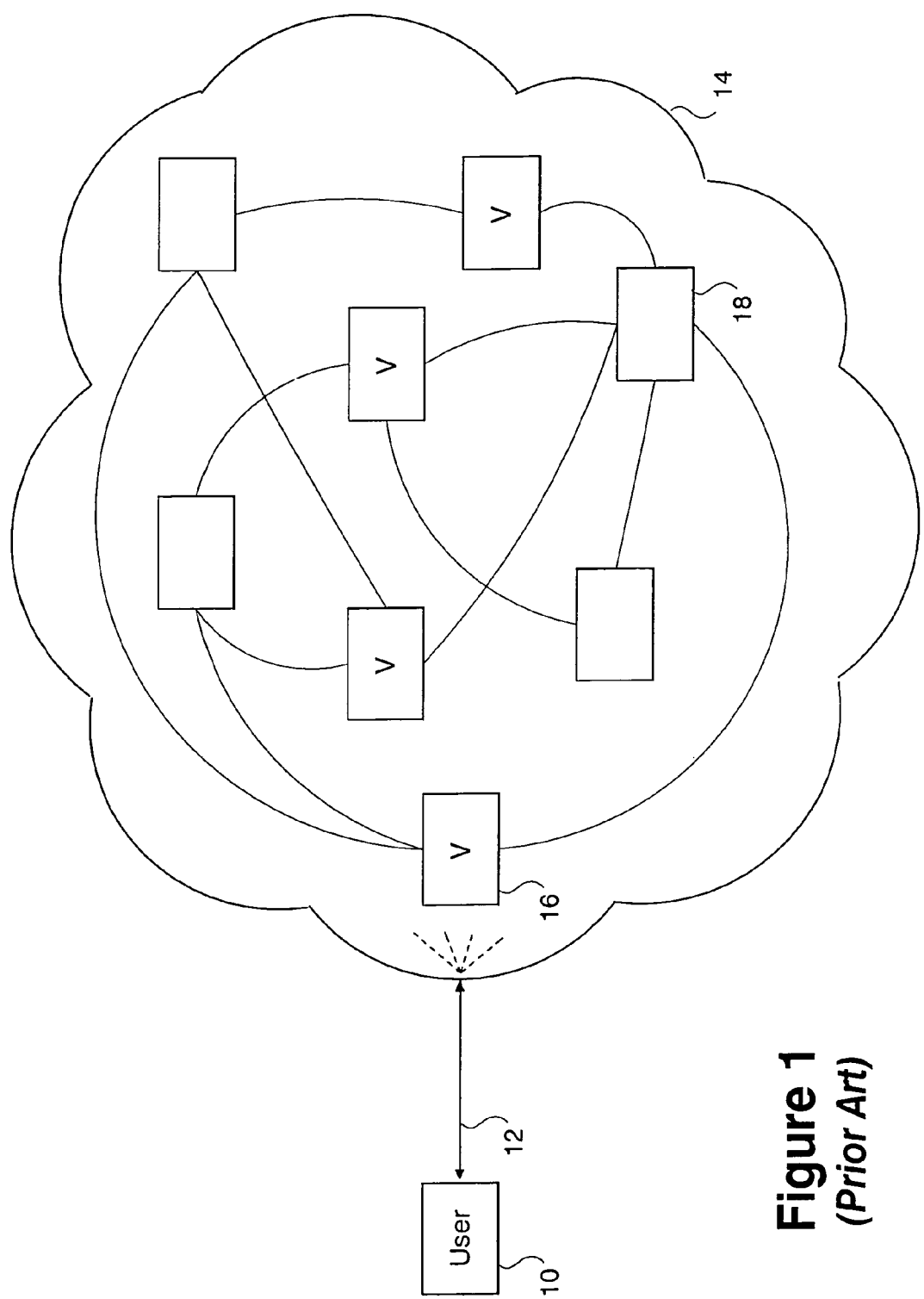
FIG. 1 is a schematic diagram of prior art Internet navigation.
Figure 2:
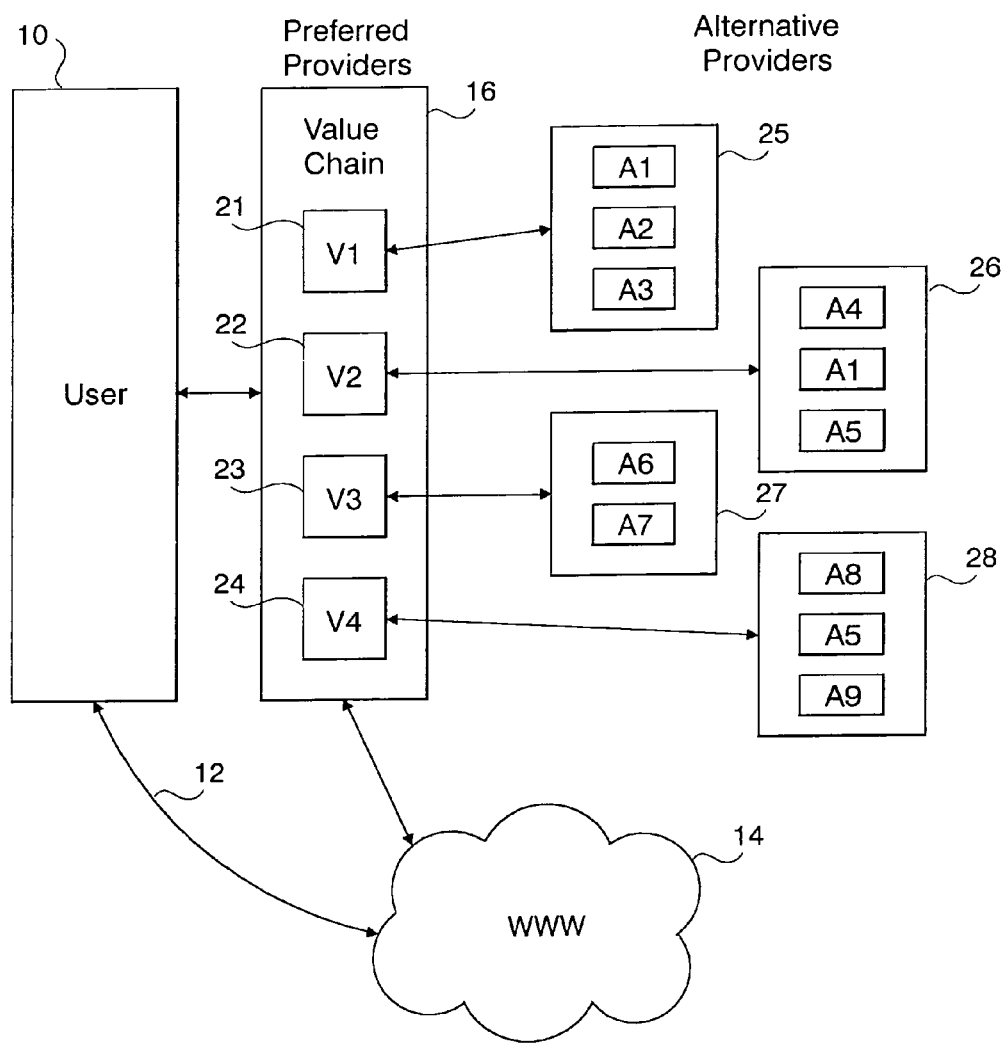
FIG. 2 is a schematic diagram of a prior art site specific value chain.

The Contextual Value Chain provided by the system and method of the present invention is designed for offering users a high-value suite of contextual services independent of the site on the Internet they are visiting. Once it has been set up, providing, the contextual services burdens neither users nor service providers with the maintenance and application of these value chains. The value chain of services may be constructed in real time and/or it can be carried out prior to use.

The present invention may be embodied in part or in whole as a plug-in to the user's web browser; but, it can also have other manifestations. It is made complementary to, or to facilitate the user's current online goal or objective (e.g., a navigational path for information about and the purchase of a product) and as such supports a content-based navigation paradigm.

The system requires a Services Registry, which is a data store that identifies a set of unique services known or identified as part of a typical user goal. The registry maps each service to a representative set of known providers of that service. For example, below is a simplified illustration of the concept of a Services Registry:

| SERVICE | PROVIDER |
|---|---|
| Book seller | Amazon.com |
| Book seller | Barnesandnoble.com |
| Book seller | 1bookstreet.com |
| Music seller | Amazon.com |
| Music seller | CDNow.com |
| Music seller | MP3.com |
| Electronics reviewer | Cnet |
| Electronics reviewer | Amazon.com |
| Electronics reviewer | ZDNet |

The system further requires a Mind-set Registry, which is a data store that records unique mind set categories—or goals—into which users tend to fall while they are using the services. These mind set categories are derived from the notion that users seek out and use services in order to accomplish a goal; the mind sets of looking to accomplish these goals are what are categorized and recorded in this registry. This registry also maps each goal to a super set of services that tend to be relevant to users looking to accomplish that goal. For example the following is a simplified illustration of the concept of this registry:

| GOAL | SERVICE |
|---|---|
| Buy a computer | Computer seller |
| Buy a computer | Price comparison engine |
| Buy a computer | Computer user reviews publisher |
| Buy a computer | Auctioneer |
| Buy a computer | Internet Service Provider |
| See a movie | Movie ticket seller |
| See a movie | Movie reviewer |
| See a movie | Movie trailer publisher |

Note that the Mind-set Registry is also intended to be, but does not need to be, the following:
accessible via automated processes, such as electronic databases
edited by human experts
edited explicitly and/or implicitly by user communities (implicit editing would be those new associations inferred by automated processes that are able to accompany users while they access the services)
edited by automatic discovery systems Further, the system requires a Registry Editor that has the ability to create, read, update, and delete listings in a registry (either the Mind-set Registry or the Services Registry). Note that a Registry Editor may be either a person or an automated tool, or a combination.

Finally, the system needs a Match Maker, which is responsible for matching user mind sets (goals) with a collection of services and service providers. In order to do this, it communicates with users, a Services Registry, and a Mind-set Registry. Note also that the Match Maker is intended to take the form of automated software, though it might also take other forms such as one or more people, or a combination of people and automated technology tools. It is also intended to have, but need not have, the following capabilities:

Rank services and service providers according to their priorities and/or appropriateness to that user at that time
Apply rules to the context of that user, his or her mind set, and the collection of services and service providers. These rules include, but are not limited to, identifying cross-selling opportunities and up-selling opportunities.

In a given contextual domain there will be a collection of users, a collection of known services and service providers, and a single Mind-set Registry, Services Registry, and Match Maker.

Figure 3:
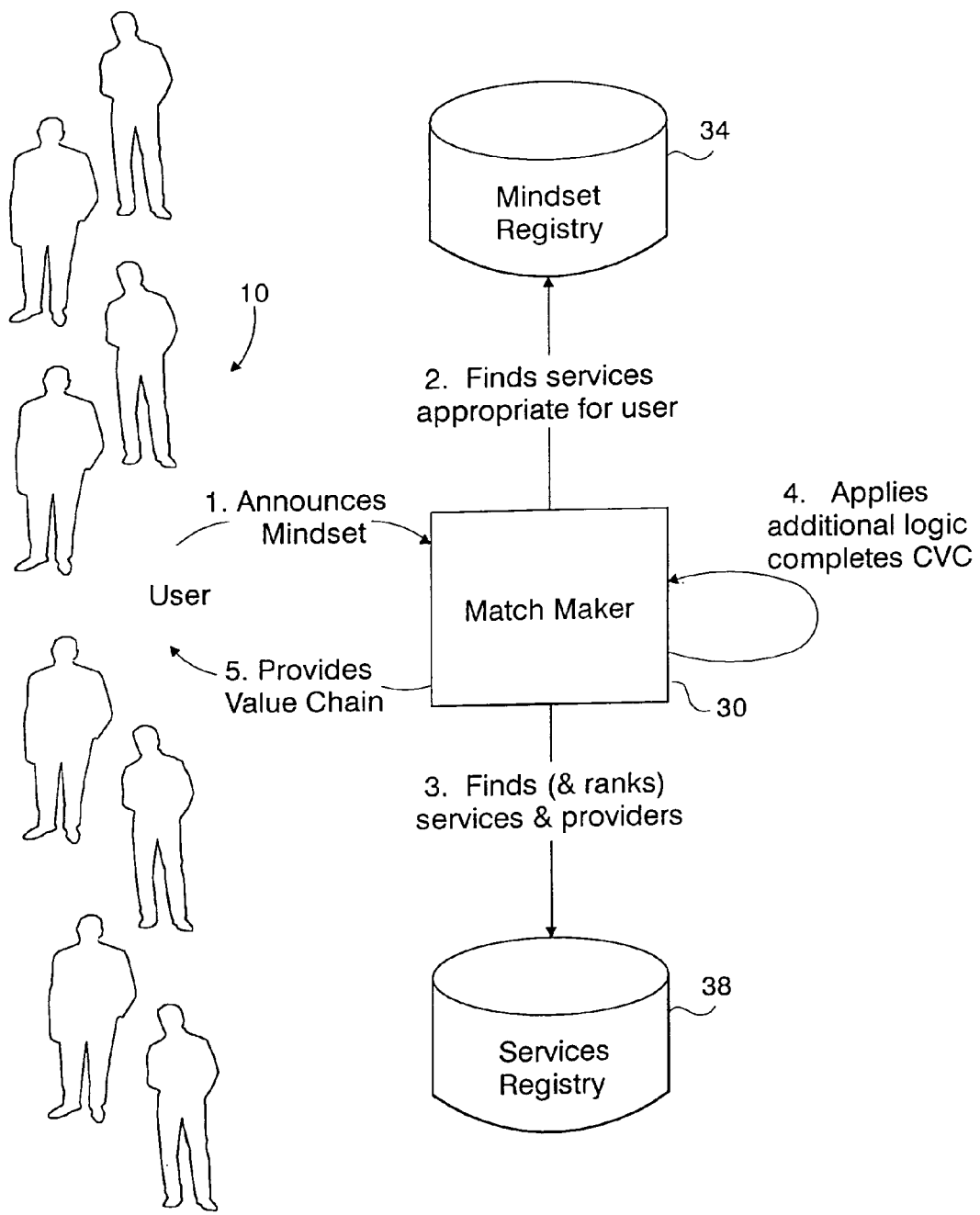
FIG. 3 is a schematic diagram of the construction of a contextual value chain according to the present invention.

The process of constructing a Contextual Value Chain ("CVC") requires interaction between a single user and the Match Maker, between the Match Maker and the two Registries, and also private work done by the Match Maker itself as illustrated in FIG. 3. The process begins when the User 10 announces his mind set to the Match Maker 30 and completes when the Match Maker delivers the CVC back to the user. In particular, the process is as follows:

1. The User 10 announces his or her current mind set to the Match Maker 30. This "announcement" can be either explicitly made by the user or implicitly made on behalf of the user via a surrogate, like an automated inference tool that accompanies the user while navigating. This "mind-set" is intended to take the form of a goal, but is not limited to that form (for example, the mind-set of looking to buy a computer, or the mind set of looking to plan a party). An explicit mind set may be in the form of a URL, a stated goal, or Search term entered into the User's web browser, e.g., Compaq.com or "computer." It may also be implicit, e.g., an Amazon.com URL implies the user is interested in, i.e., has a mind set directed to, the purchase of books. Also, the Compaq.com URL may be interpreted not as an explicit mind-set to purchase a Compaq computer, but an implicit mind-set to purchase a computer in general. Furthermore, by examining the content delivered to users (e.g. via web pages) and by extracting relevant keywords and structured objects composed of these keywords, the Match Maker 30 can that much more accurately infer likely mind sets and goals with specificity and via a scalable means.

2. The Match Maker 30 cross-references the user's mind set with the Mind-set Registry 34 to determine the set of known services that are appropriate to include in the CVC. The Match Maker 30 may also apply a set of rules to re-order and/or filter the set of services.

3. The Match Maker cross-references the set of services with the Services Registry 38 to determine the known service providers of each of those services. The Match Maker may also apply a set of rules to re-order and/or filter the set of service providers associated with each service.

4. The Match Maker may apply a set of rules to add special enhancements to the CVC, such as cross-selling promotions, and then the Match Maker completes the construction of the CVC (the list of services and the list of service providers for each service, including additional custom services or promotions).

5. The Match Maker 30 provides the CVC to the User 10. This "providing" is intended to be implemented by sending the CVC encoded to a tool, such as, but not limited to, a software tool that decodes the CVC and displays it to the user via a graphical user-interface (GUI) or other user interface. For example, if the user's mind set is to buy a computer, the CVC contents might look like this:

S1. Compare computer prices
  SP1. MySimon
  SP2. DealTime
  SP3 . . . .
S2. Read user reviews
  SP1. Cnet
  SP2. Deja
  SP3 . . . .
S3. Find an ISP
  SP1. AOL
  SP2. Earthlink
  SP3. MSN
  SP4 . . . .
SP4 . . . .

The databases and application software that make up the Match Maker 30, the Mind set Registry 34 and the Services Registry 38 may be in the form of a plug-in to the User's browser. Periodically database contents can be updated by having the browser connect to an Internet site of a company managing the system. During this connection the site provides the system with current versions of the data. The current versions may include new rules, new goals or mind sets and new services and service providers. As an alternative, the databases may be maintained at the system manager web site and the browser is directed to it for access to the latest data whenever the browser is used.

Figure 4:
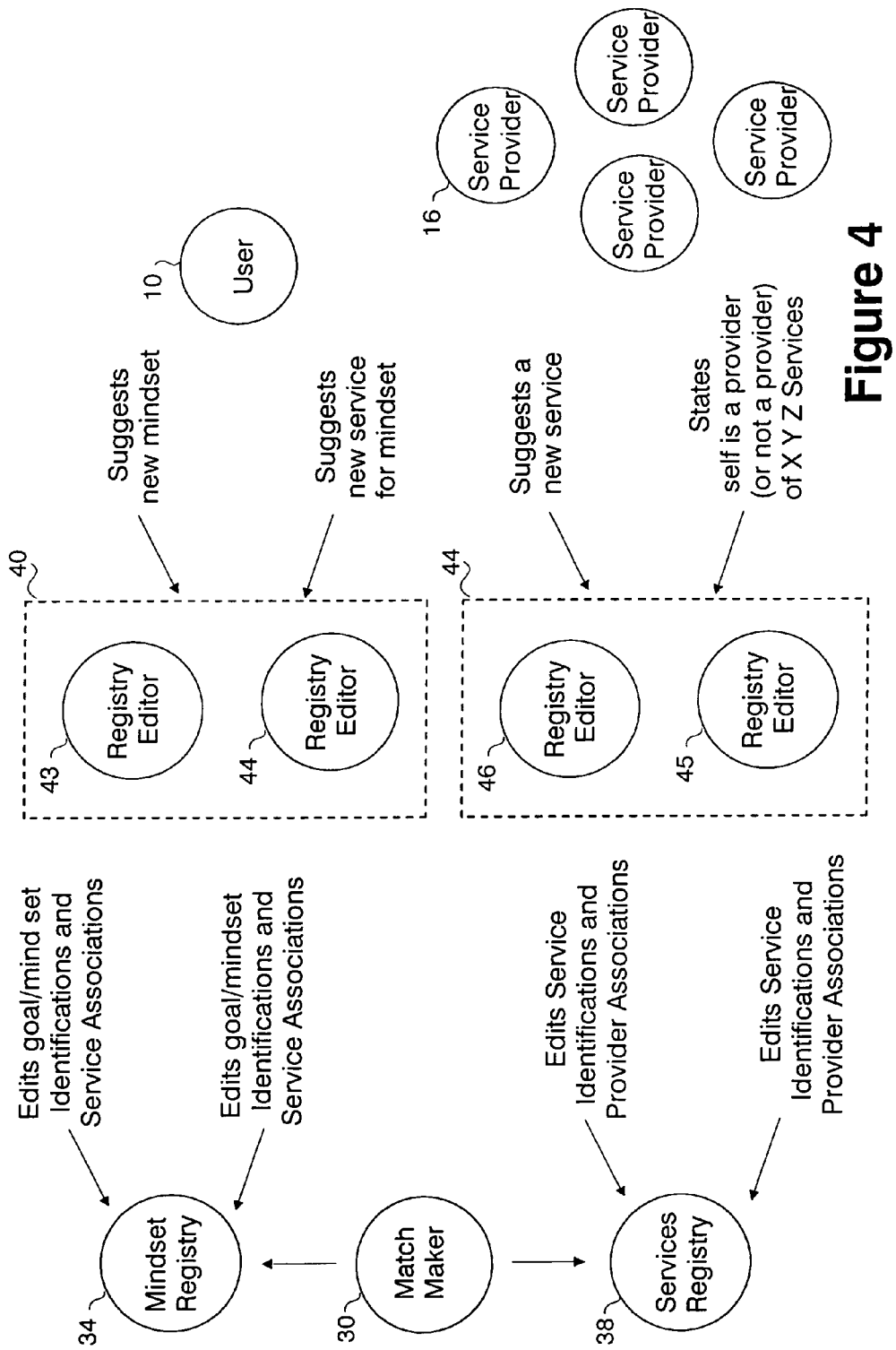
FIG. 4 is a schematic diagram of the maintenance of registries for a contextual value chain according to an aspect of the present invention.
Figure 5A:
FIGS. 5-9 are a sequence of illustrations of a user's screen, using one of a multitude of possible user interfaces, while navigating the Internet using the contextual value chain of the present invention.
Figure 5B:
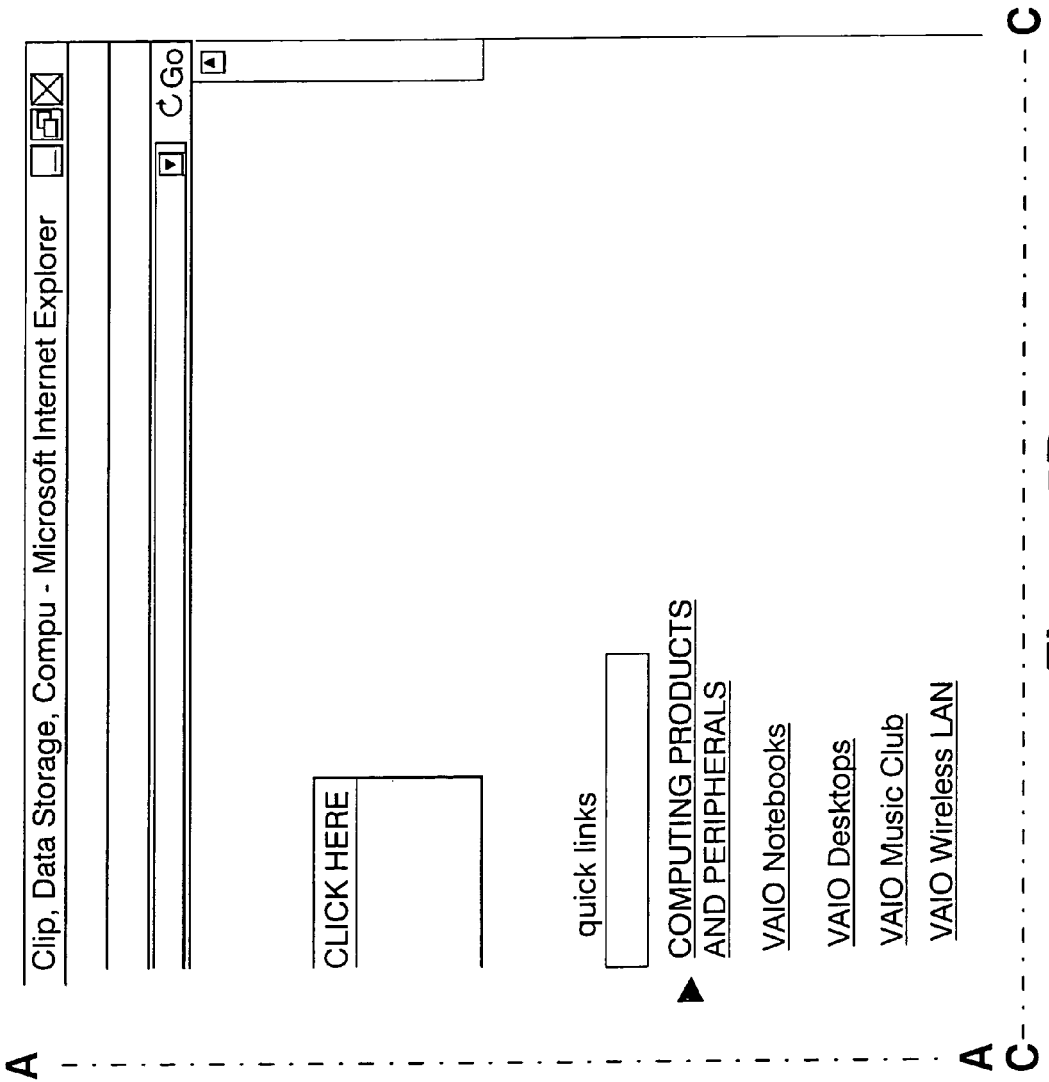
Figure 5C:
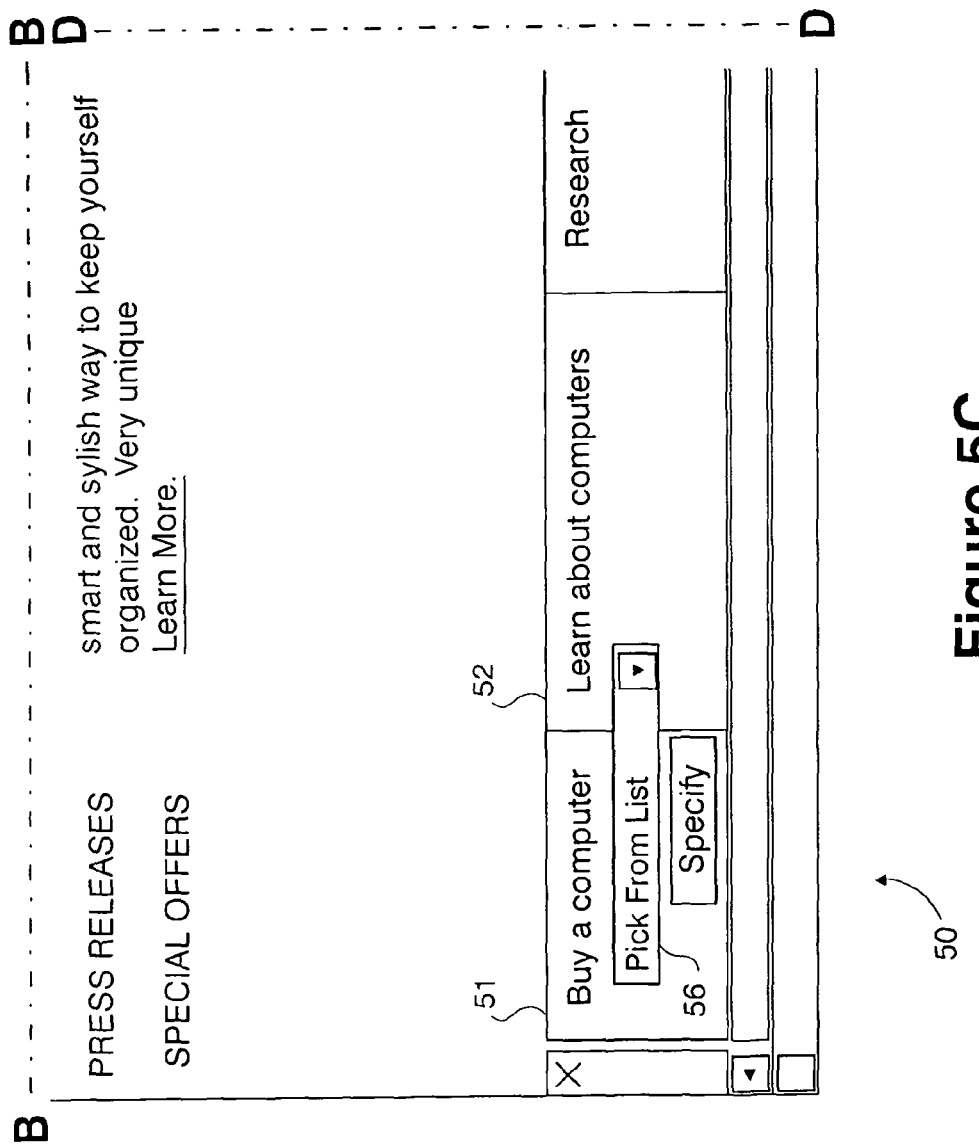
Figure 5D:
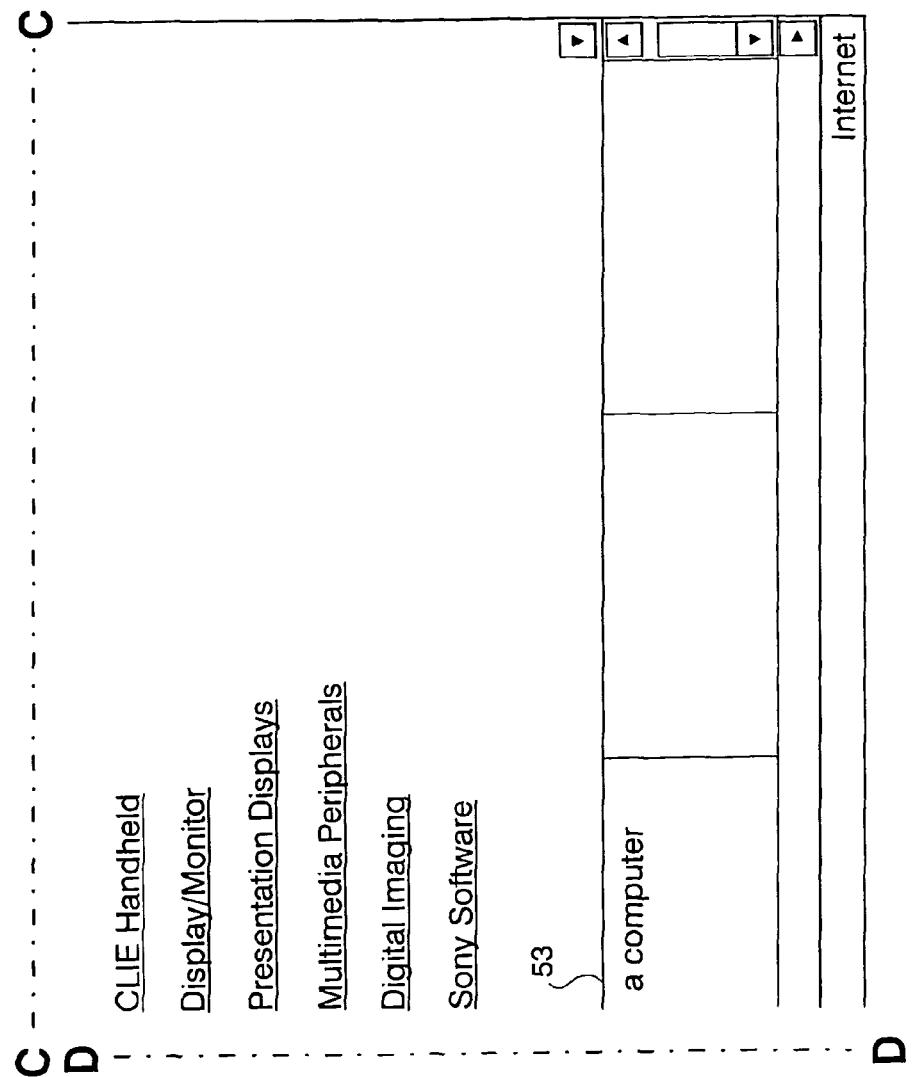
Figure 6A:
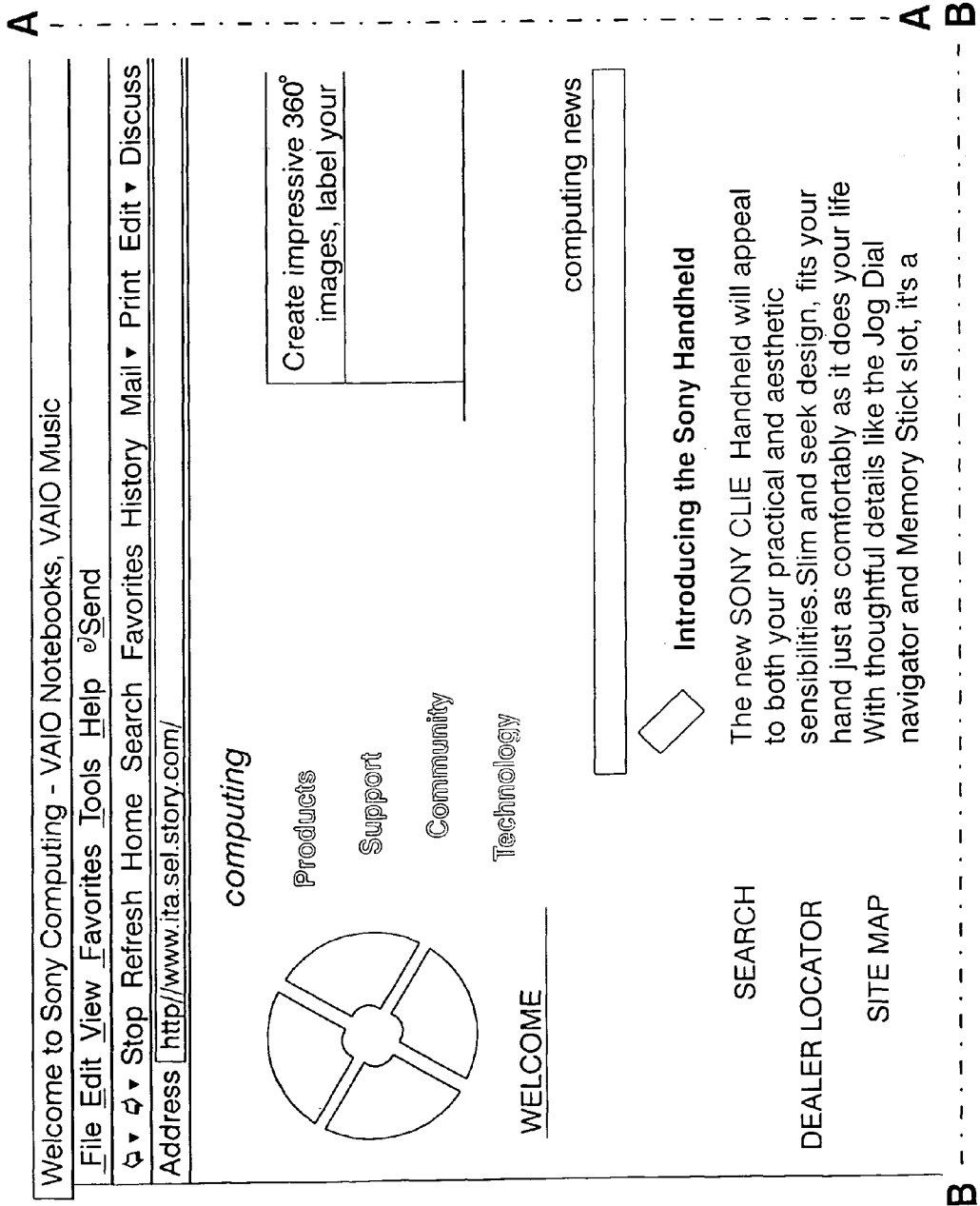
Figure 6B:
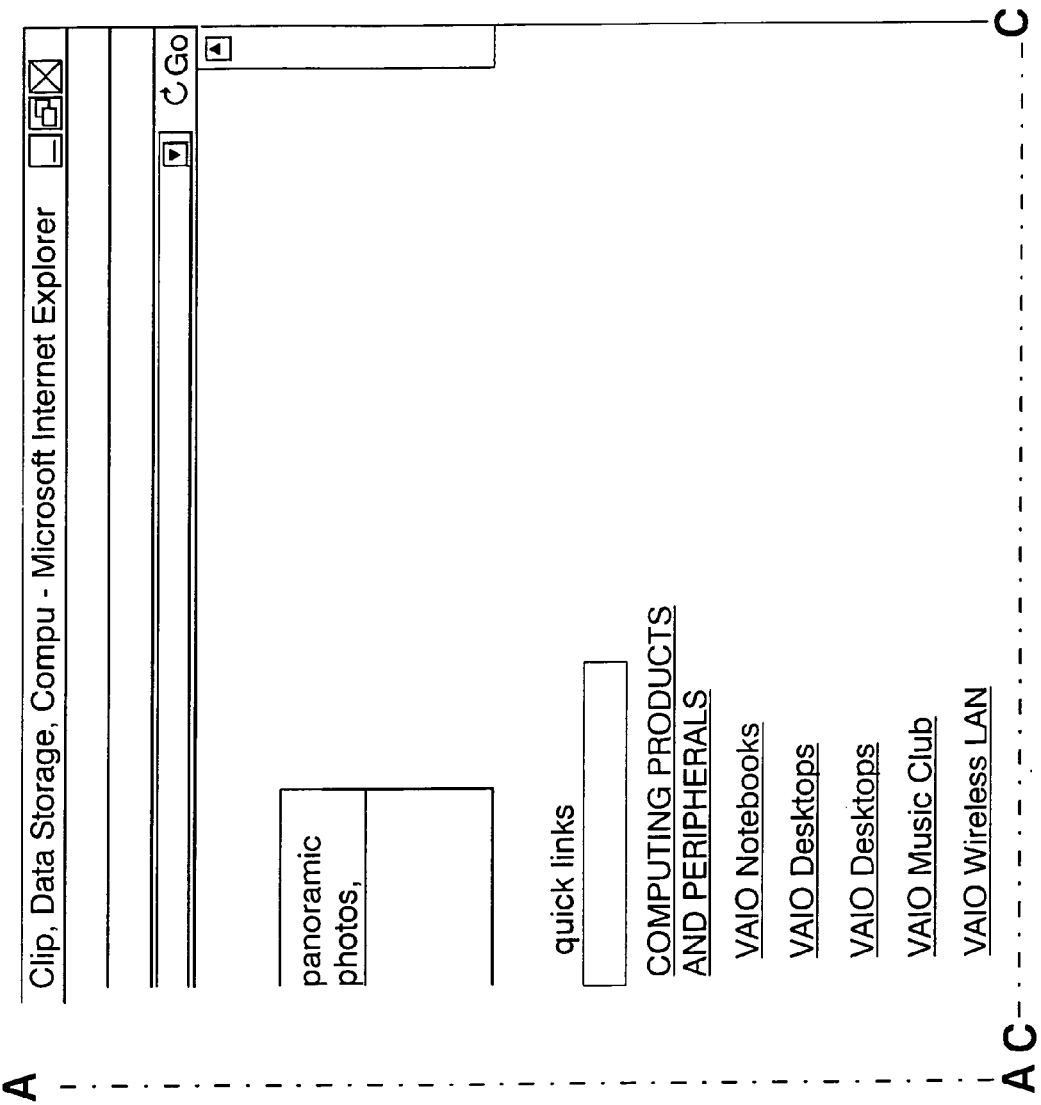
Figure 6C:
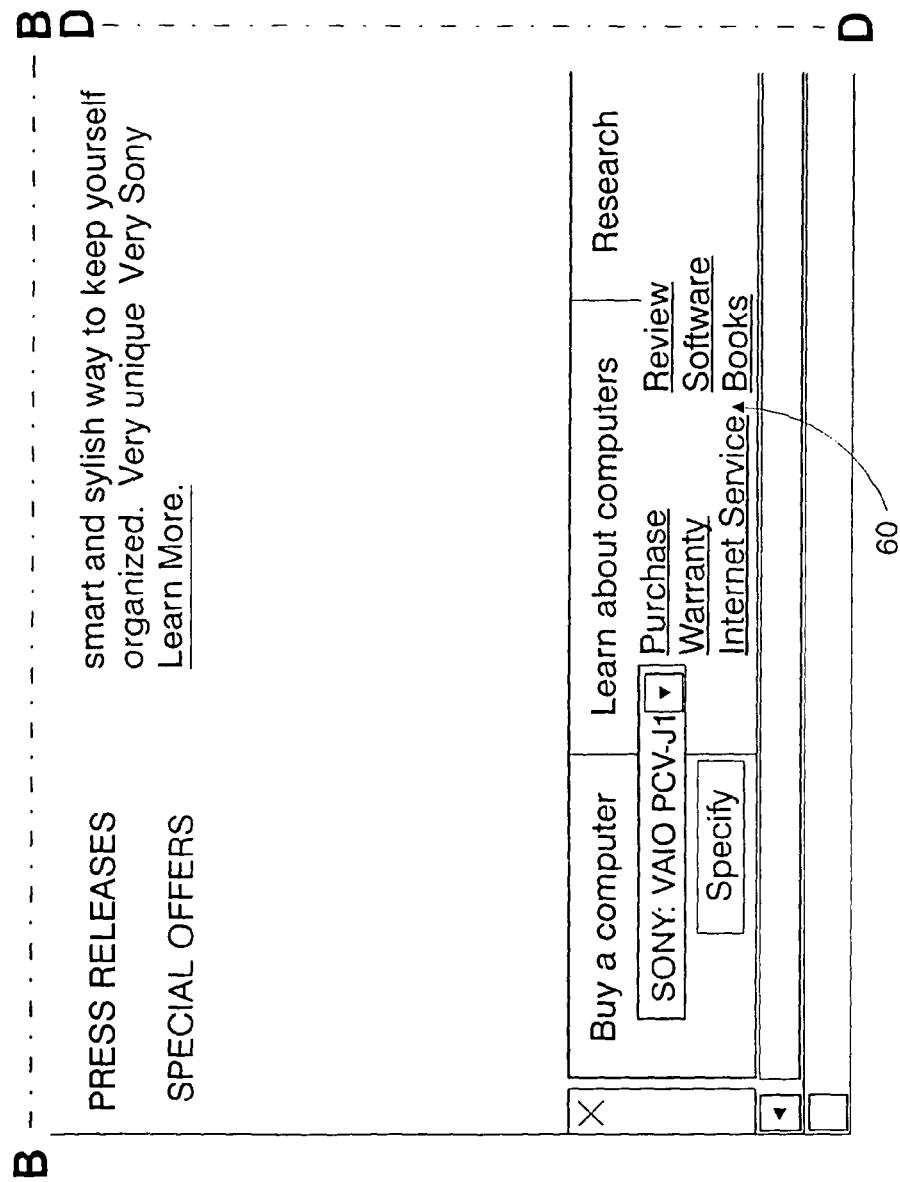
Figure 6D:
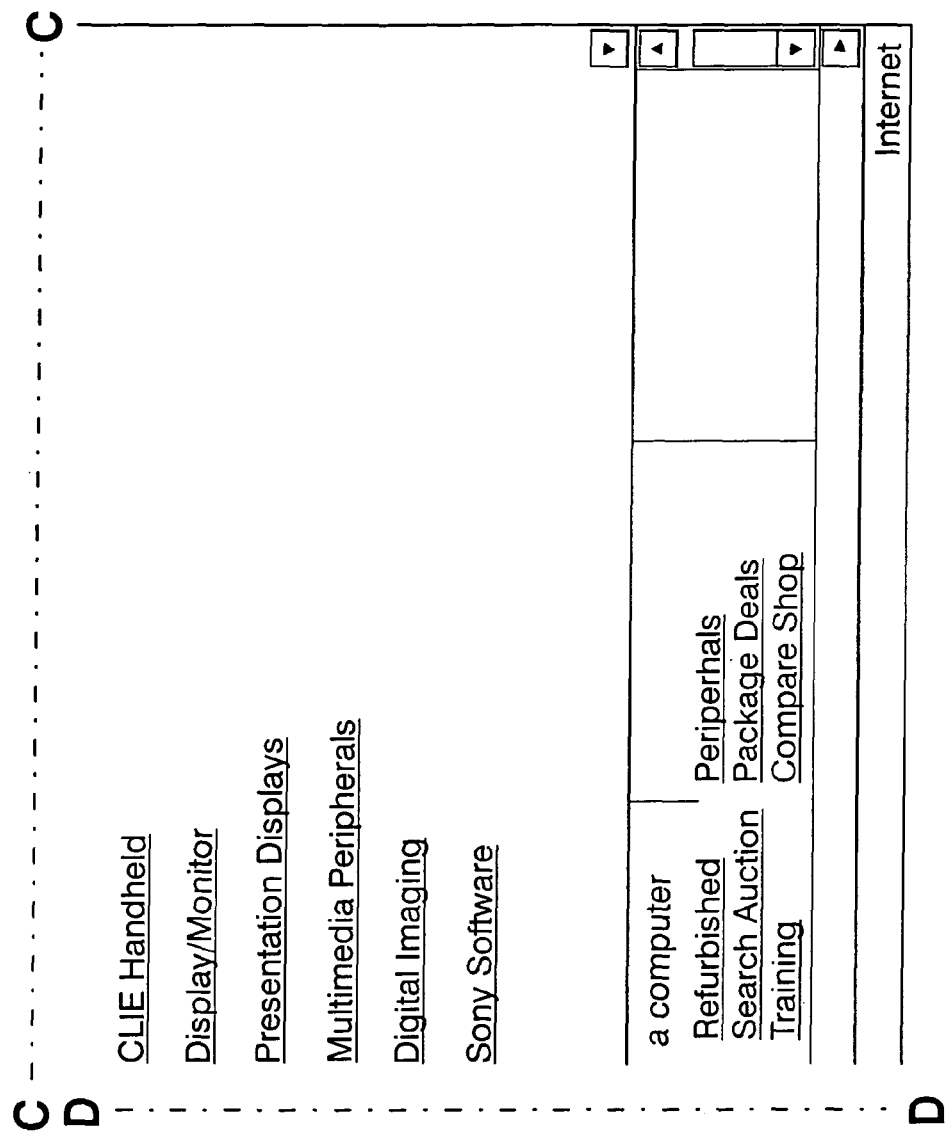
Figure 7A:
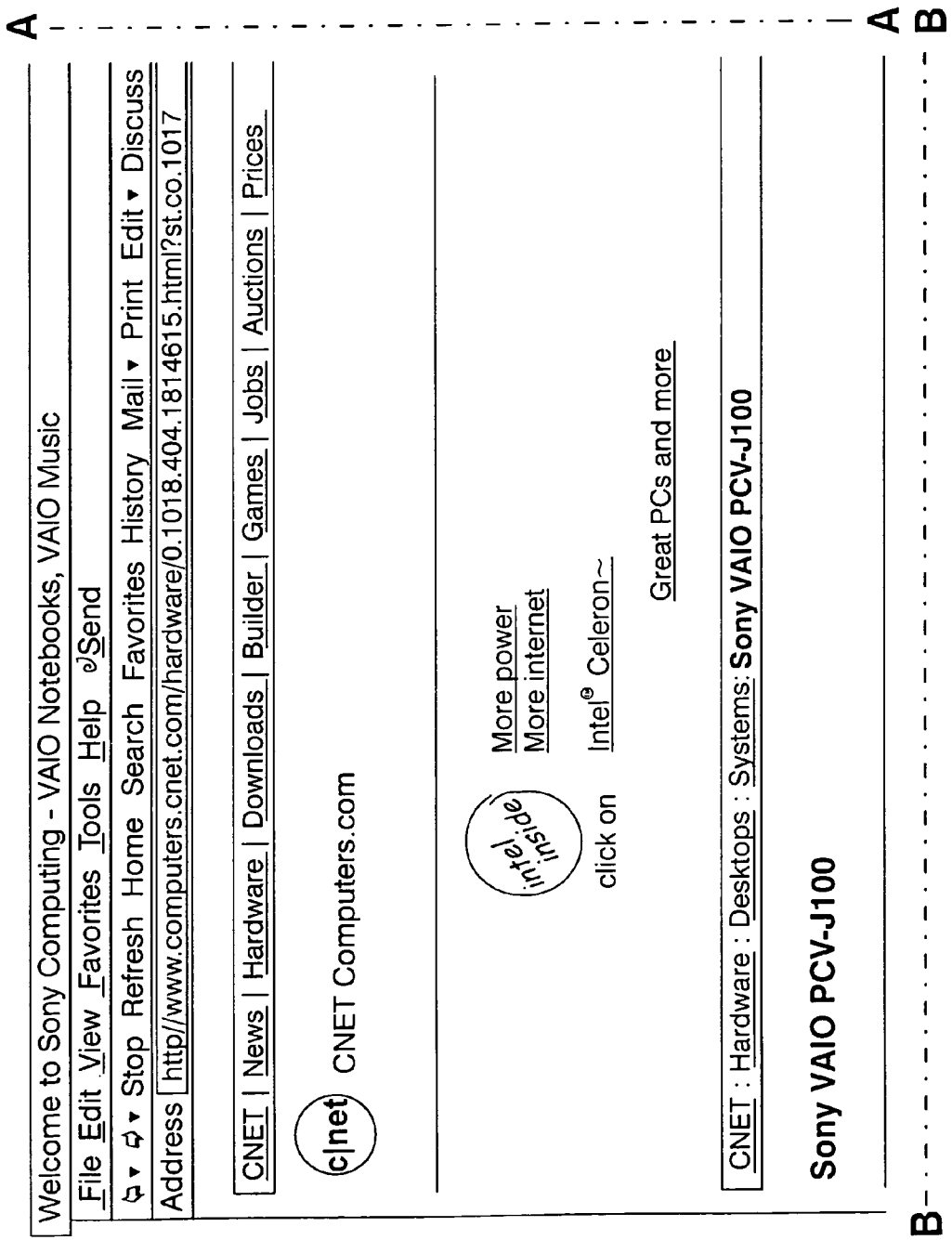
Figure 7B:
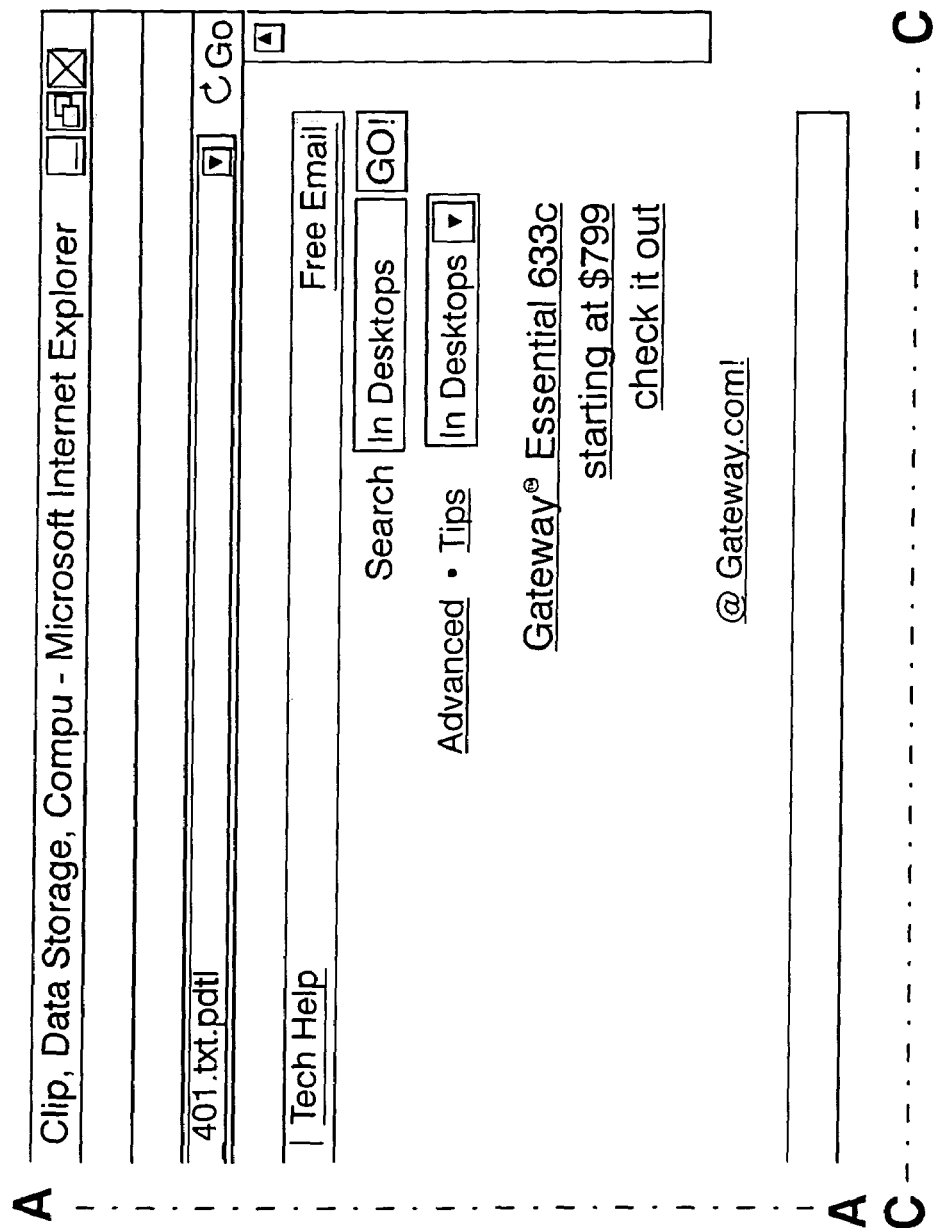
Figure 7C:
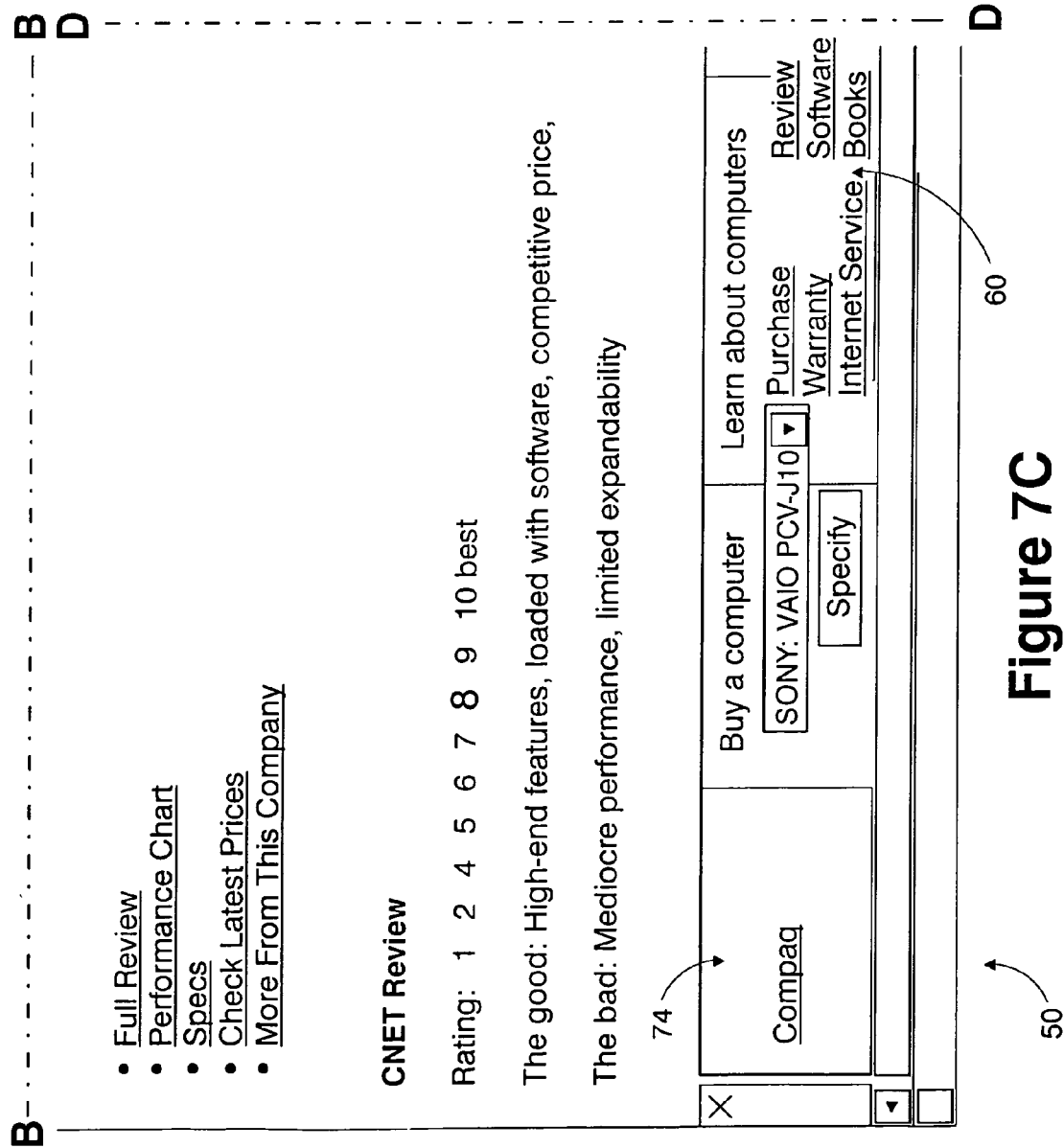
Figure 7D:
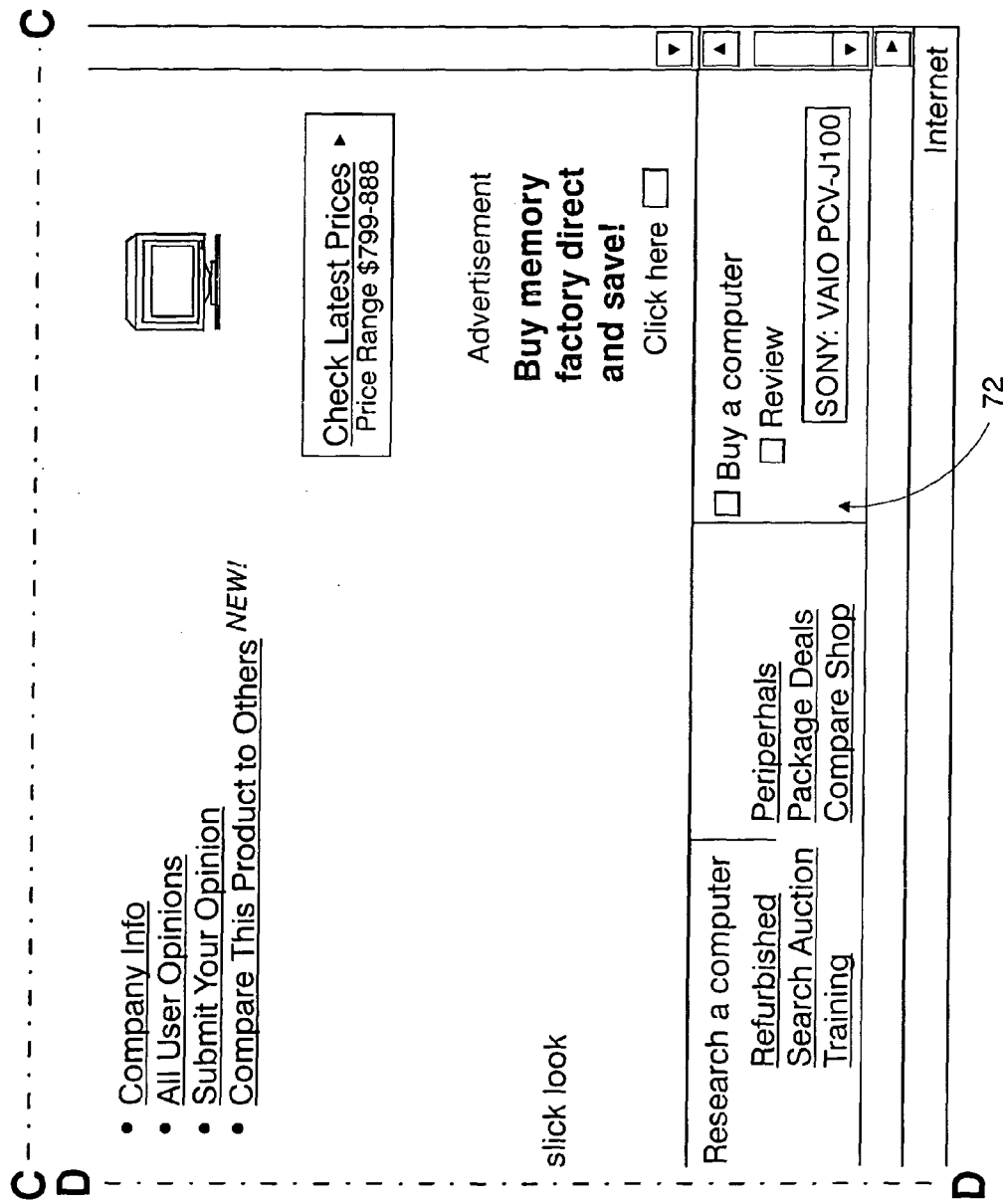
Figure 8A:
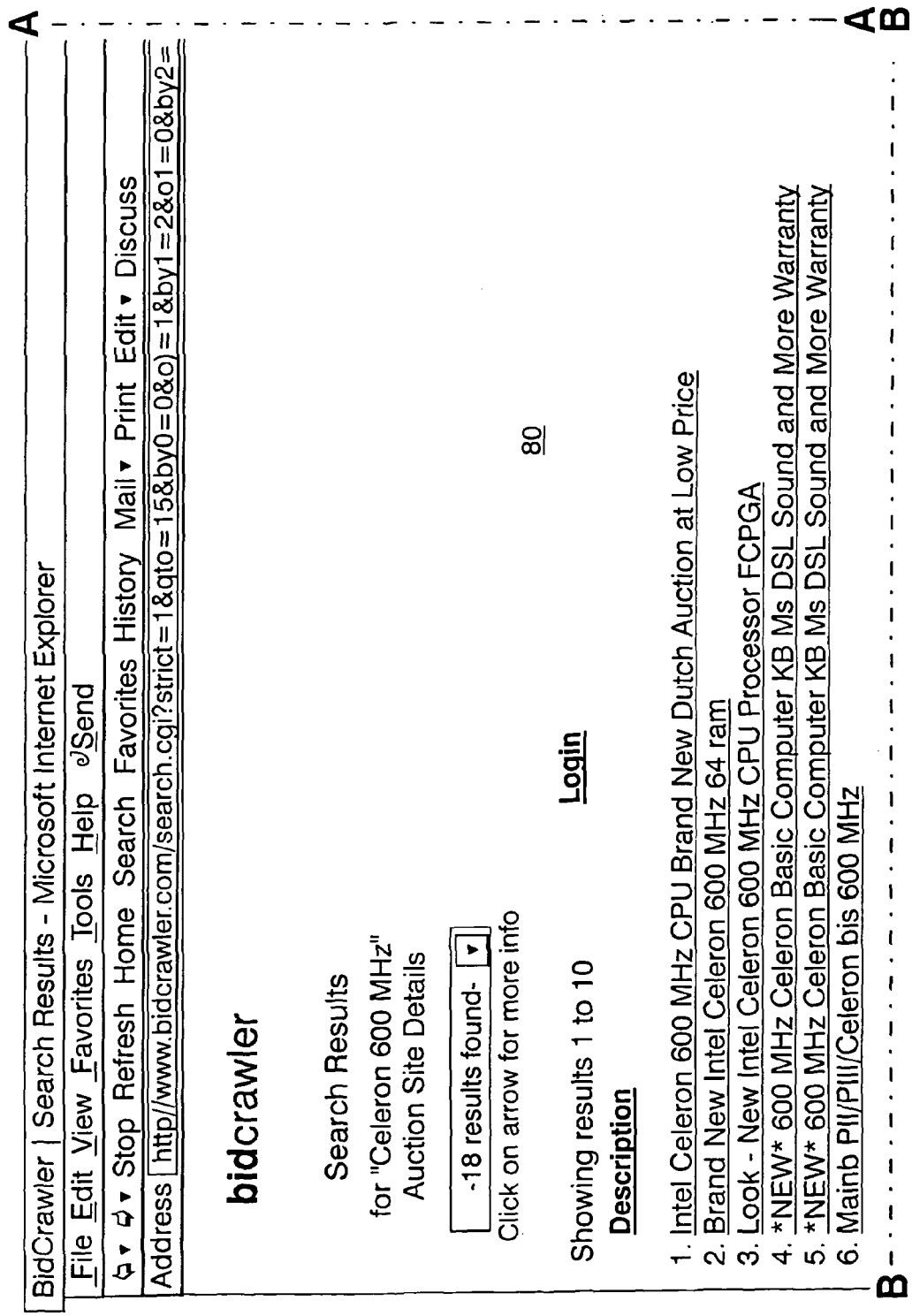
Figure 8B:
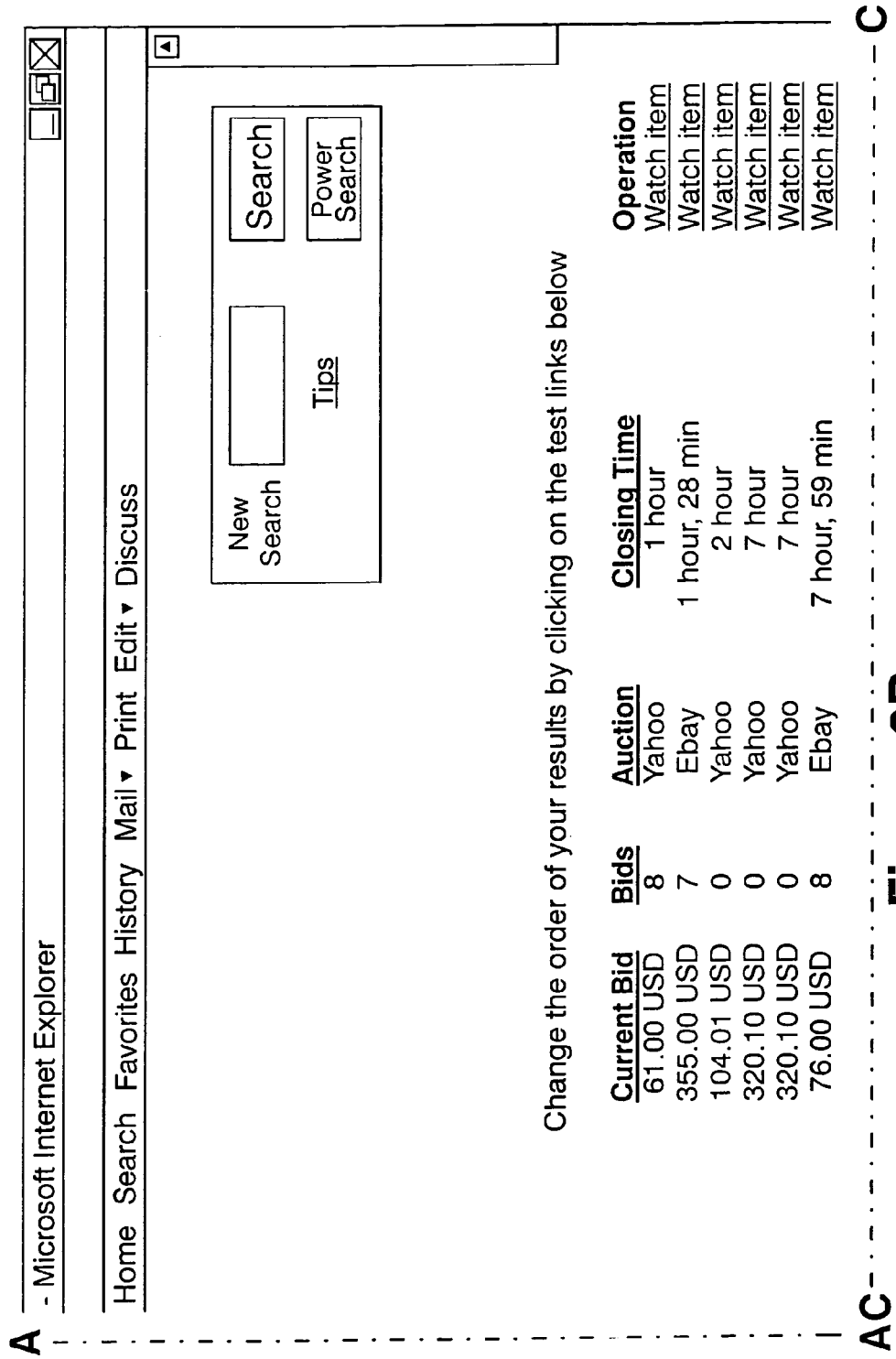
Figure 8C:
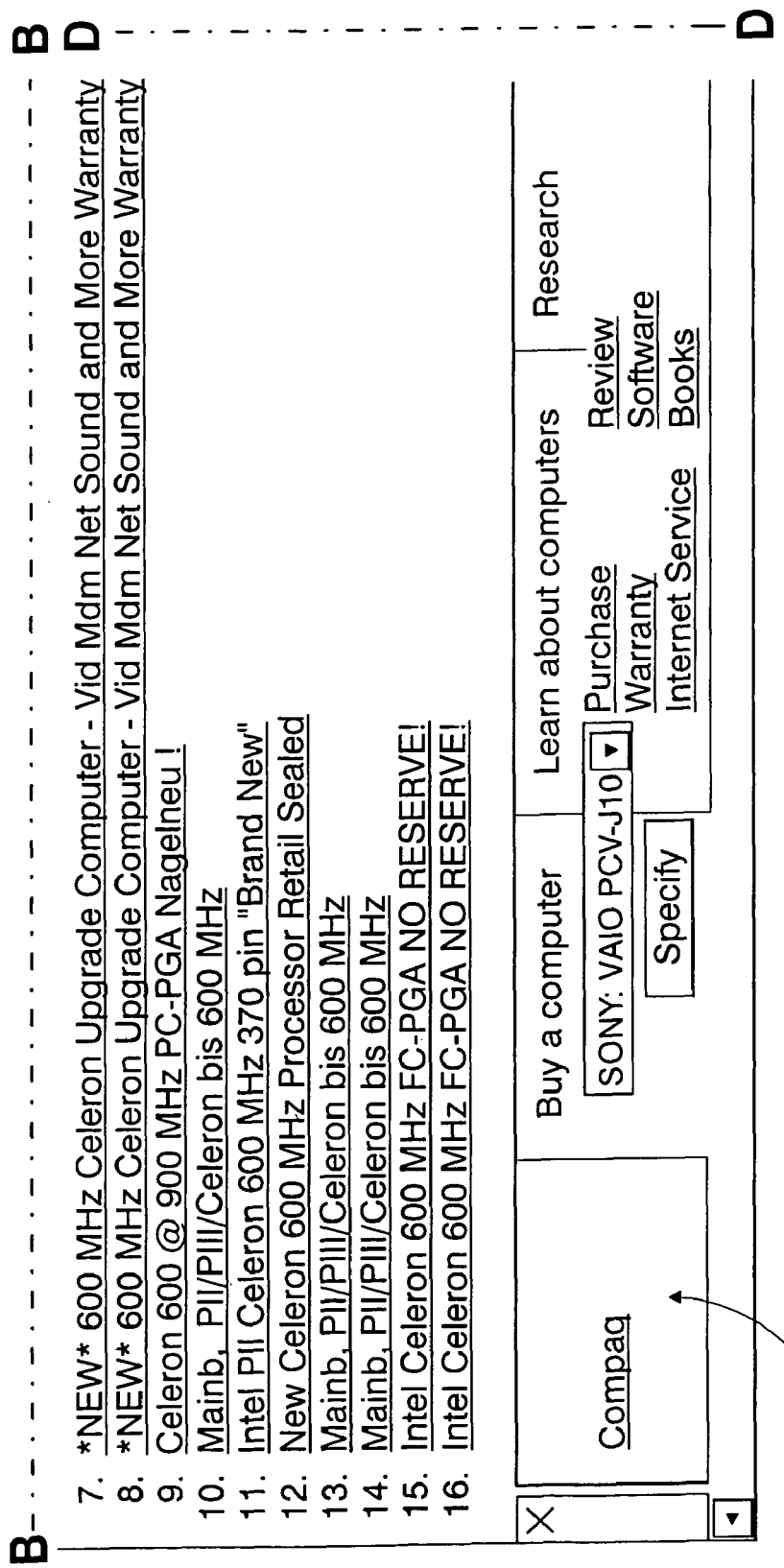
Figure 8D:
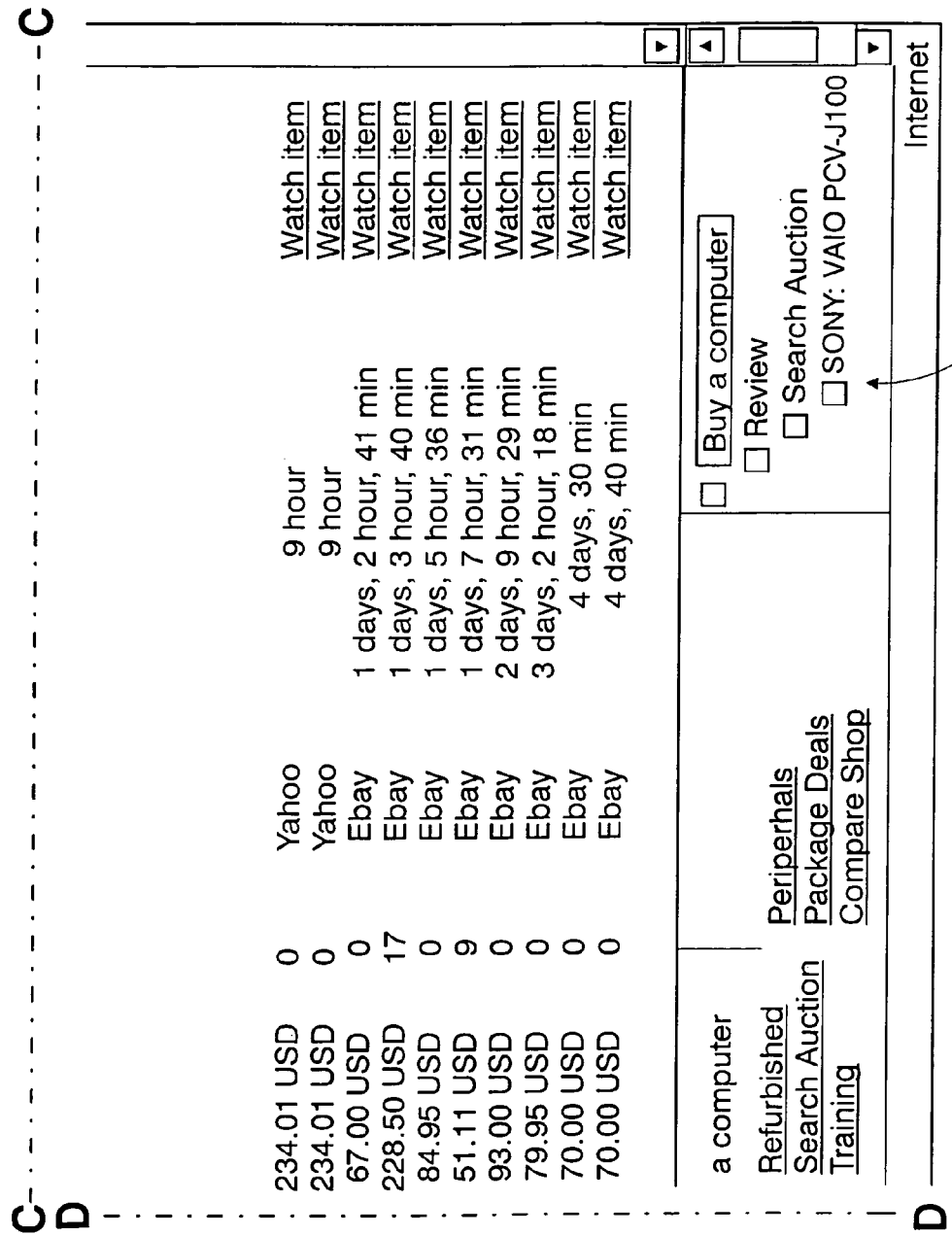
Figure 9A:
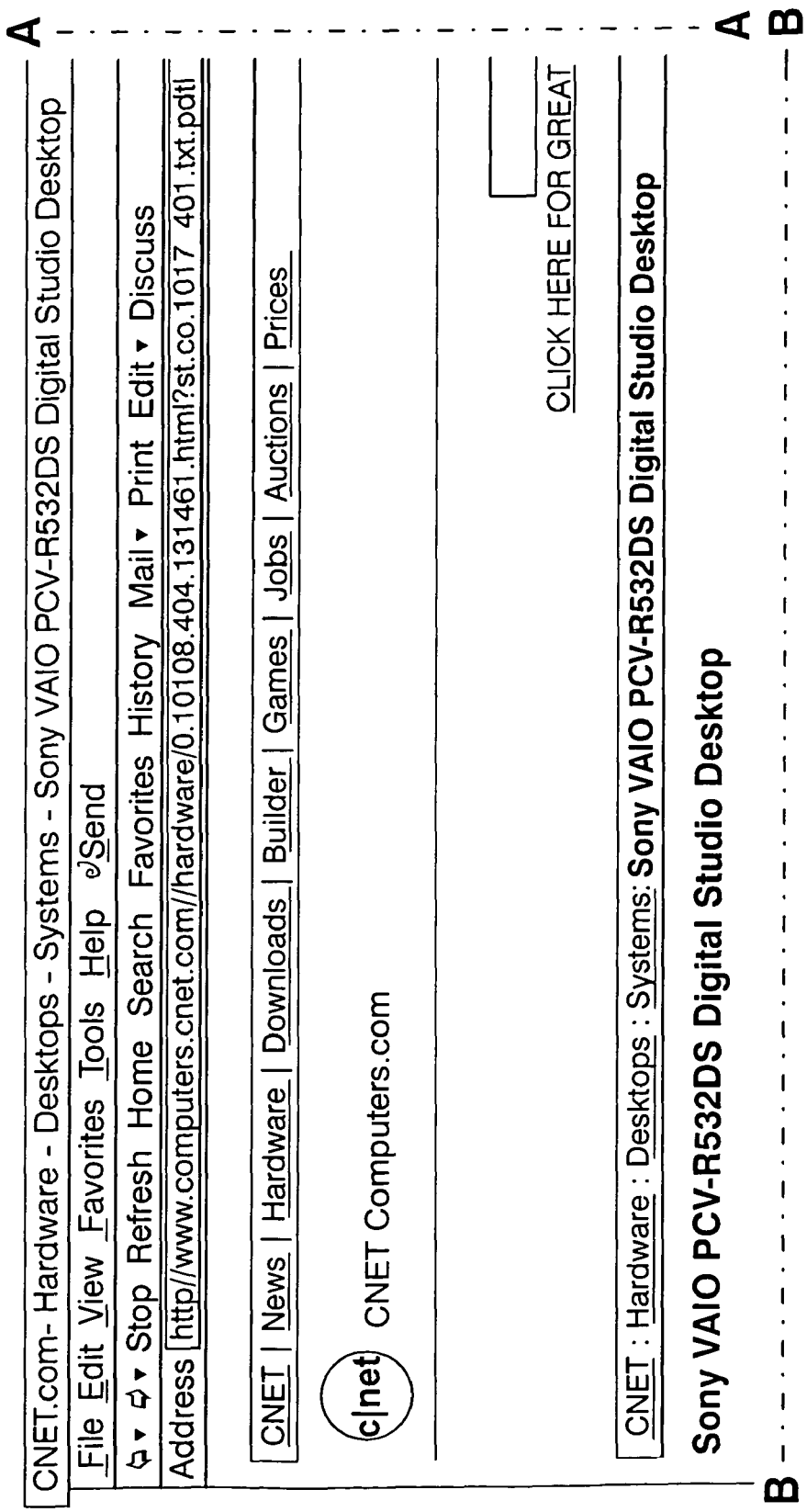
Figure 9B:
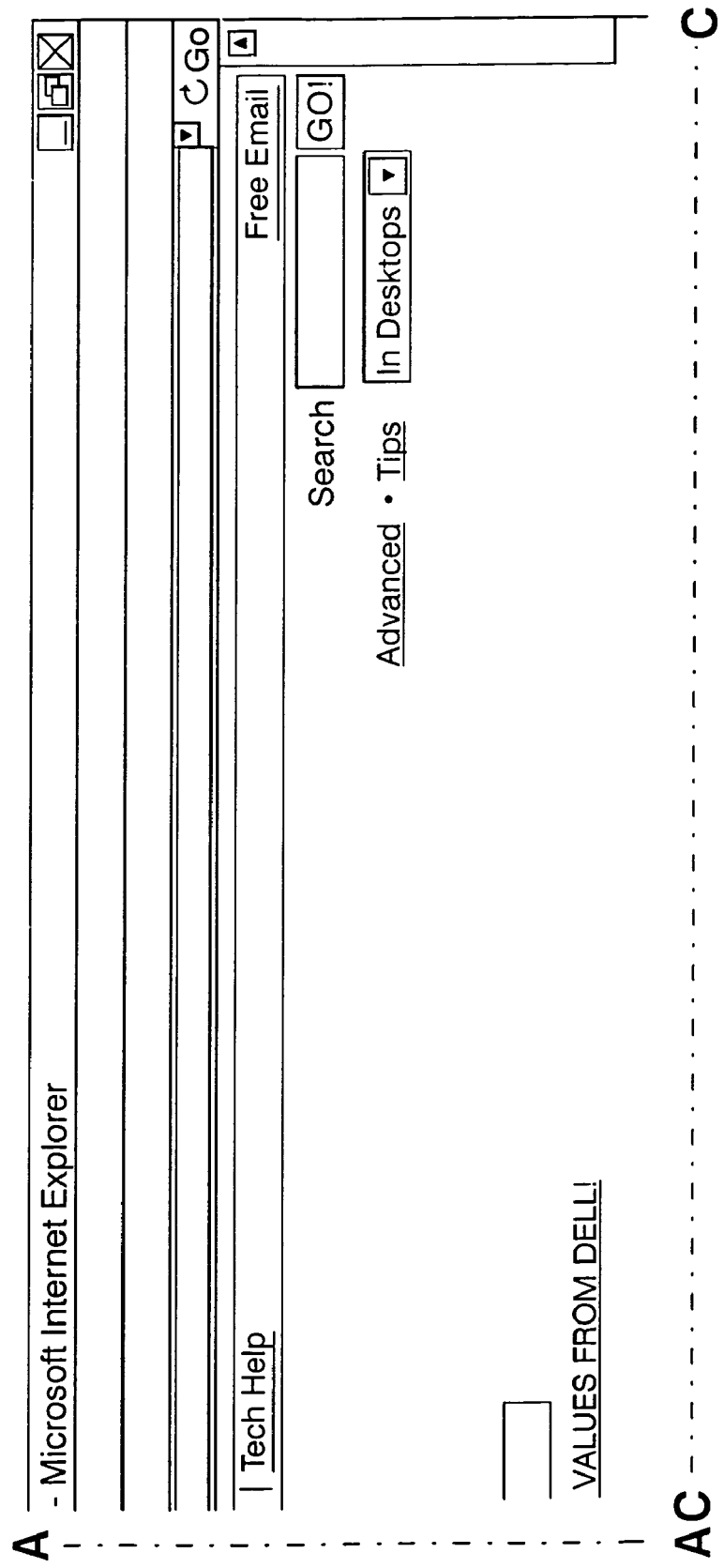
Figure 9C:
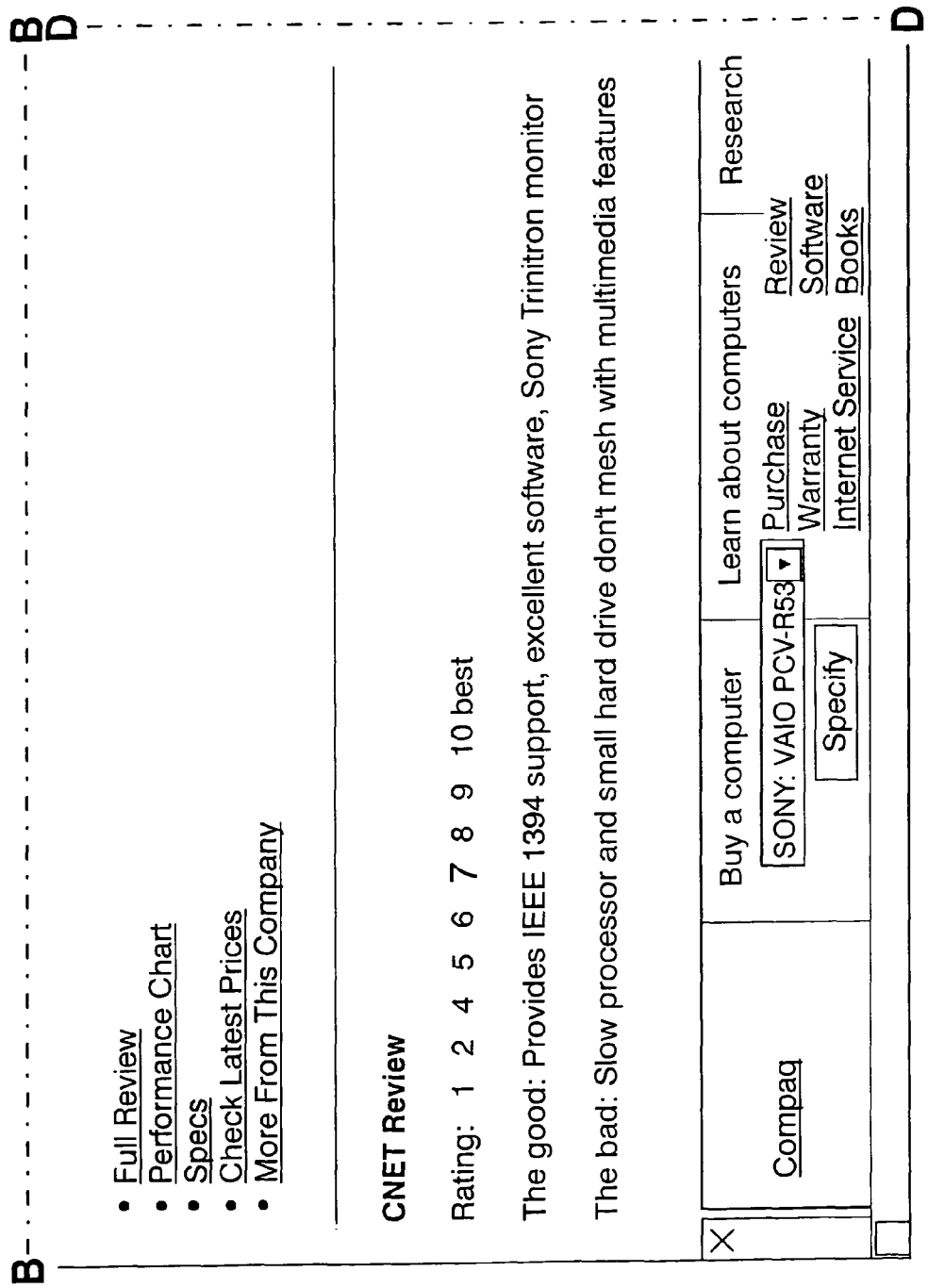
Figure 9D:
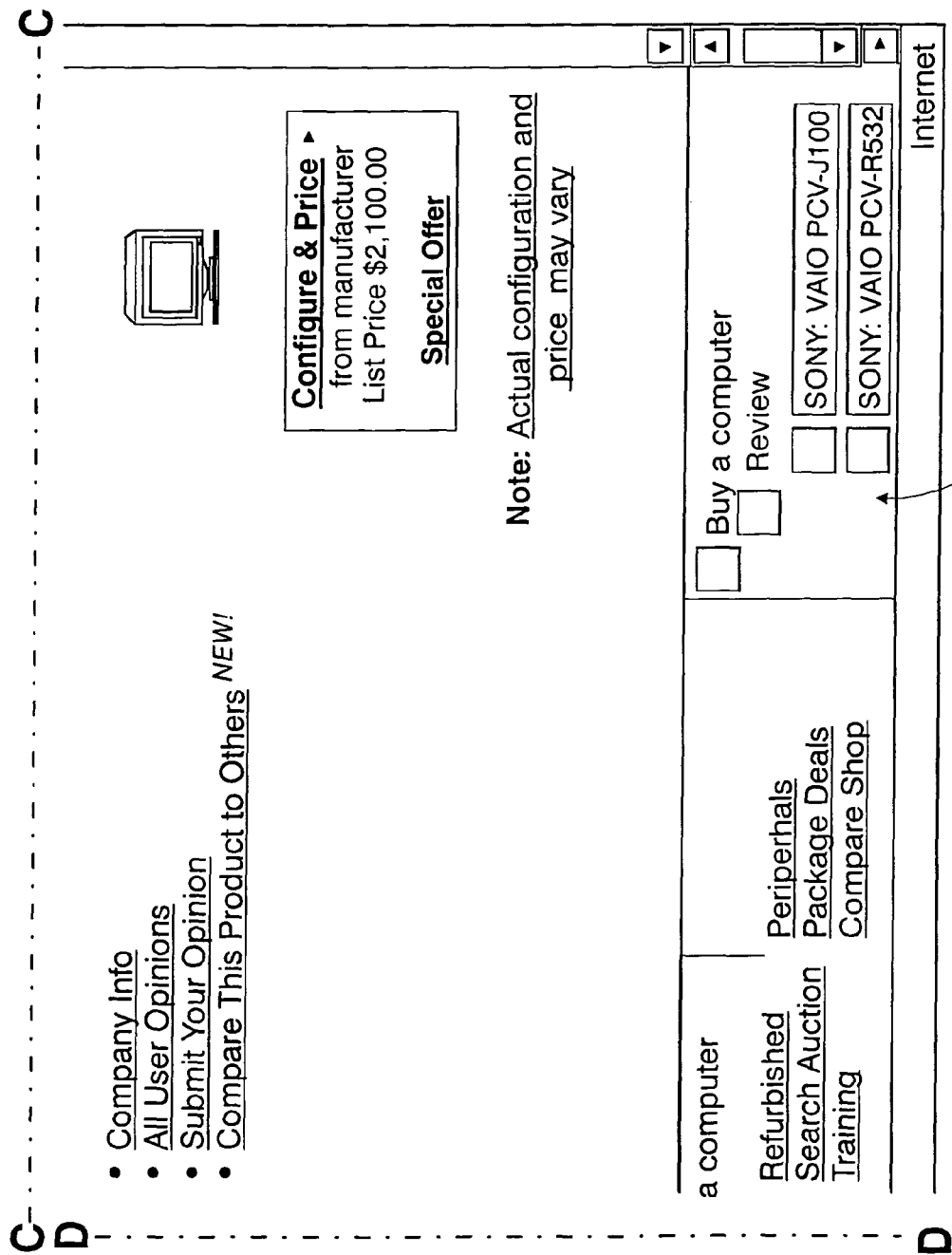

In order to create CVC's that are accurate and take maximal advantage of the services and providers that exist, there must be processes to keep the Registries current and also to grow their size to accommodate new services and providers over time. The maintenance is accomplished by a collection of independent processes involving the Mind-set Registry, the Services Registry, one or more Registry Editors, and the community of users and service providers. The following is a description of these processes as illustrated in FIG. 4.

Mind-set Registry maintenance is managed by one or more Mind set Registry Editors 40 (either person(s) 42 or automated tools 43 or a combination). These mind set editors 40 interact with the user community to discover new mind sets (goals) that should be added to the Mind set Registry 34, and also which services should be associated with that mind-set. An example of an automated tool 43 acting as a Mind set Registry Editor is one that collects recommended new goals offered by users, applies some rules (filtering or otherwise), and then adds them into the Registry. Mind set Registry Editors may also be people 42 who read, update, and delete listings in the Mind-set Registry on their own without interaction with users or other entities.

Services Registry maintenance is also managed by Service Registry Editors 44 (either person(s) 45 or automated tools 46 or a combination). Each service provider has the ability to communicate with a Service Registry Editor 46 in order to suggest that:
  a. it is a provider of a registered service; and
  b. a new service, which is not yet listed in the Services Registry, should be added (possibly also suggesting that it is a provider of that service).
Each such Services Registry Editor 44 then may apply some rules (filtering or otherwise) and then interact with the Services Registry 38 to make changes in the listings and associations.

Service Registry Editors 45 may also read, update, and delete listings in the Services Registry on their own without interaction with service providers or other entities. These editors are typically persons hired by the system manager to perform this function. However, these independent editors 45, as well as Mind set Registry Editors 42, may be wholly or partially automated through the use of web spider technology.

In carrying out this update function with independent editors, some inputs may be the result of independent searches of the Internet by the editors. However, some input may be by way of contractual relationships between the system's administrator and service providers. Such relationships may be based on an agreement by which the service provider pays to be listed in value chains of various sorts. This may be an up front payment or a payment for each user directed to the provider's web site by the present invention.

The process of ongoing registry maintenance as illustrated in FIG. 4 is typically performed by or under the control of the system's administrator, and the results are made available at the system administrator's web site for downloading to the web browsers of the users.

In use, the software defining the present invention is installed as a plug-in to the user's web browser. Then, as an example, if the user has the goal of purchasing a computer, the user may insert the URL "Sony.com" into his or her browser in order to look for computers. (FIG. 5). When the user arrives at the computing area of the Sony site, the Context Bar 50 (at the bottom) infers or guesses that the user might be trying to buy a computer, or learn about computers, or research a computer. These goals are suggested to the user as tabs 51-53 in the Context Bar 50. A drop down pick list 56 is also provided in the Context Bar 50 so that the user can select a particular computer (filtered for Sony). This is a form of context inference.

If the user selects the "Buy a computer" tab 51 and also selects a particular computer in the pick list as the computer to focus on, e.g., the "Sony VAIO J100," a Contextual Value Chain 60 is shown to the user in the Context Bar 50 as illustrated in FIG. 6. If the other tabs 52 or 53 are selected, other value chains are presented (not shown). Any of the services shown in that bar may be linked to by clicking on the name of the service, e.g. "purchases," "warranty," "Internet Service," "Review," "Software," etc. Each service is tied to a default provider, though there are also various alternate providers that the user might choose to associate with that service instead). If for example the user clicks on the "Review" service, the browser is caused to deep navigate directly to the page at CNET containing the review of the Sony VAIO PCV-J100. See FIG. 7. Also the navigation event is added to the activity history 72 on the right side on the Context Bar 50, indicating that the user is working toward buying a computer, and has now taken one step, which is to review that model VAIO.

Further, a promotion 74 appears from Compaq in the space at the left side of the Context Bar 50. In FIG. 7 this advertisement is indicated only as the word "Compaq"; however, it may be an actual advertisement. Further, the name or advertisement will typically be a hyperlink to the service provider's web site, e.g. to Compaq's site. The appearance of the Compaq promotion 74 assumes that Compaq has bought the right from the system administrator to offer promotions in the context of users working toward buying computers. The alternate provider, i.e., Compaq, may purchase the right to advertise whenever a user demonstrates a "computer" mind set, or it may purchase a more limited right. For example, it is possible that Compaq has bought only the right to advertise to those users in the "Review" stage of the value chain set up for the process of purchasing a computer. This is a form of context marketing. If the user clicks on the Compaq advertisement, the browser takes them to the Compaq web site. Thus, Compaq can pay the system administrator a flat fee or a fee based on the number of users that click on to the Compaq link.

Next the user may click on the "Search Auction" service which looks for computers with similar specifications at an auction site. The browser page for this is shown in FIG. 8. In this case the user is brought to BidCrawler and is shown a list 80 of 600 MHZ computers (as is the VAIO PCV-J100) currently up for sale by auction. Note also that this second step in the activity is added to this history 72 on the right of the Context Bar.

Finally, the user may consider another similar computer, e.g., the user may selects the VAIO PCV-R532DS from the pick list in the Context Bar. Then he clicks the "Reviews" service to see reviews of this model. This causes the browser to jump back to CNET, again deep navigating to the appropriate page containing a review for that computer (FIG. 9). Also the activity history 72 on the right reflects that the user has now reviewed two computers. If the user wants to jump back to the review for the other computer, he can click on the PCV-J100 in that activity history tree.

Anyone who uses electronic media, such as the Internet through desktop or personal computers, web-enabled phones, personal digital assistants ("PDAs") or other wireless or voice-based digital platforms, and pagers are in a position to benefit from the present invention. Moreover, a provider of such media and services is able to leverage the infrastructure to bring targeted users to them at just the right place in the value chain, opening new capacities for traditional up-sales and cross-sales.

The revenue streams that the system can generate include:
1. Affiliate traffic revenues. Users, in their attempt to find information, generate traffic to a system partner and affiliate sites, generating revenue for the system operator for each such click-through.
2. Affiliate sales revenue. Users participating in electronic commerce through purchase or sale can generate a transaction-based commission for the system operator. The system's client-side software is closer to the users than web-based hub sites, making it easier for the system operator to realize a large portion of the commissions on this revenue.
3. Technology licensing. Other service providers who wish to provide tools such as the present invention, either on their web sites or tied to their corporate intranets, can generate licensing revenues.
4. Server-side software sales for businesses to plug into the framework. Businesses that wish to use this framework to push cross values and up values to a user's current activity may plug into the framework by purchasing server side space from the system operator. This is an excellent opportunity for using context marketing to cross-sell products and services.

As noted previously, there is value in the system of the present invention to both users and service provider. In particular, users get the benefits of targeted services anywhere on the web by means of a single mouse click. This relieves the user of having to remember particular URLs. The system also provides the user with easy access to relevant information and services at a given site through one mouse click, instead of having to surf through a site to find the relevant information. Thus, there is reduced repetition as users move from site to site, since they do not need to restate again and again what they are seeking (for example, entering a stock symbol at E*Trade, then entering it again at Edgar, and so on).

Similarly, service providers receive significant benefits from the system. They can target users anywhere on the web by a single mouse click. This provides powerful new opportunities for cross-sales and other cross-functional services, even to users who are not vising the service-provider's site (for example, allowing Amazon.com to sell overstocked computer books to someone shopping for a computer at Dell or Gateway). In addition, the service providers get expanded reach to current customers, affording a new dimension of customer retention for that service provider. For example, Epinions.com might become the default or exclusive opinion provider for all users to whom it distributes the system software, e.g., the browser plug-in. The provider also gets relief from spending huge sums to aggregate services so that users are more likely to complete transactions at that site. As an example, CNET by adding product reviews from customer-reviews.com or epinions.com may cause more users to make purchasing decisions at CNET.

As noted in FIG. 7, while navigating the Internet, the user is presented with advertisements 74 which match the context suggested by that navigation. These advertisements may also provide links to affiliates. This is accomplished by a contextual advertisement and contextual affiliate designation system which forms part of the present invention. This system is a design to enable companies using the present invention to improve the performance of their online advertisements and affiliate marketing by presenting users with advertisements and affiliate links that are in context with the mind sets of the users. The contextual advertisements and affiliate links may be constructed in real time or they may be carried out prior to use.

Figure 10:
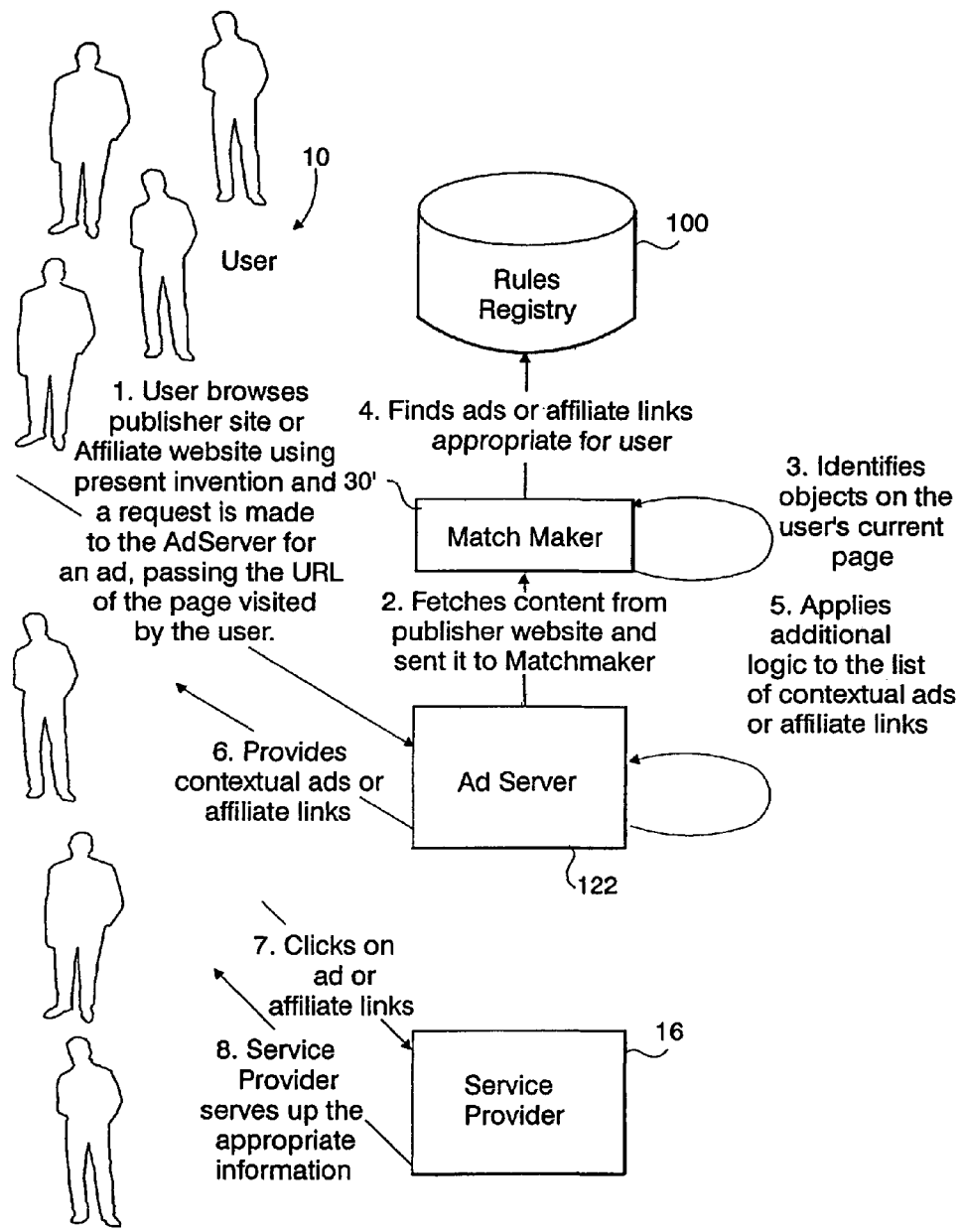
FIG. 10 is a schematic diagram of the construction of contextual advertisements and affiliate links according to the present invention.

The contextual advertisement and contextual affiliate designation system of the present invention is illustrated in FIG. 10. It includes an Ad Server or the Affiliate Site 122 which implements the contextual advertisement or contextual affiliate links, respectively, to improve the performance of the advertisements or affiliate links it serves for other service providers. The Service Provider 16 as illustrated in FIG. 10 is the company that uses the system to deliver advertisements which promote it's services or to provide links to its services. It may do this directly or through an advertisement server or affiliate site 122.

The system also requires a Rules Registry 100, which is a data store that identifies a set of unique rules for when an advertisement or an affiliate link should be shown to a particular user. These rules are defined by the Service Provider 16 to indicate when a particular advertisement or affiliate link would be most relevant to a user. In the example of a Service Provider that sells computer memory, it will define a particular rule (such as "object=computer & memory$\leq$32 MB") and map that to a particular advertisement (such as "Upgrade your computer to 64 MB). Note that an advertisement or affiliate link can be mapped to more than one rule.

Below is a simplified illustration of the concept of a Rules Registry:

| RULE | AD or AFFILIATE LINK |
|---|---|
| Object = "Computer" and Hard Disk <= "2 GB" | Upgrade to 4 GB Hard Disk Space |
| Vertical = "Travel" and Destination =" San Francisco" | Discounts at Holiday Inn San Francisco |
| Vertical = "Travel" and Destination Airport = "LaGuardia" | Discounts at Avis Rent-a-Car at LaGuardia |

Figure 11:
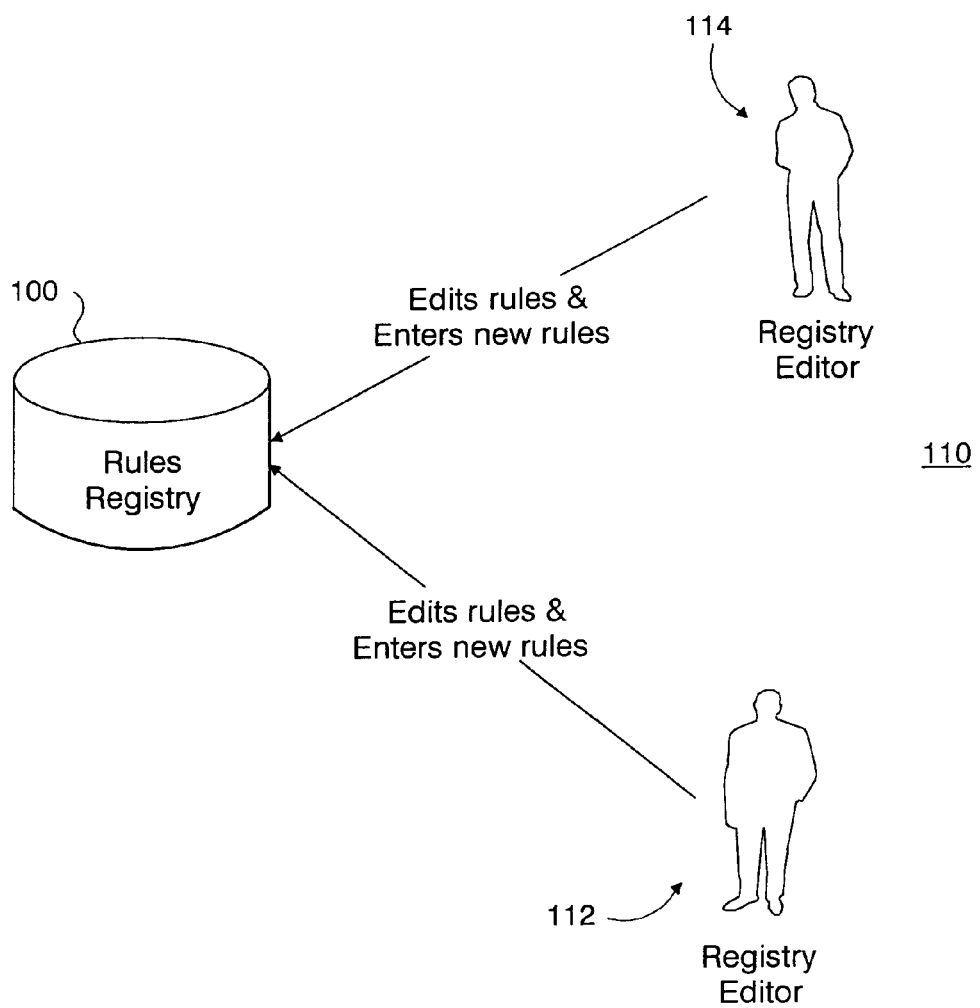
FIG. 11 is a schematic diagram of the maintenance of the registry for contextual advertisements and affiliate links according to an aspect of the present invention.
Figure 12A:
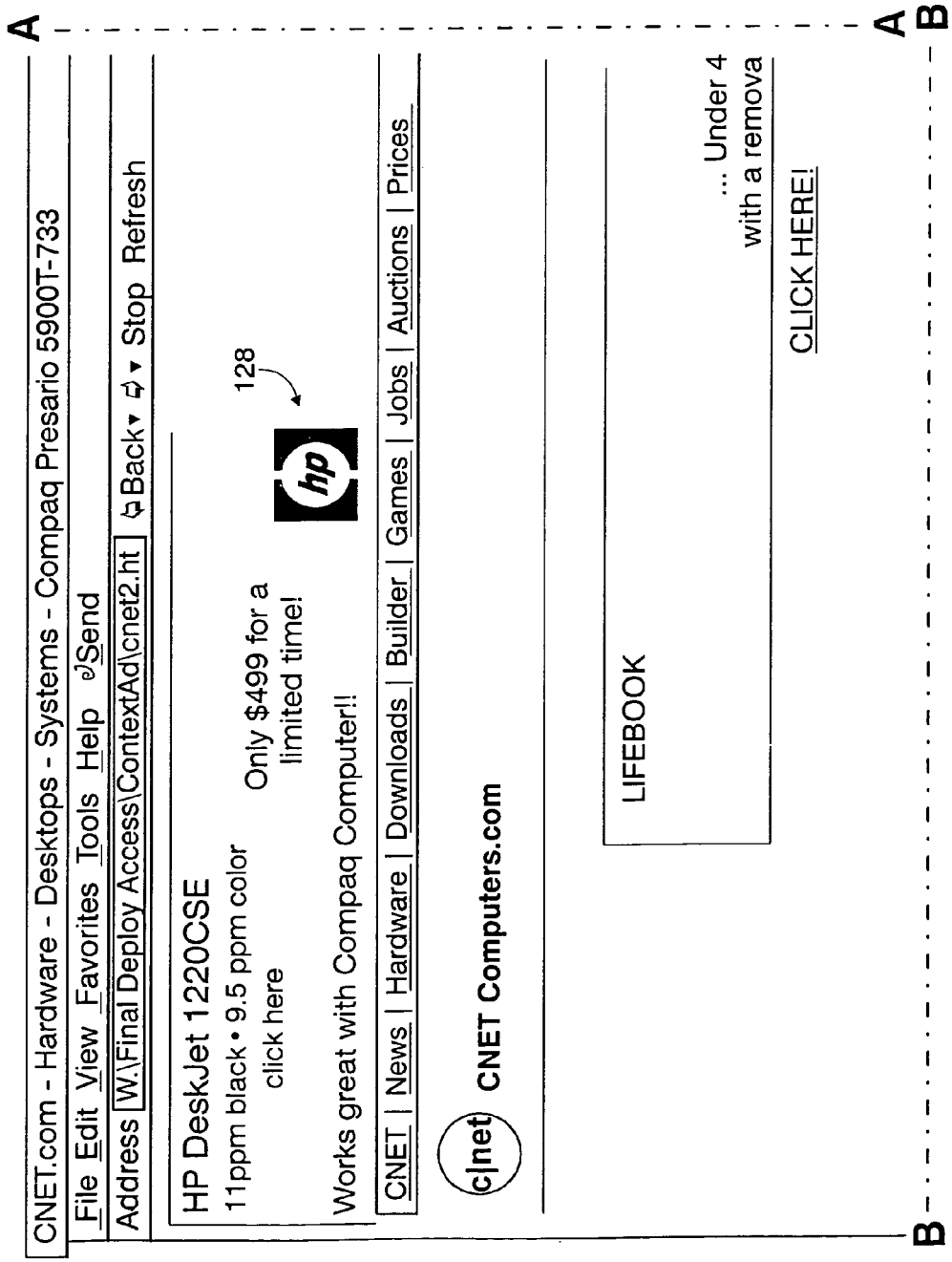
FIGS. 12-13 are illustrations of advertisements targeted towards the content of the page.
Figure 12B:
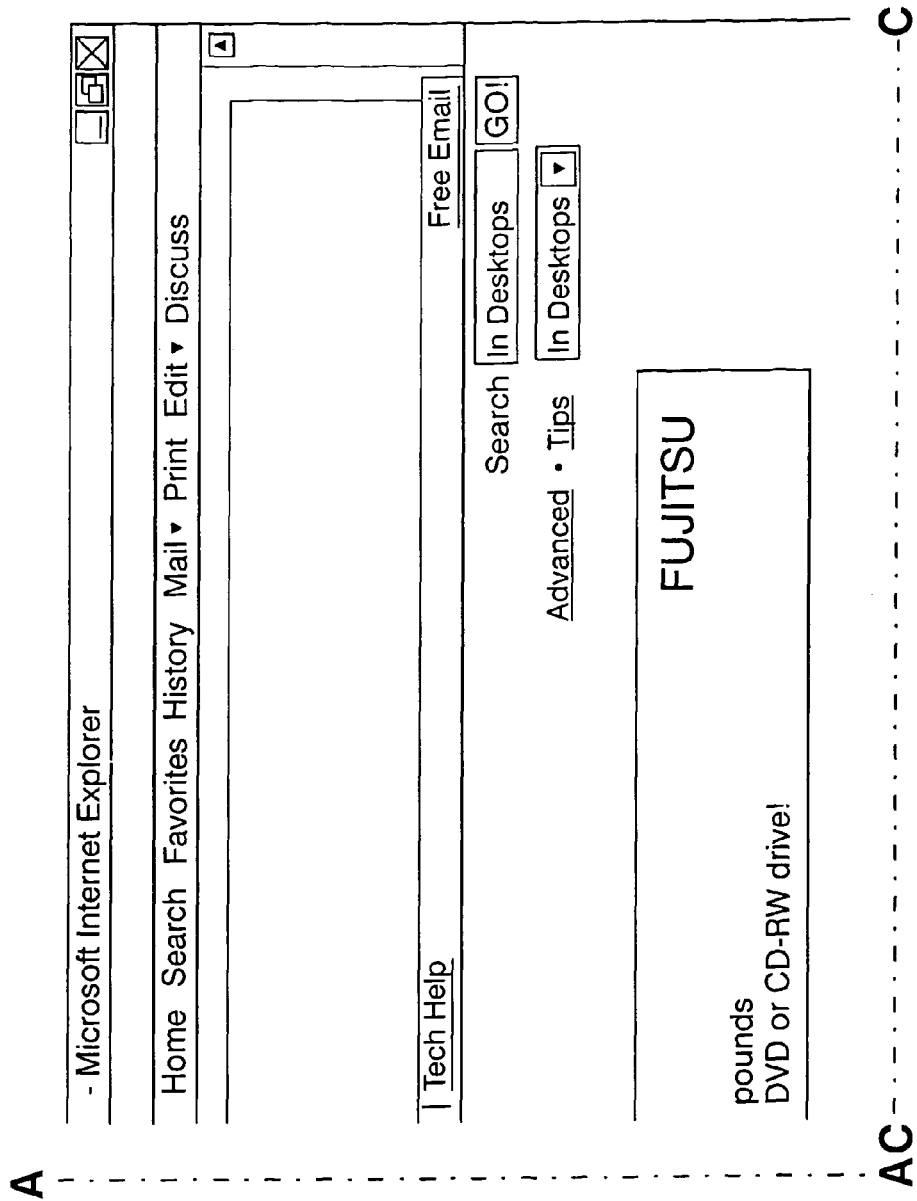
Figure 12C:
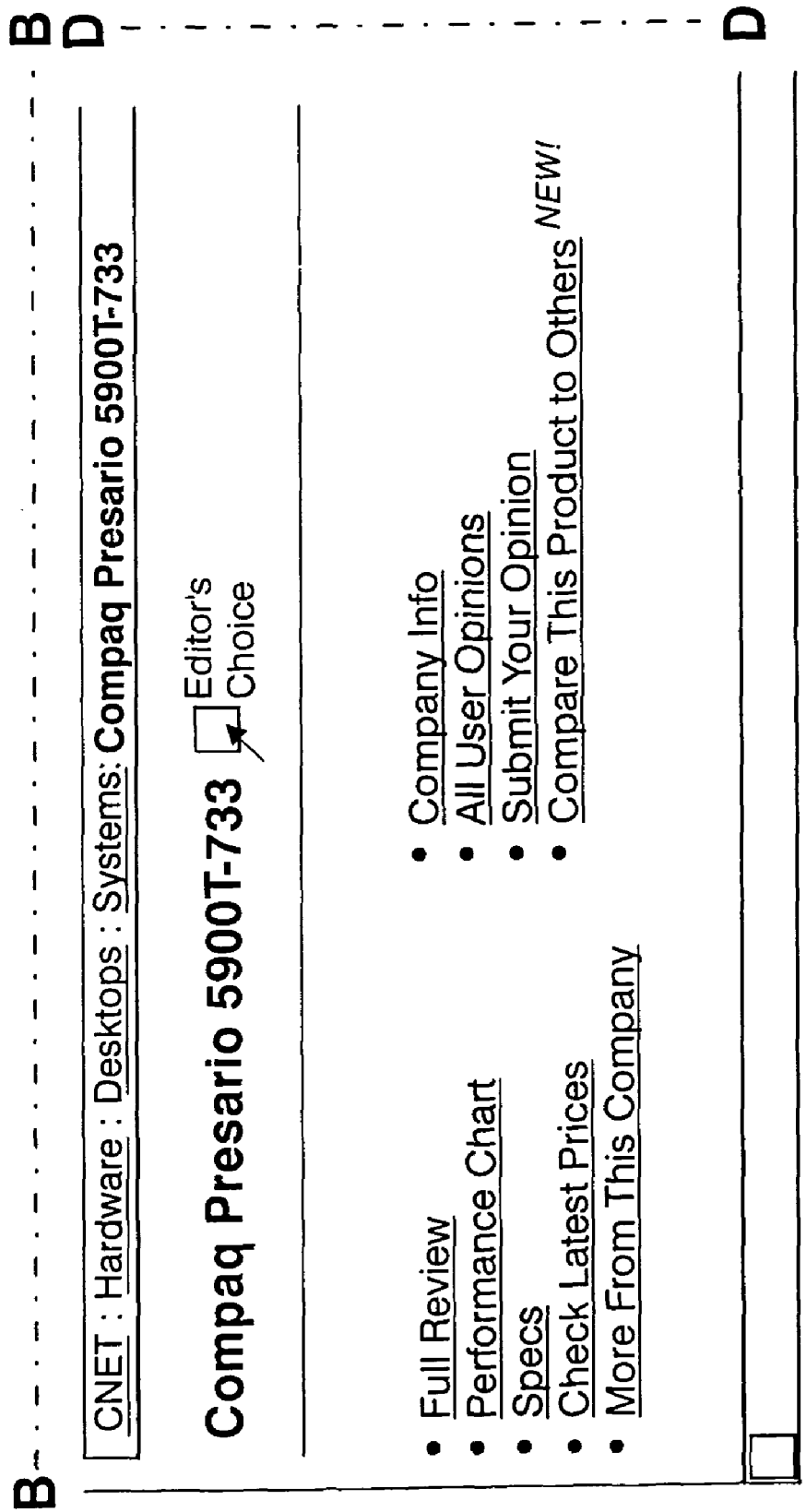
Figure 12D:
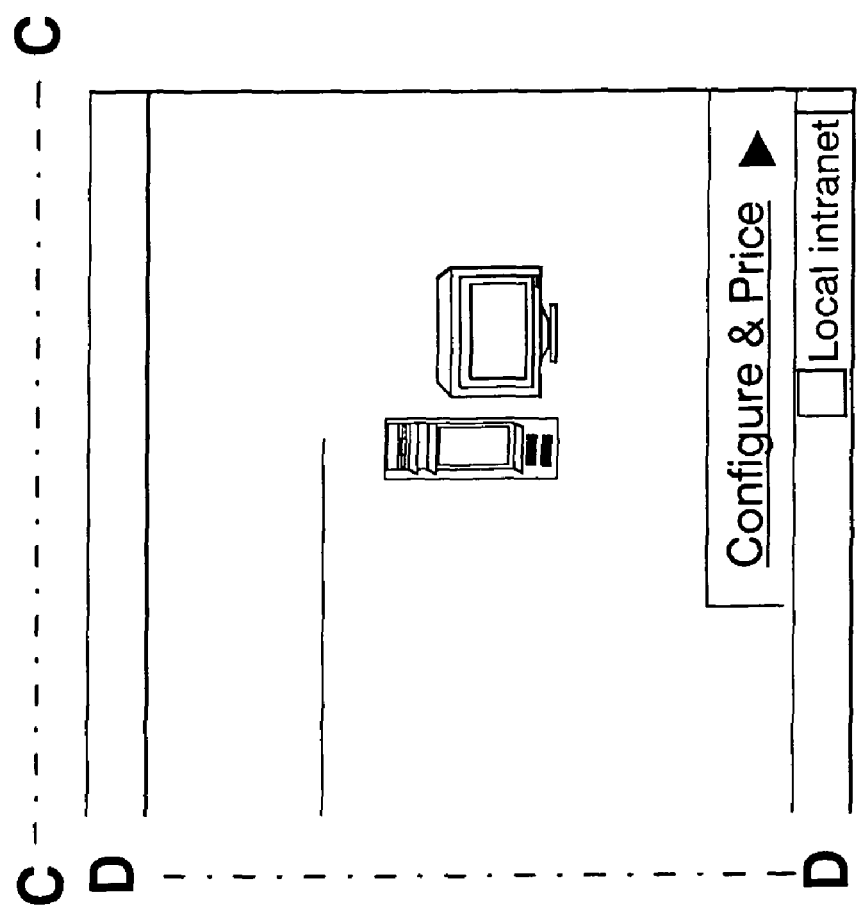

Note that the Rules Registry is also intended to be, but does not need to be, the following:
accessible via automated processes, such as electronic databases
edited by automated processes
edited by human experts Further, as shown in FIG. 11, the system requires a Registry Editor 110 that has the ability to create, read, update, and delete listings in the Rules Registry. Note that a Registry Editor may be either a person 112 or an automated tool 114, or a combination thereof.

Returning to FIG. 10, the final component of the system is the Match Maker 30', which is the company who implements the matching steps of the present invention. The functions of both the Ad Server or Affiliate Site 122 and the Match Maker 30' may be accomplished by the system's administrator. The Match Maker 30' builds the advertisement and the affiliate links on top of the context infrastructure of the rest of the present invention. In particular, the Match Maker 30' parses the content of the customer's current page, groups attributes to form structured objects, communicates with the Rules Registry 100 and produces a set of contextually relevant advertisements or affiliate links in response thereto.

The process of constructing contextual advertisements or affiliate links requires interaction between a single user 10 and the Advertisement Server or Affiliate Site 122, between the Advertisement Server or Affiliate Site and the Match Maker 30', between the Match Maker 30' and the Rules Registry 100, and also private work done by the Match Maker 30' itself. The process begins when the user browses the Internet and completes when the Advertisement Server or Affiliate Site ("A/A Site") 122 delivers the contextual advertisement or affiliate link back to the user. In particular, the process is as follows:

1. The user 10 starts browsing the Internet and comes across an A/A Site 122 that has a contextual advertisement or affiliate link embedded in it.
2. As the user browses, the server which hosts the A/A Site 122 sends the content of the page the user is viewing to the Match Maker 30'.
3. The Match Maker 30' parses the content of the page that the user is viewing and identifies the objects and their attributes which are mentioned on the page. The Match Maker 30' intelligently groups together the attributes belonging to a particular object. For example, a page may mention several computers and for each computer, it may mention attributes such as brand, processor type, and processor speed. The Match Maker 30' will group together the attributes belonging to each computer object and produce a list of computer objects found on the page.
4. The Match Maker 30' then cross-references the objects that are found with the Rules Registry 100 to determine the set of contextual advertisements or affiliate links that are relevant to the current content. The Match Maker 30' returns this set to the Advertisement Server or Affiliate Site 122.
5. The A/A Site 122 may also apply additional rules, such as user demographics, to pick a particular advertisement or affiliate link if more than one is returned by the Match Maker 30'.
6. The A/A Site provides the user with the contextual advertisement or affiliate link.
7. The user 10 views the contextual advertisement or affiliate link and clicks on it if he or she is interested in the information shown. Clicking on the advertisement or affiliate link makes a call to the Service Provider 16 asking for the content of that particular advertisement or affiliate link.
8. The Service Provider 16 serves up the appropriate content to the user.

In order to present the user with the most appropriate advertisement or affiliate link, there must be processes to keep the Rules Registry current and up to date. The maintenance is accomplished by processes involving the Rules Registry 100, the Registry Editors 110 and the Service Provider 16. As noted above, this maintenance process is illustrated in FIG. 11. In particular, the Service Provider uses one or more Registry Editors 110 (either person(s) or automated tool(s) or a combination thereof) to input new advertisements, affiliate links or rules, and update existing advertisements, affiliate links or rules.

Figure 13A:
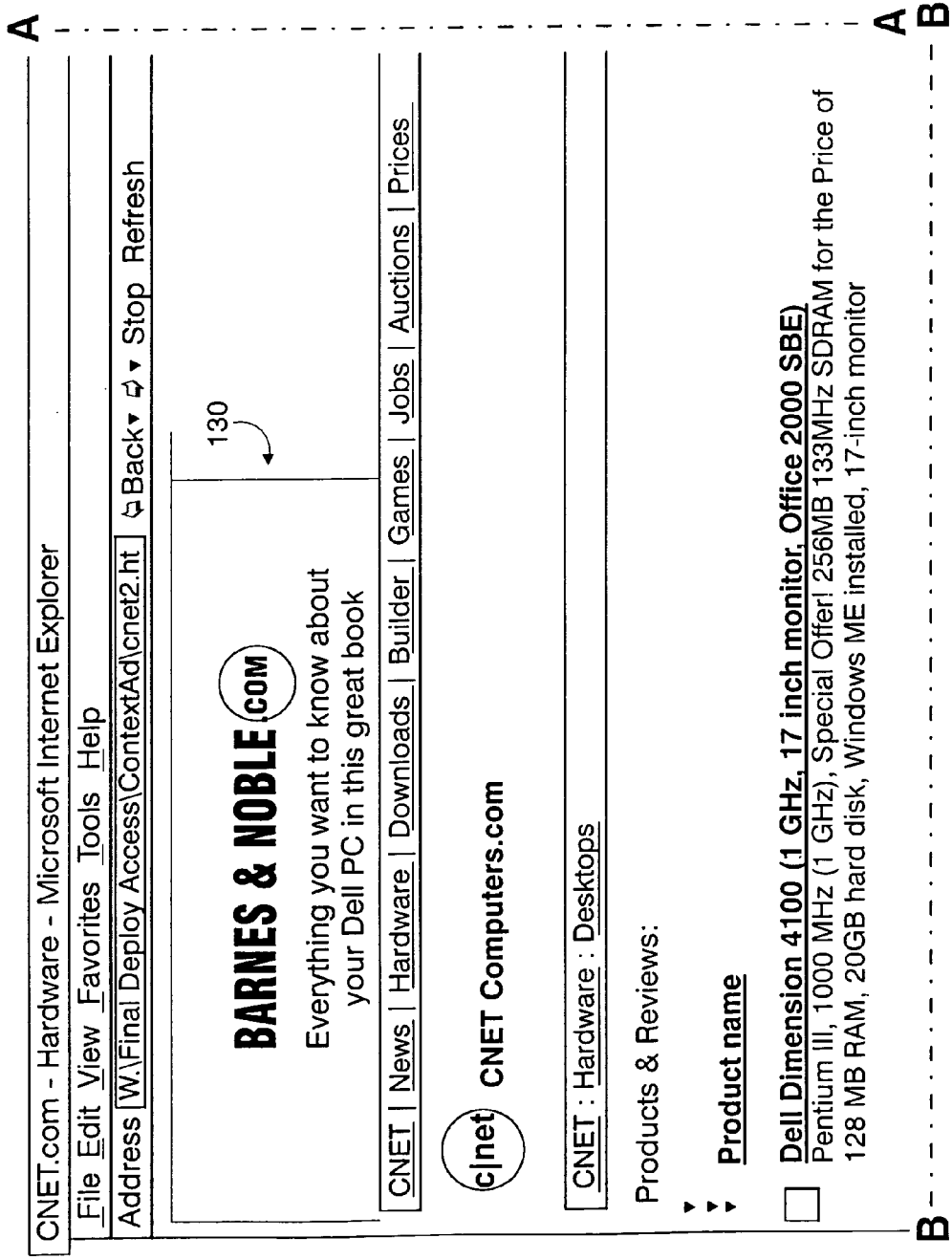
Figure 13B:
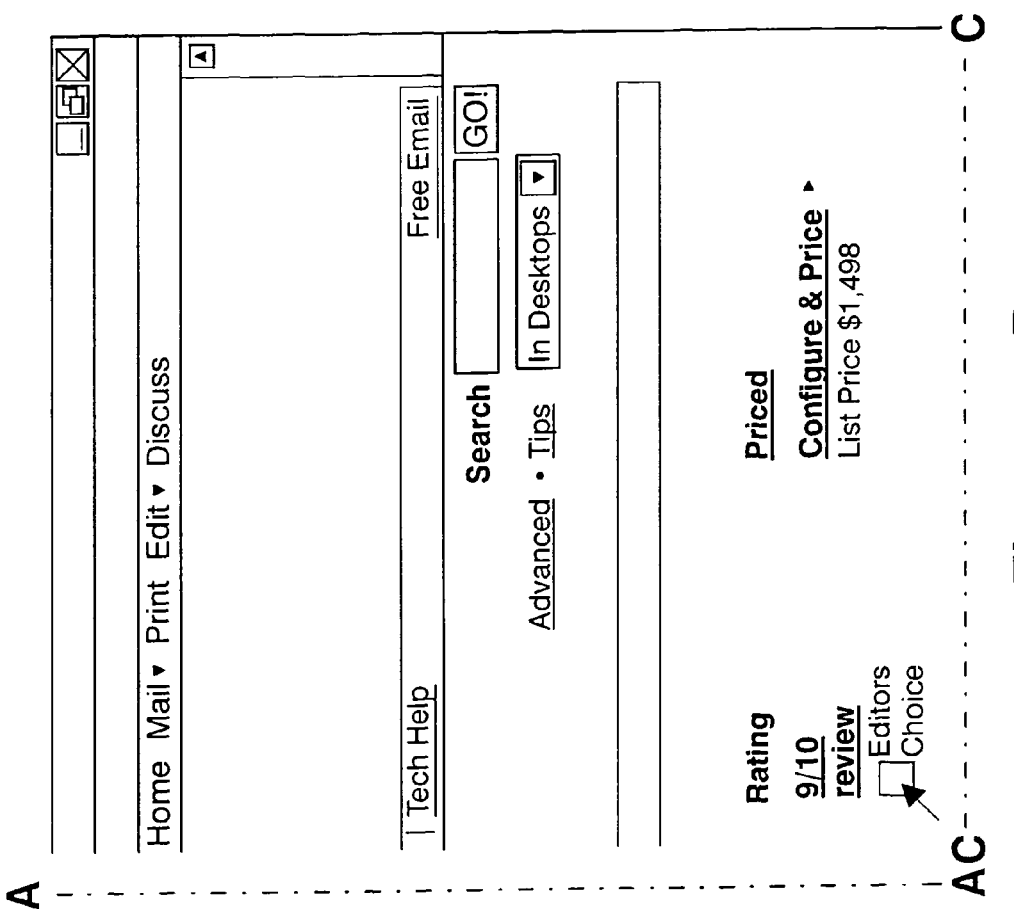
Figure 13D:
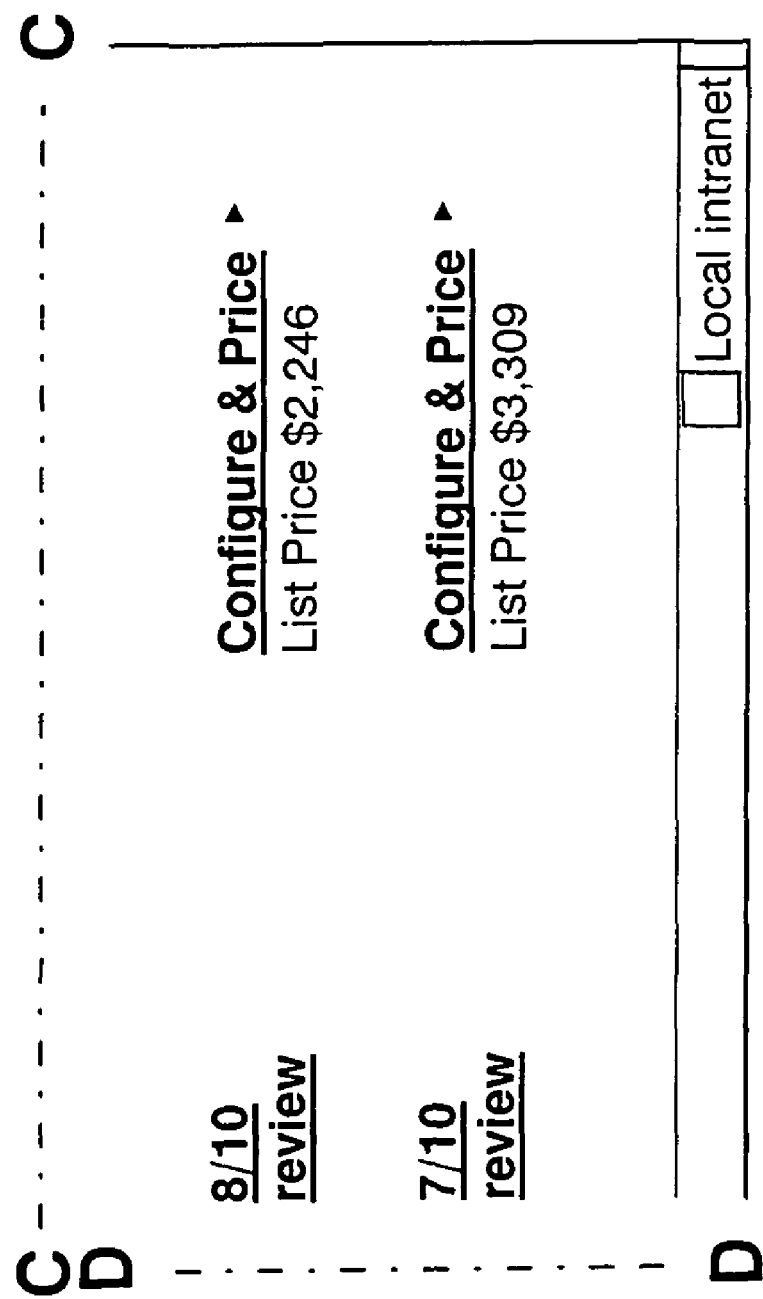

In use the contextual advertisement and the contextual affiliate link software and hardware provides an infrastructure that provides contextual presentation of the advertisements and links. As an example, if Hewlett-Packard ("HP") is the Service Provider 16 which is using contextual advertisement, HP will define the rules for when its advertisement should be shown. If HP defines a rule that targets the selling of HP printers with Compaq computers, then when a user looks at a page with Compaq computers, the appropriate HP advertisement 128 will be shown as illustrated in FIG. 12. In another example, assume that Barnes and Noble is the Service Provider who has and affiliate program and CNET signs up to be Barnes and Noble's affiliate site. Then Barnes and Noble can defines a rule that an affiliate link for books on "PC Computers" should be shown when a user is looking at Dell computers. As a result, when a user looks for Dell computers at CNET, IF the appropriate advertisement and affiliate link 130 for Barnes and Noble is shown as illustrated in FIG. 13.

As these examples show, the contextual advertisement and contextual affiliate link tools are very effective and powerful ways for companies to improve the performance of their advertising efforts and their affiliate marketing efforts by providing contextual advertisements and affiliate links. There is value in the system of the present invention to both users and service providers. Users get the benefit of contextual advertisements and links targeted to their mind set. Service providers who use this technology get the benefit of greatly increasing their revenue and click-through rates by establishing a high correlation between the advertisements or affiliate links being served, and the user's current mind set.

As a further means for leveraging the contextual technology of the present invention, a Service Provider using the system can improve customer retention through the use of a Contextual Icon. This icon is provided by the system and designed to enable companies to improve their customer retention by presenting their customers with contextual services anywhere on the Web. The contextual services may be constructed real time or they may be constructed prior to use. As with the basic contextual functionality, this additional functionality may be implemented via a plug-in for the user's web browser, but it can also be implemented in other ways.

A Context Service Provider is a company that implements the Contextual Icon by providing it to companies, e.g., Service Providers, who are interested in using it to improve their customer retention. The Contextual Icon is customized to feature the services that are offered by the Service Provider using the Contextual Icon. The Service Provider will provide the user with the Contextual Icon so that the Customer has access to the Service Provider's services from anywhere on the Web.

Figure 14:
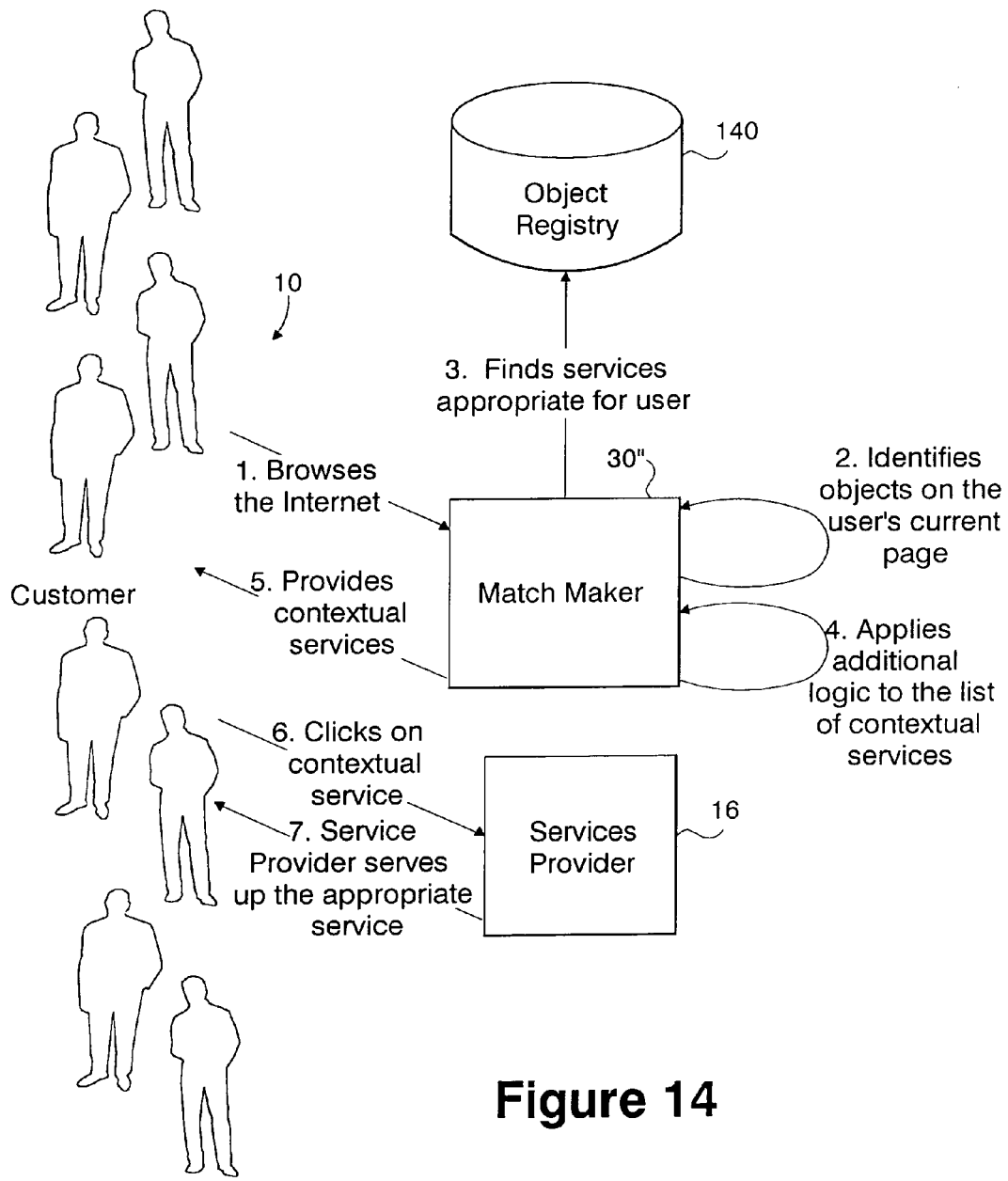
FIG. 14 is a schematic diagram of the construction of a single client's contextual services according to the present invention.

As shown in FIG. 14, this phase of the system requires an Object Registry 140, which is a data store that identifies a set of unique objects that are related to the services provided by the Service Provider. The registry maps each object to the set of services offered by the Service Provider 16. In an example of a Service Provider who provides reviews on computers, the Service Provider will define the identifying attributes of a computer object (such as brand, model, processor, etc) and map the object to the relevant service (e.g., the Compaq Presario 5001R maps to a review for that particular computer) Note that an object can be mapped to more than one service. In addition, note that the representation of these services in a user interface may vary independent of the service descriptions captured in this registry.

Below is a simplified illustration of the concept of an Object Registry:

| OBJECT | SERVICE |
|---|---|
| <computer brand="Compaq" model="Presario 5001R" processor="750 MHZ AMD ® Duron ™ "></computer> | Review for a Compaq Presario 5001R computer with a 750 MHZ AMD ® Duron ™ processor |
| <computer brand="Compaq" model=" Presario 5001SR" processor="800 MHZ AMD ® Duron ™ "></computer> | Review for a Compaq Presario 5001SR computer with a 800 MHZ AMD ® Duron ™ processor |
| <computer brand="Compaq" model=" Presario 5003US" processor="933 MHZ Intel ® Pentium ® III "></computer> | Review for a Compaq Presario 5003US computer with a =" 933 MHZ Intel ® Pentium ® III processor |

Figure 15:
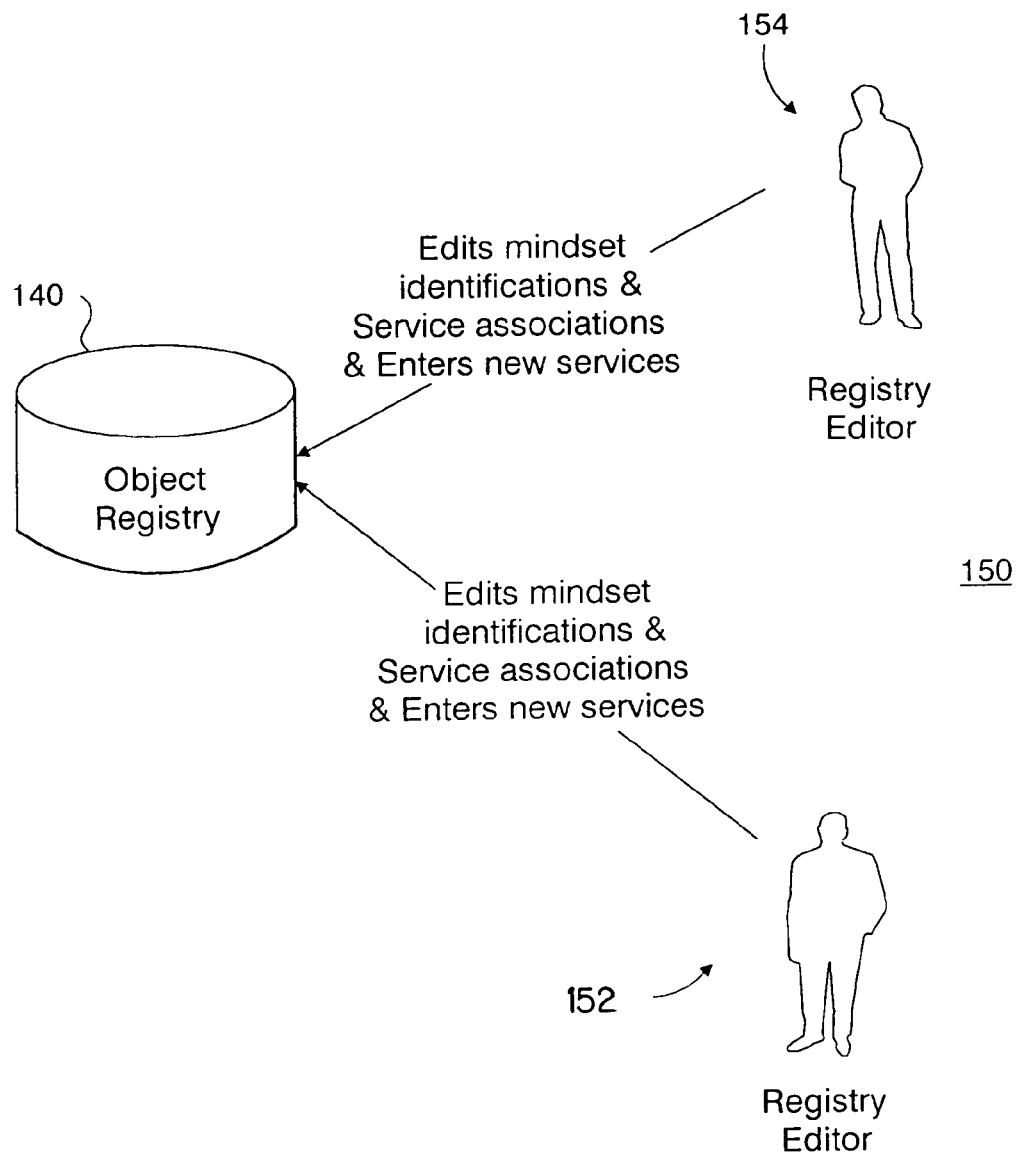
FIG. 15 is a schematic diagram of the maintenance of the registry for contextual services according to an aspect of the present invention.
Figure 16A:
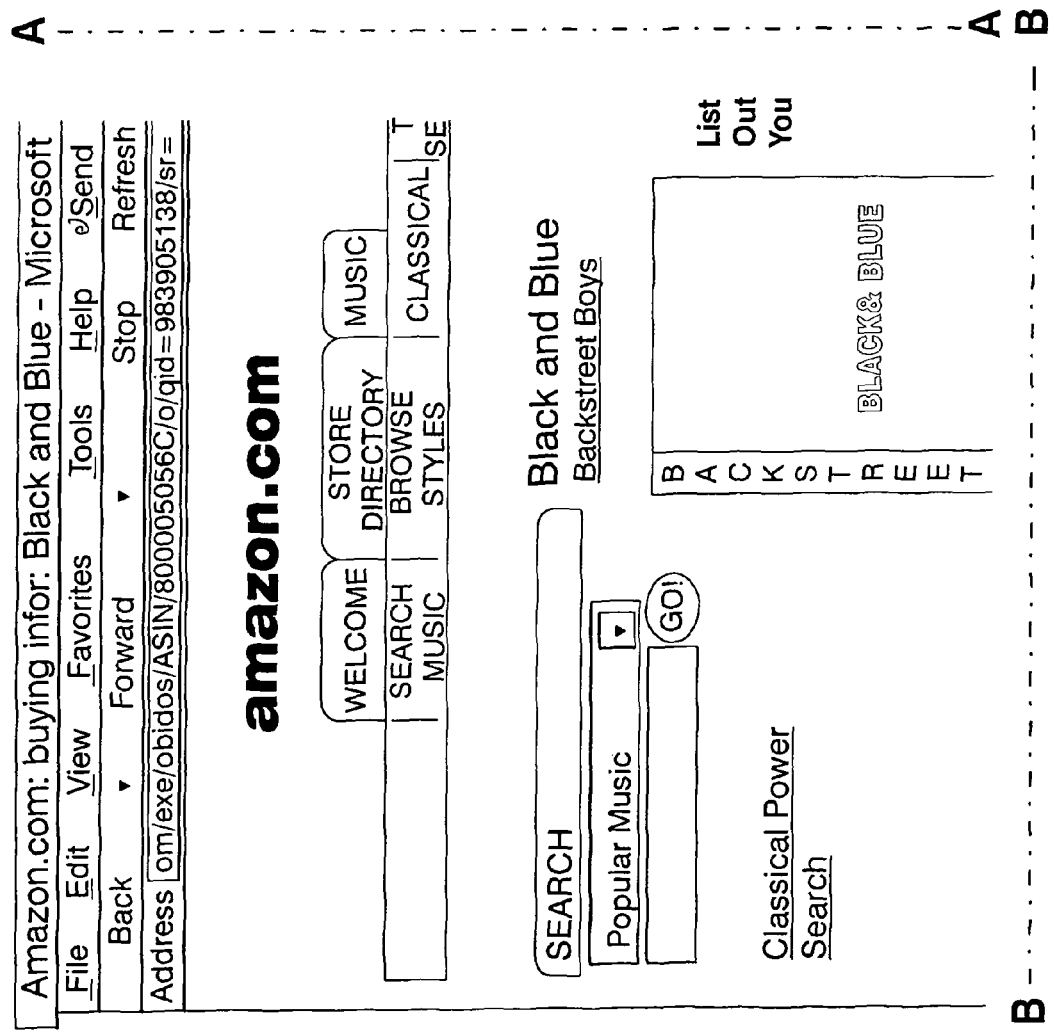
FIGS. 16-19 are a sequence of illustrations of a customer's screen, using one of a multitude of possible user interfaces, while navigating the Internet using the contextual services of the present invention.
Figure 16B:
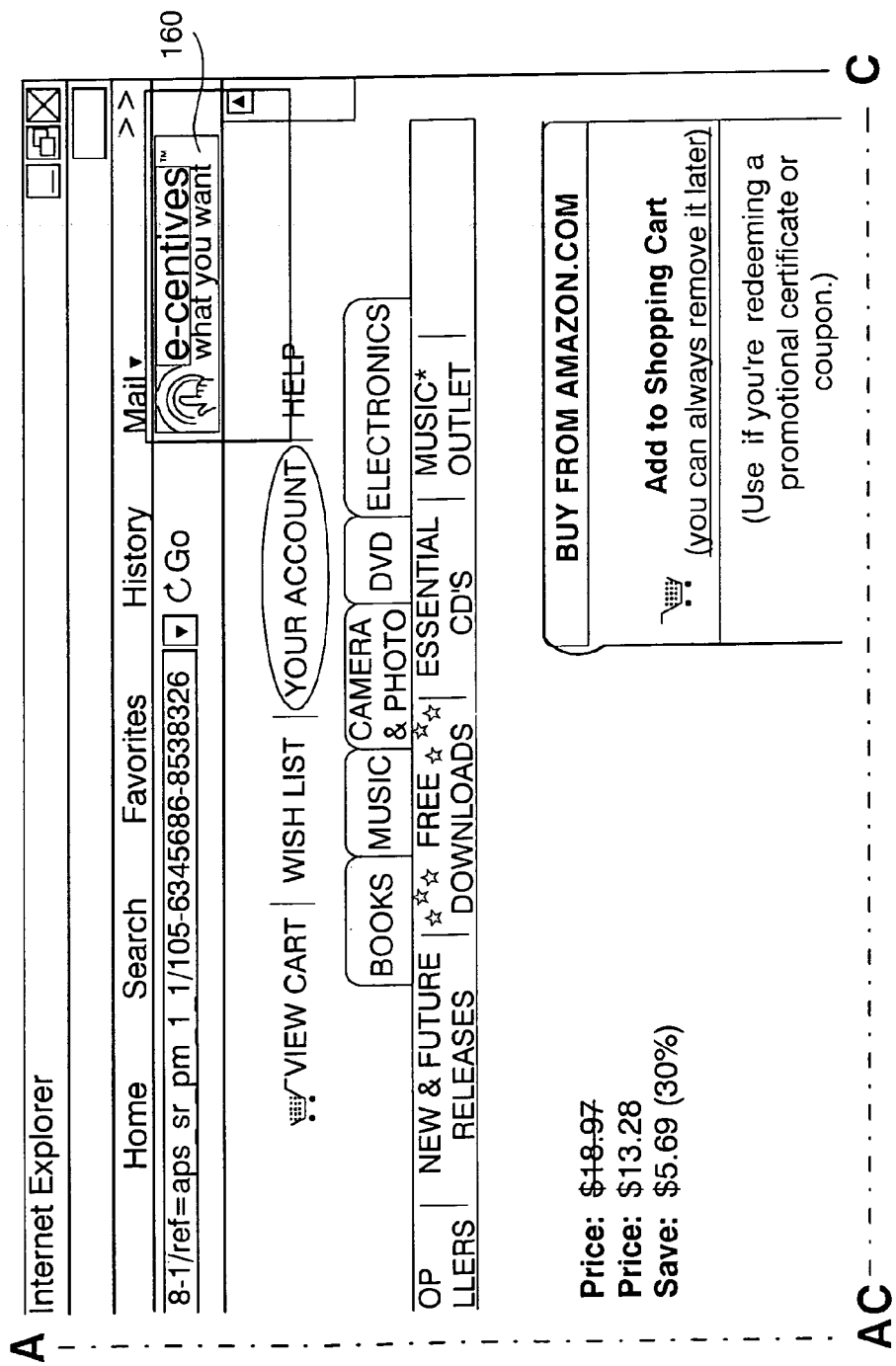
Figure 16C:
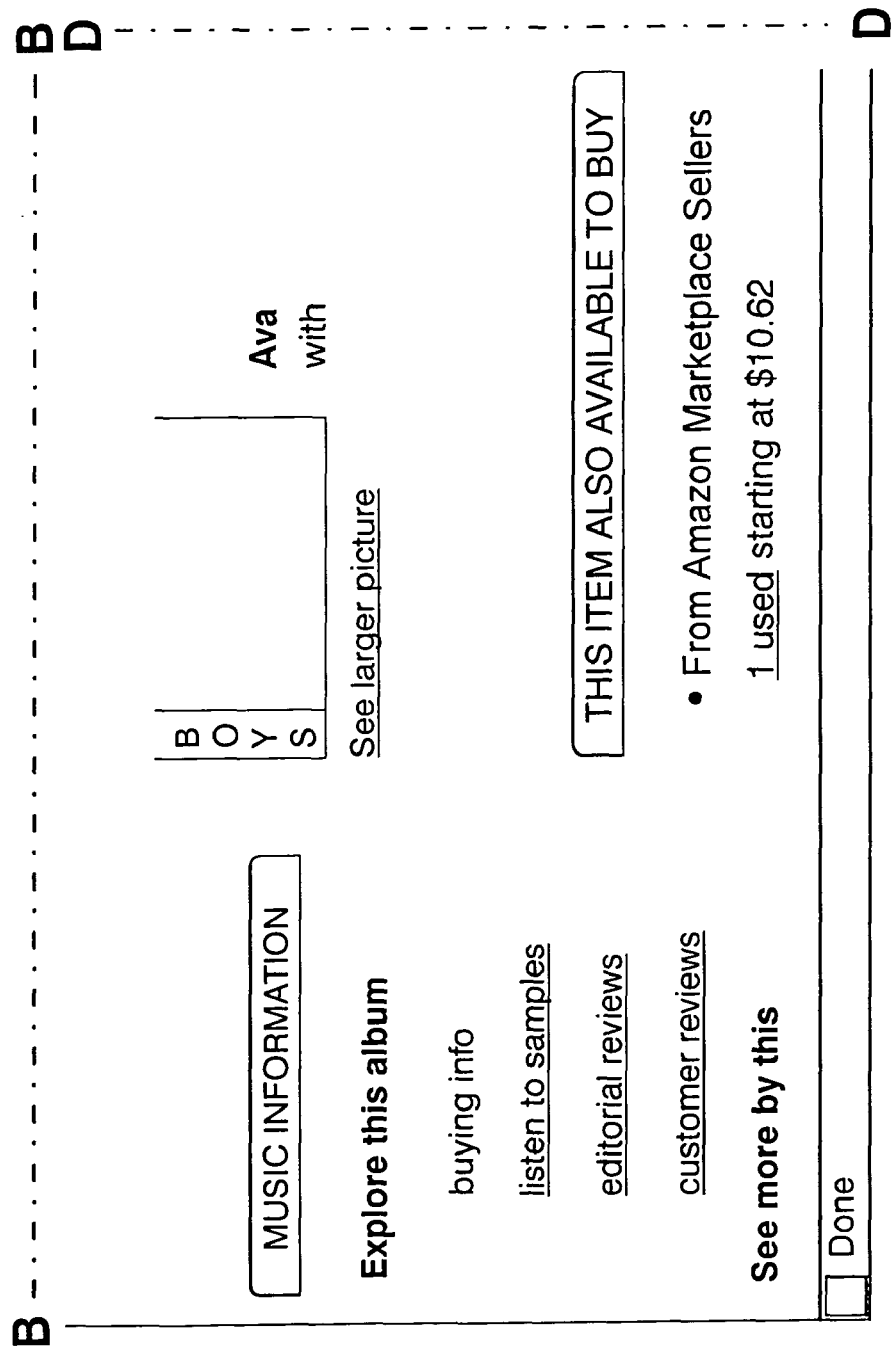
Figure 16D:
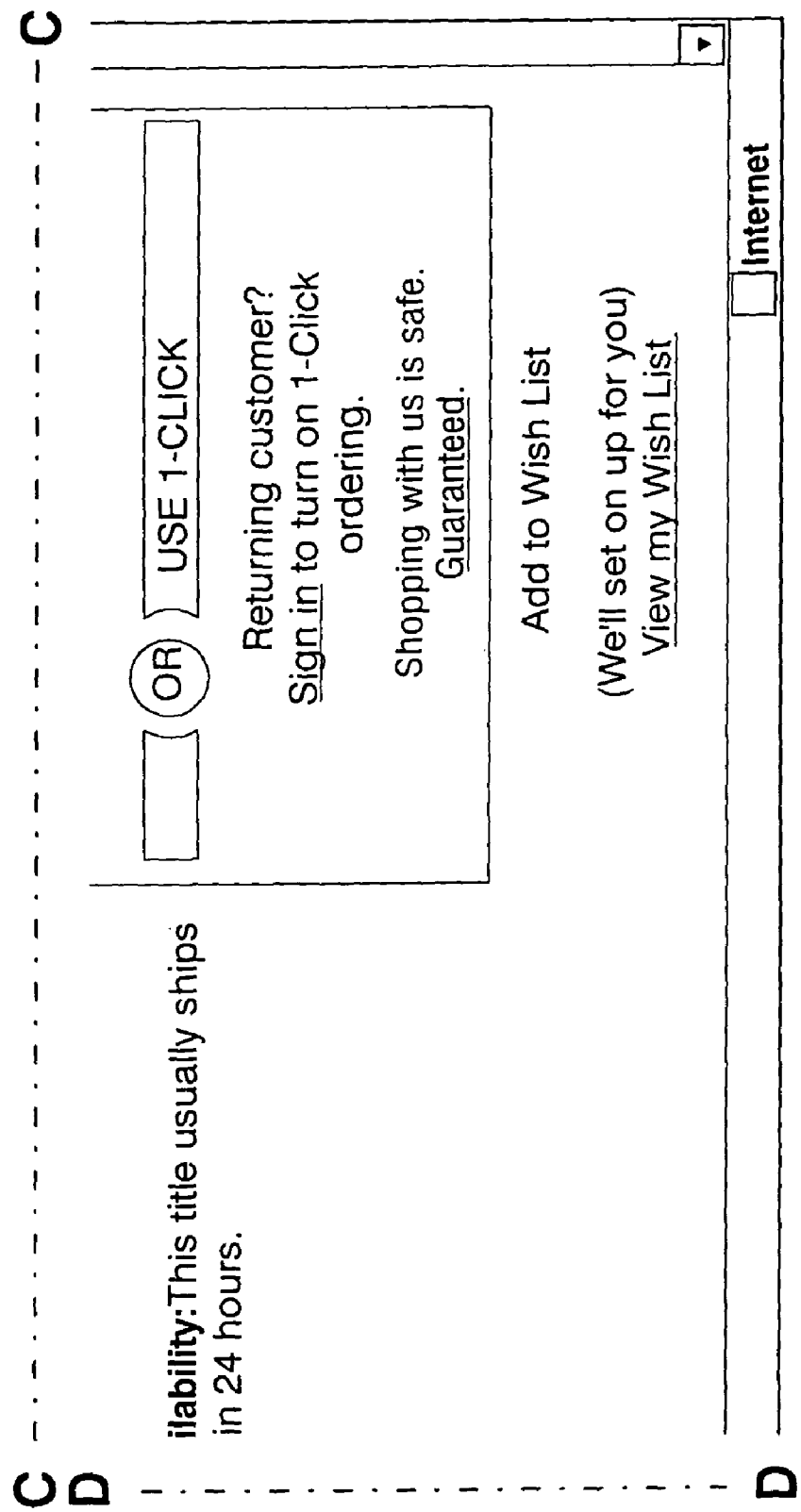
Figure 17A:
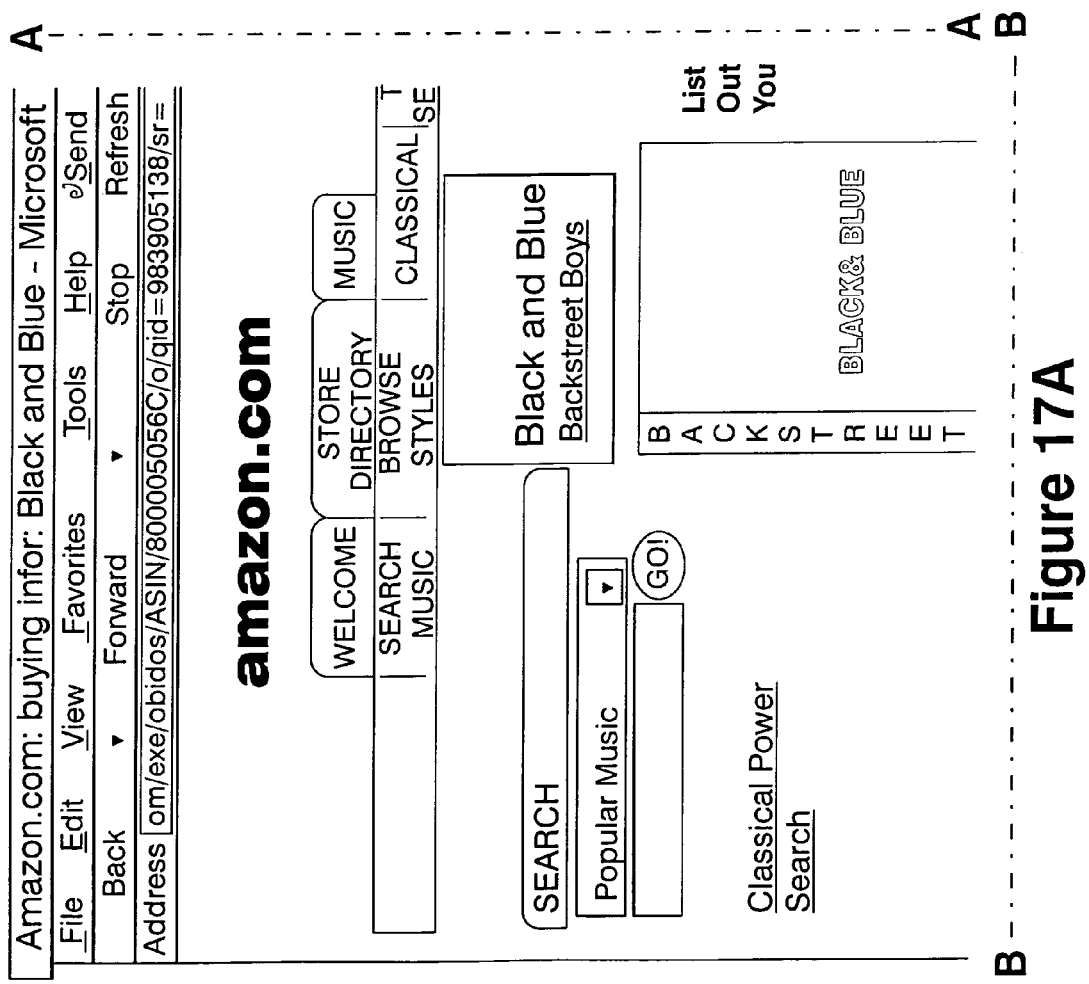
Figure 17B:
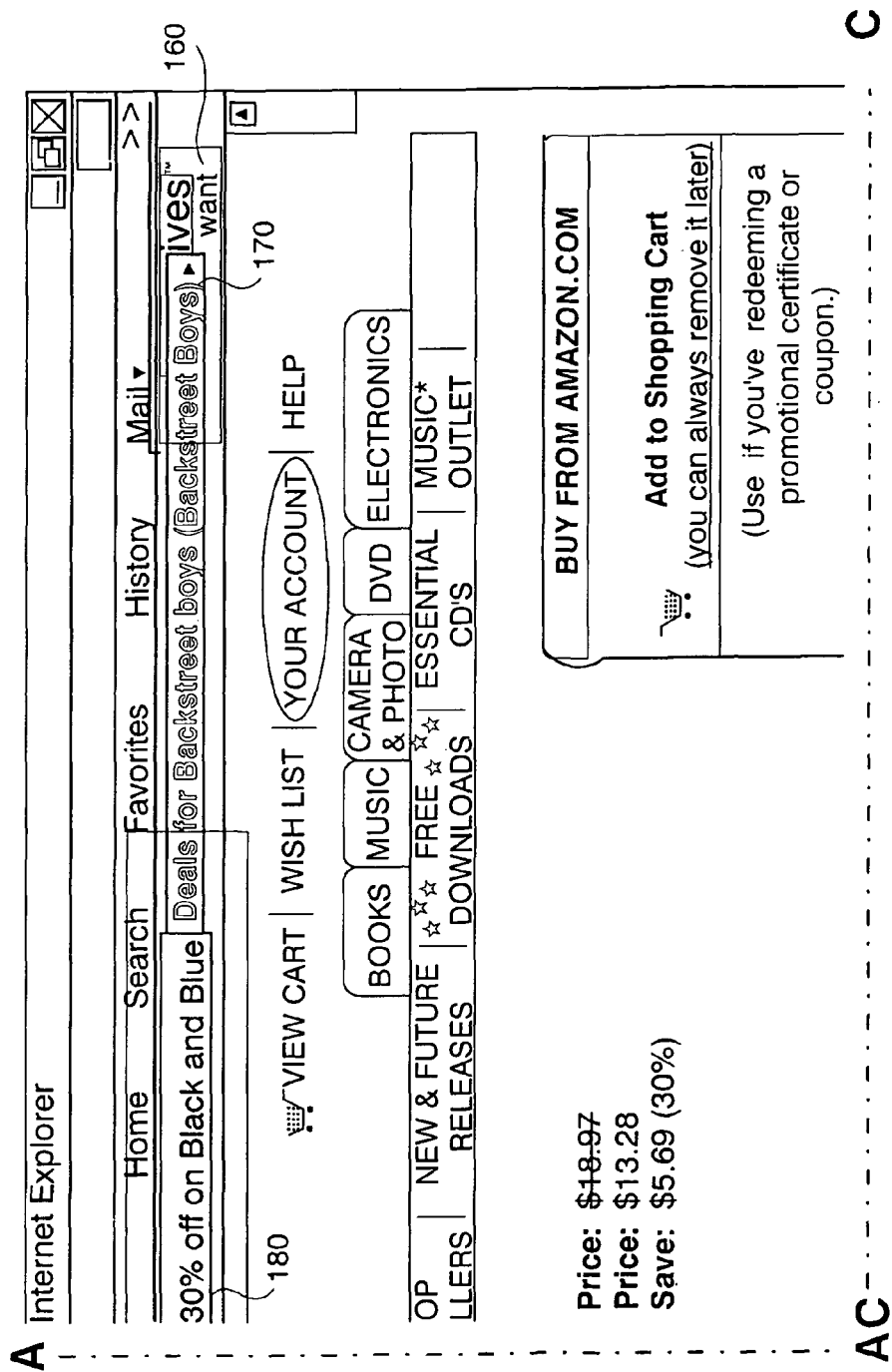
Figure 17C:
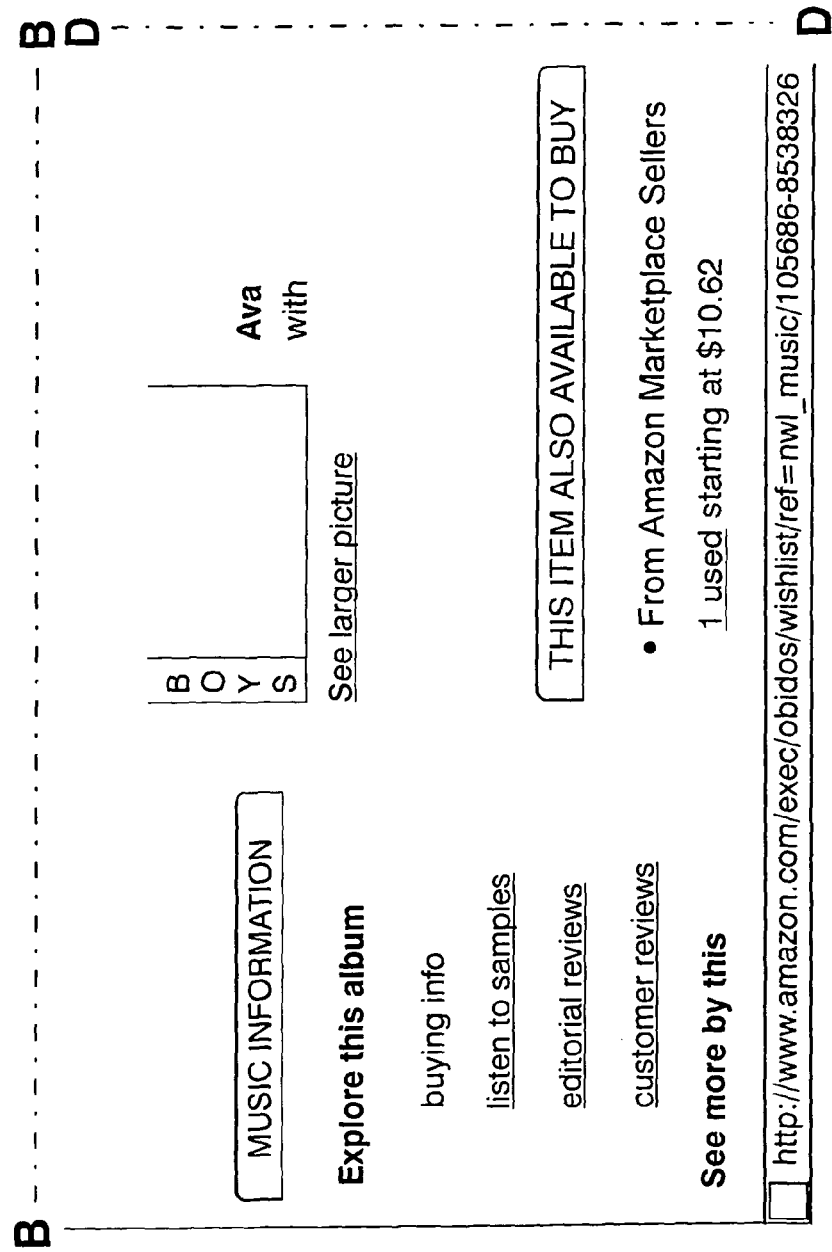
Figure 17D:
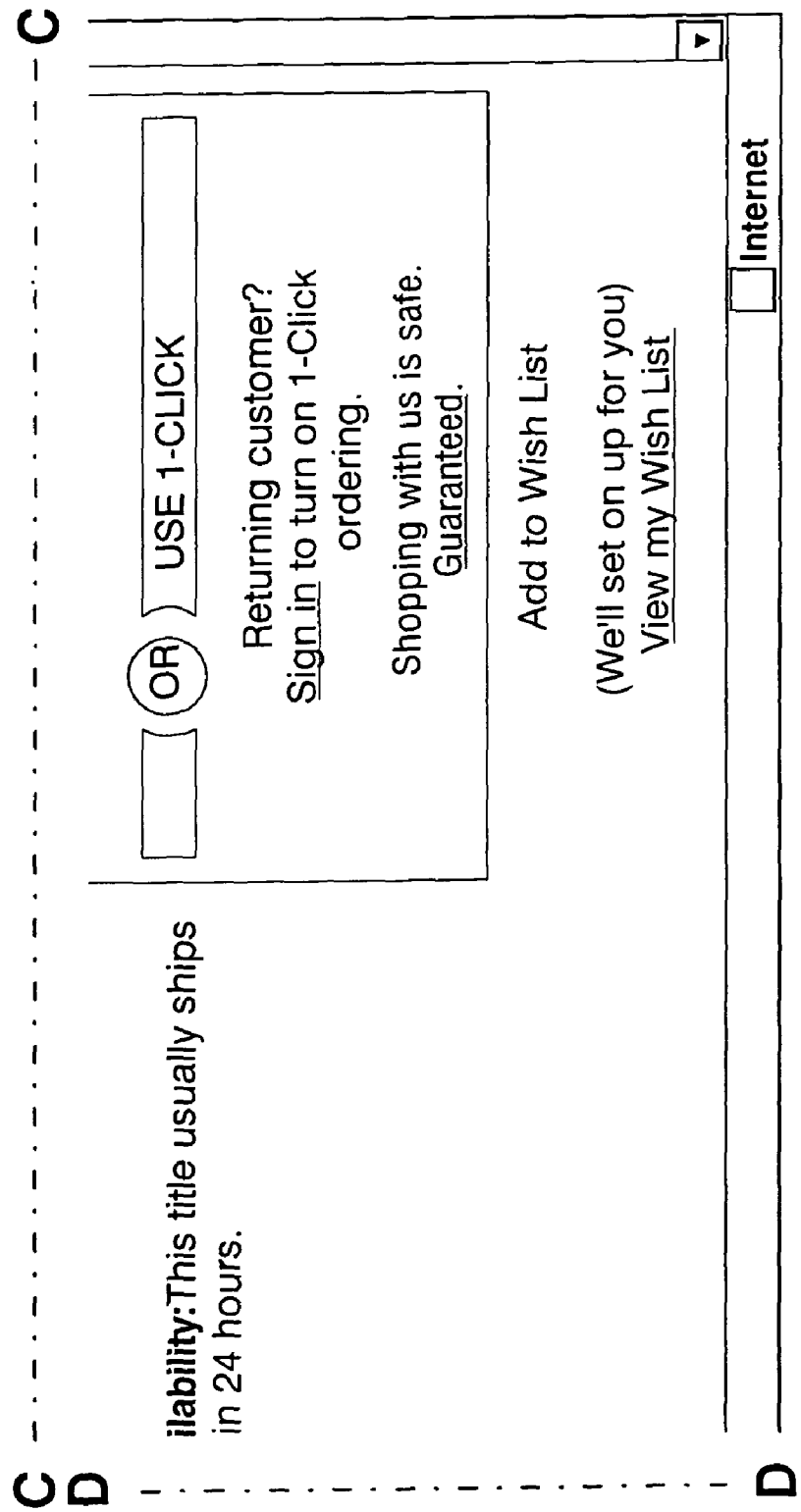
Figure 18A:
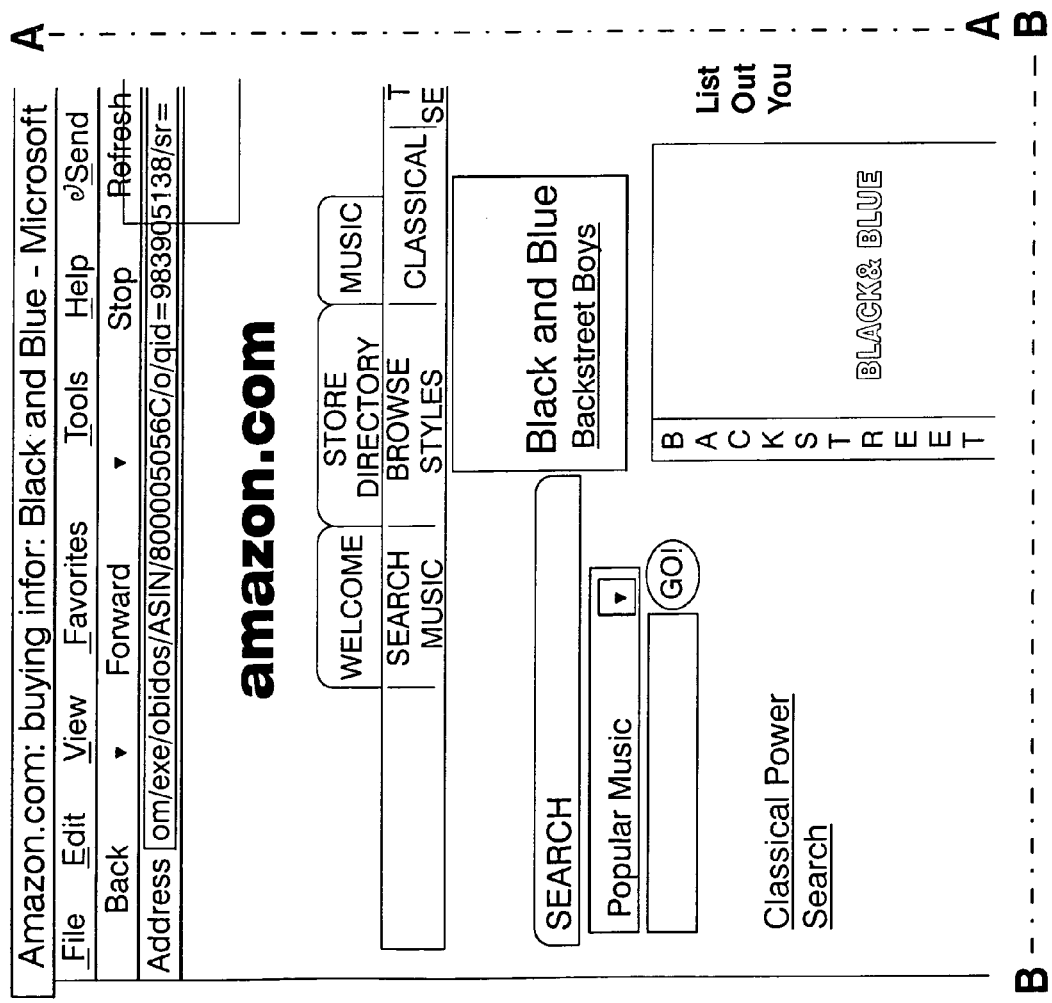
Figure 18B:
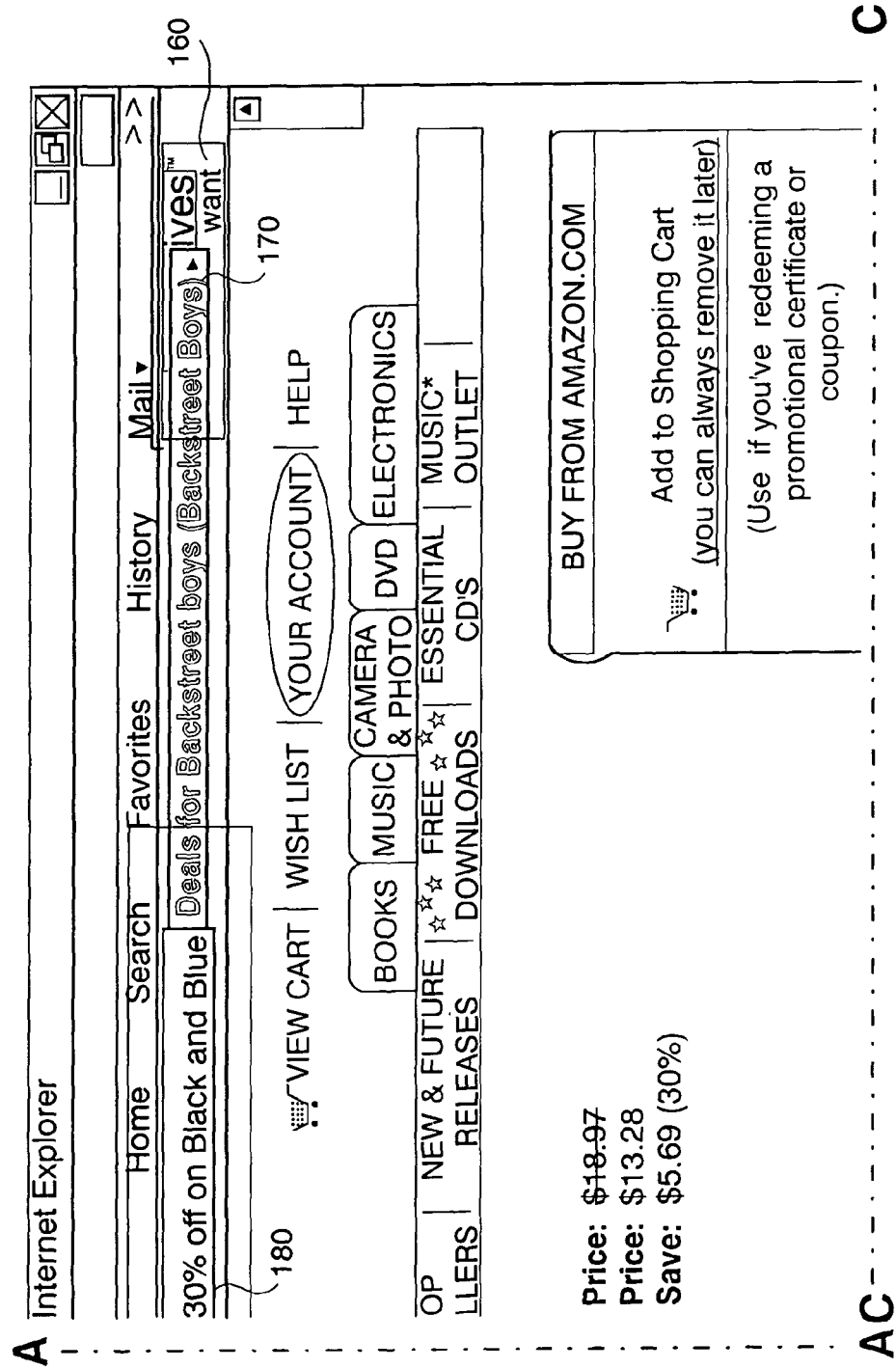
Figure 18C:
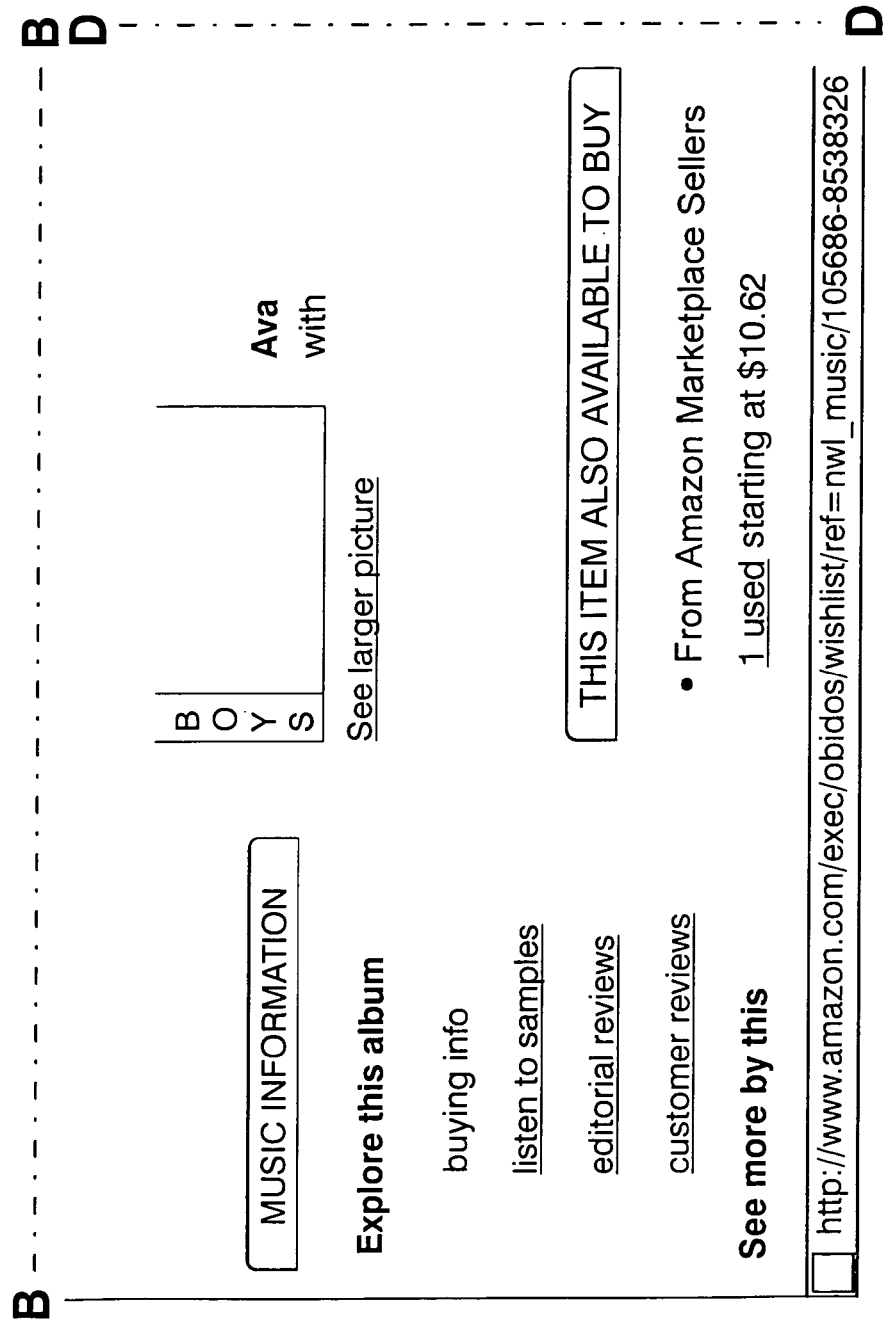
Figure 18D:
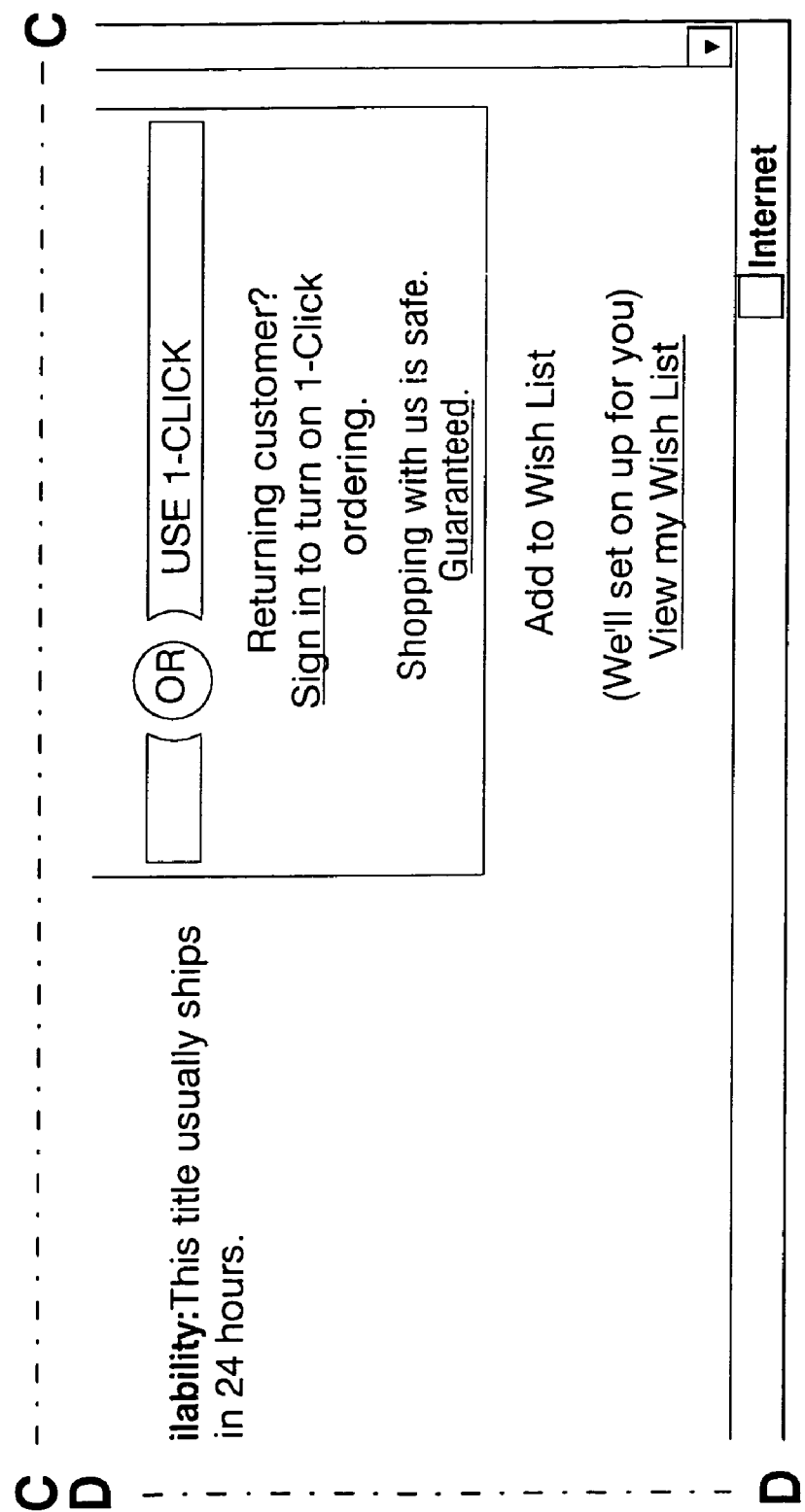

Note that the Object Registry is also intended to be, but does not need to be, the following:
accessible via automated processes, such as electronic databases
edited by automated processes
edited by human experts Further, as with the Mind set Registry 34 (FIG. 4) and the Rules Registry 100 (FIG. 11), the system requires a Registry Editor 150 for the Object Registry 140 that has the ability to create, read, update, and delete listings in the Object Registry (FIG. 15). Note that a Registry Editor may be either a person 152 or an automated tool 154, or a combination of them.

Finally, the system of FIG. 14 needs a Match Maker 30", which may be similar in function to the Match Maker 30 of FIG. 4 and Match Maker 30' of FIG. 10. The Match Maker system's administrator is responsible for matching objects identified on a page with a collection of services offered by the Service Provider 16 that are relevant to those objects. In order to do this, it parses the content of the customer's current page, groups attributes to form structured objects and communicates with the Object Registry 140. For example, when the object "Compaq Presario 5001SR" is identified on the user's page, then the service "Review Your Computer" is mapped to the specific review of that object by that service provider. Note also that the Match Maker system's administrator may be implemented in the form of automated software, though it may also take other forms, such as one or more people, or a combination of people and automated technology tools. It is also intended to have, but need not have, the following capabilities:

Rank services according to their priorities and/or appropriateness to that customer at that time
  Apply rules to the context of that customer, the customer's mind set, and the collection of services. These rules include, but are not limited to, identifying cross-selling opportunities and up-selling opportunities.

The process of constructing contextual services requires interaction between a single customer or user 10 and the Internet, between the Internet and the Match Maker system's administrator, between the Match Maker system's administrator and the Object Registry 140, and also private work done by the Match Maker itself as illustrated in FIG. 14. The process begins when the customer browses the Internet and completes when the Match Maker system's administrator delivers the contextual services back to the customer. In particular, the process is as follows:

1. The Customer 10, who has downloaded and installed the Contextual Icon on their web browser, starts browsing on the Internet. As the Customer browses, the Contextual Icon sends the content of the page the Customer is viewing to the Match Maker system's administrator.
2. The Match Maker system's administrator parses the content of the page that the Customer is viewing and identifies the objects and their attributes which are mentioned on the page. The Match Maker intelligently groups together the attributes belonging to a particular object. For example, assume that a page mentions several computers and mentions attributes for each computer, such as brand, processor type, and processor speed. The Match Maker will group together the attributes belonging to each computer object and produce a list of computer objects found on the page.
3. The Match Maker system's administrator next cross-references the objects that are found with the Object Registry 140 to determine the set of known services that are contextual, i.e., related, to the current page content.
4. The Match Maker may also apply a set of its own rules to add special enhancements to the set of contextual services, such as cross-selling and up-selling promotions.
5. The Match Maker system's administrator then provides the customer 10 with a set of contextual services. This provision of services may be implemented by sending the set of contextual services encoded to the Contextual Icon or software, which decodes the services and displays them to the customer via a graphical user-interface (GUI) or other user interface.
6. The Customer 10 may then review the set of contextual services presented by the Contextual Icon and click on a desired service. By clicking on the service, a call is made to the Service Provider, i.e., a link is established to the Service Provider, requesting the content of that particular service.
7. The Service Provider then serves up the appropriate content to the Customer for the service requested.

In order to create a set of contextual services that are accurate and take maximum advantage of the services provided by the Service Provider, processes are necessary to keep the Object Registry current and up to date. This maintenance is accomplished by processes involving the Object Registry 140, the Registry Editors 150 and the Service Provider 16. This maintenance process is illustrated in FIG. 15. In particular, the Service Provider uses one or more Registry Editors 150 (either person(s) or automated tool(s) or a combination) to input new services, update existing services, input new object definitions, and update existing object definitions in the Object Registry 140.

As an example of use of the Contextual Icon, if the Service Provider 16 using the Contextual Icon is a coupon provider called E-centives, the Contextual Icon 160 will appear on the customer's browser as shown in FIG. 16. In this example the Contextual Icon 160 has E-centives's logo displayed in it. E-centives has to ask its customers to download and install the Contextual Icon before it appear's on the customer's web browser.

Figure 19A:
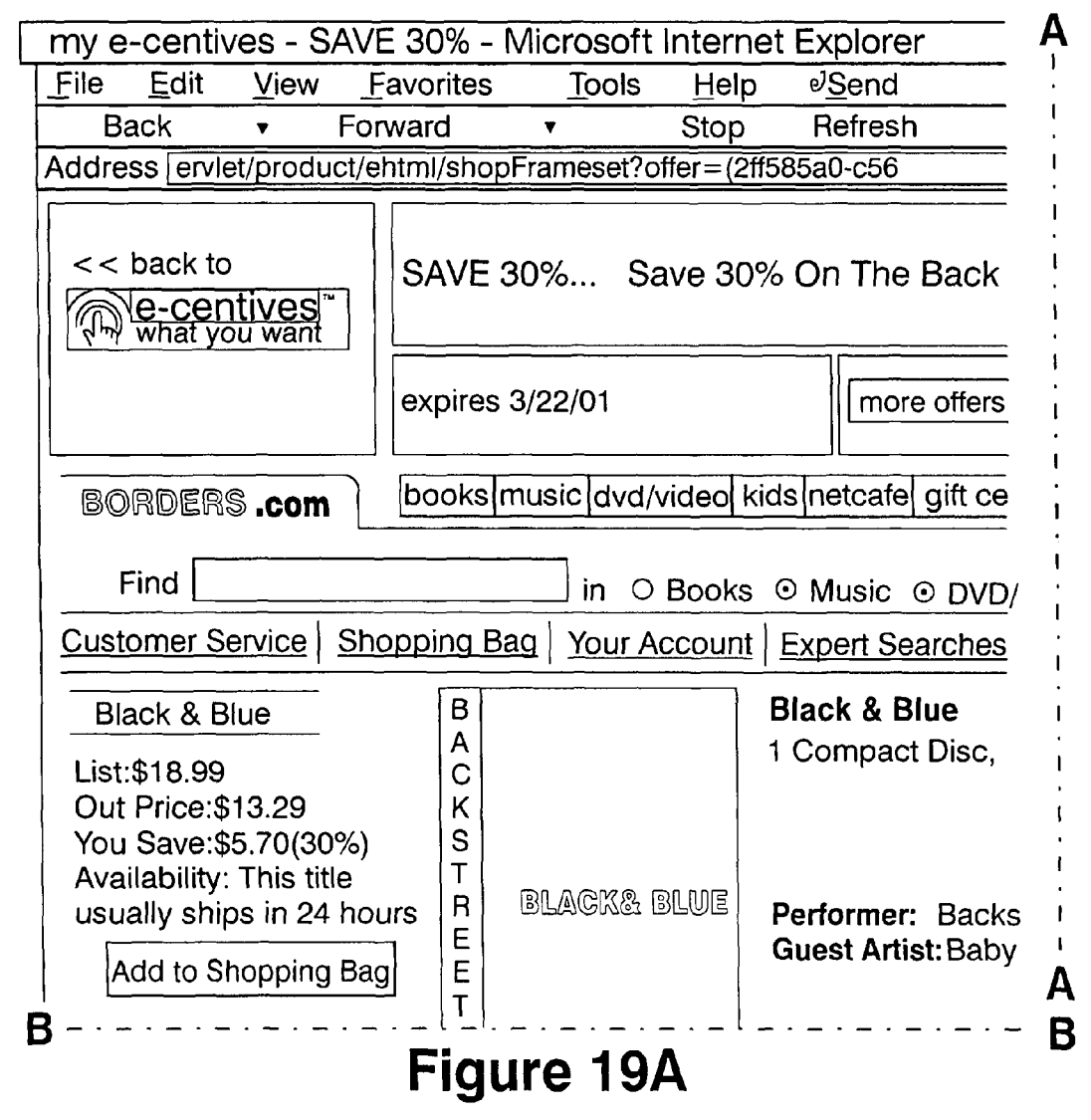
Figure 19B:
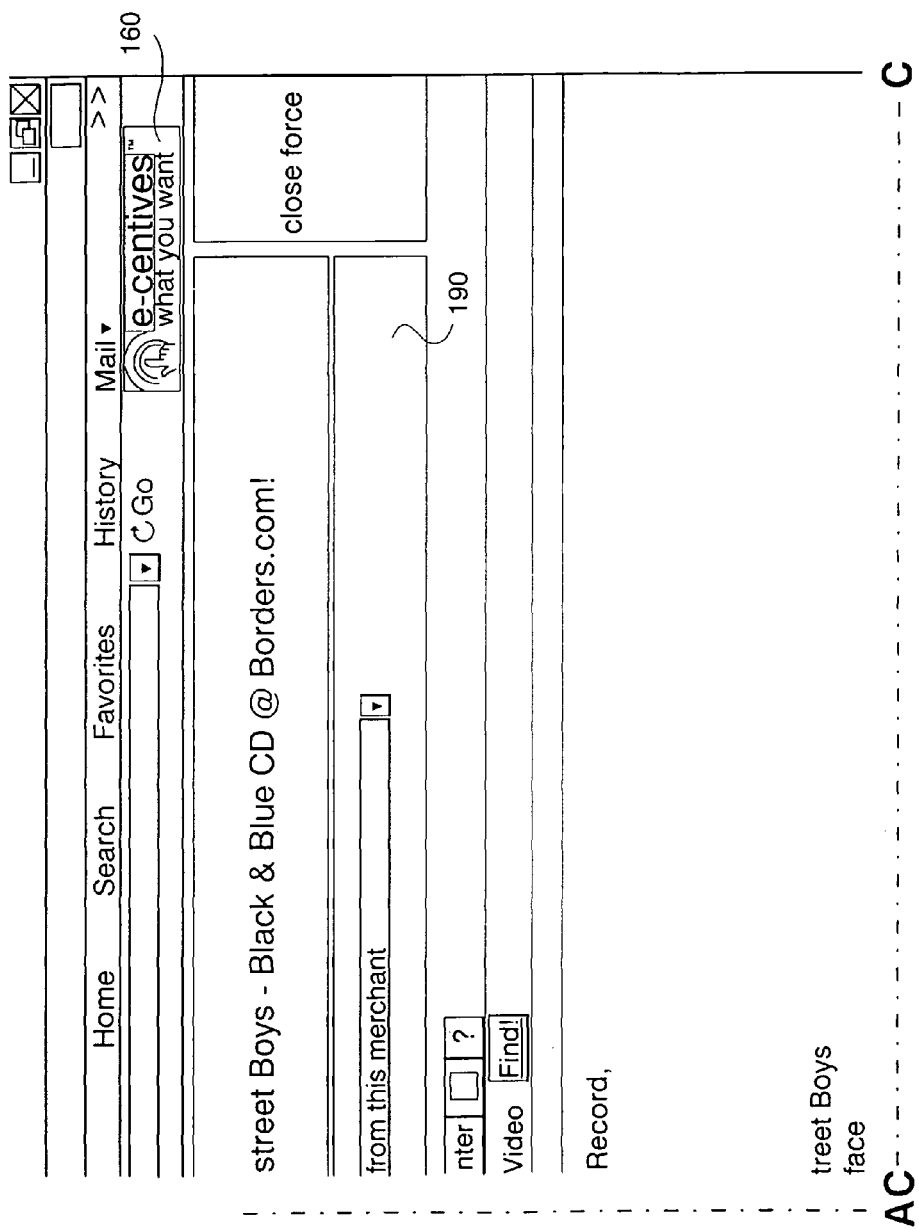
Figure 19D:
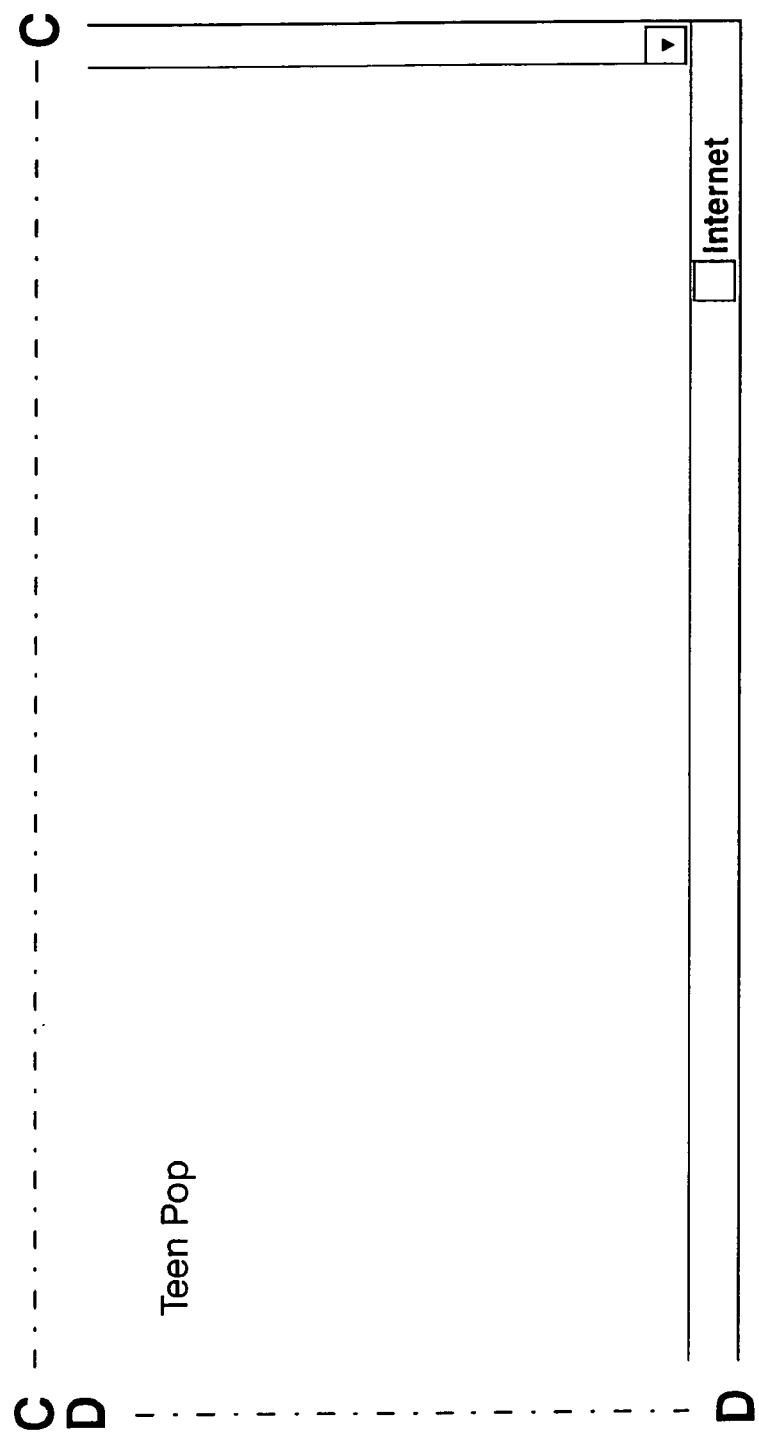

If the Customer with the Contextual Icon downloaded to his browser starts browsing the Internet, goes to Amazon.com and looks at the "Black and Blue" album by the "Back Street Boys" as shown in FIG. 16, the Match Maker system's administrator parses the content of this page and identifies the object "album" with attributes "title" equal to "Black and Blue" and "artists" equal to "Back Street Boys". Then the Match Maker talks to the Object Registry 140 and identifies all the services that are relevant. From contacting the Object Registry, the Match Maker finds that there is a service for "Back Street Boys" and presents the customer with a service 170 called "Deals for Back Street Boys" as shown in FIG. 17. If this interests the Customer 10, the Customer can click on the coupon service to see the details as shown in FIG. 18. The details 180 in FIG. 18 show that there is a coupon available for "30% off on Black & Blue Album." The Customer can then click on the coupon and it will take them directly to E-centives coupon page 190 for the Black and Blue album by the Back Street Boys as shown in FIG. 19.

As the example shows, the Contextual Icon tool is a very effective and powerful way for companies to provide their services to their customers when and where it makes sense. There is value in the system of the present invention to both customers and service providers. Customers get the benefit of targeted services anywhere on the web by means of a single mouse click. This relieves the user or customer from having to remember particular URLs and names of services that they liked in the past. Service providers who use this technology get the benefit of greatly increasing their customer retention by strengthening their ties with their customers.

While a preferred embodiment of the present invention is described herein, it is to be understood, of course, that changes and modifications may be made in the embodiment without departing from the true scope and spirit of the present invention as defined by the appended claims.

We claim:

1. A system for delivering ads to a user viewing content operating a station connected to a distributed computer network, comprising:
   an ad server which maintains the ads for the user at the station across the distributed computer network, the user station allowing the user to retrieve information containing content;
   a data store containing a set of relevancy rules associated with each ad, the rules being operable to indicate a level of relevancy of the ad to the content of the information retrieved; and
   a match maker configured to, in response to the submission of a URL by the user at the operating station, access the content retrieved by the user, extract the content according to extracting rules, parse the content of the information into objects, target an ad from the server to the content by applying the relevancy rules in the data store to the objects, free of information about the user, and directly send the targeted ad to the station for display with the content;
   wherein the extracting rules enable a classification of the content according to a channel, and wherein a channel is one of an object, a group of objects, a classification of objects or a structural relationship among objects;
   wherein the channel into which the content is classified is related to past consumption by users as a consequence of ads that were received and responded to by them.

2. A system as in claim 1, wherein the station is at least one of a personal computer, a pager, a Web-enabled phone, a personal digital assistant (PDA), a pen-based platform, a wireless digital platform, or a voice-based platform.

3. A system as in claim 1, wherein the targeted ad is presented to the user in at least one of static text, Hyper Text Markup Language, image, Flash, and or rich media format.

4. A system as in claim 1, wherein an advertiser has purchased a right to advertise the targeted ads maintained by at least one of the ad server, an ad network, and or an affiliate network.

5. A system as in claim 1, wherein the objects parsed by the match maker are at least one of a keyword, a key phrase, or a structural relationship of at least one of multiple keywords, multiple key phrases, a keyword with a key phrase, or multiple keywords with multiple key phrases.

6. A system as in claim 5, wherein said at least one key word, a key phrase, and or structural relationship was purchased by an advertiser for targeted advertising.

7. A system as in claim 1, wherein the relevancy rules relate to at least one of a keyword, a key phrase or a structural relationship of at least one of multiple keywords, multiple key phrases, a keyword with a key phrase, or multiple keywords with multiple key phrases that was purchased by an advertiser for targeted advertising and wherein the data store stores a price at which said at least one key word, key phrase, or structural relationship was purchased or a performance measurement of the targeted ad associated with the purchased at least one key word, key phrase, or structural relationship.

8. A system as in claim 7, wherein performance is measured by at least one of changes in revenues or click through rates of targeted ads.

9. A system as in claim 1, wherein the content is a portion of content from a location on the distributed computer network that the user requested to view.

10. A system as in claim 1, wherein the content is a portion of content from a location on the distributed computer network that the user requested to receive.

11. A system as in claim 1, wherein the channel into which the content is classified is among channels used for existing advertising sales by at least one of an advertiser, an ad network, or an affiliate network.

12. A system as in claim 1, wherein the match maker parses the content and maps to the targeted ad in real time as the user operates at the station connected to the distributed computer network.

13. A system as in claim 1, wherein the match maker parses the content and maps to the targeted ad prior to the user operating at the station connected to the distributed computer network.

* * * * *